US008758578B2

(12) United States Patent
Nomura et al.

(10) Patent No.: US 8,758,578 B2
(45) Date of Patent: *Jun. 24, 2014

(54) PHOTOELECTROCHEMICAL CELL AND ENERGY SYSTEM USING THE SAME

(75) Inventors: Takaiki Nomura, Osaka (JP); Takahiro Suzuki, Osaka (JP); Nobuhiro Miyata, Osaka (JP); Kazuhito Hato, Osaka (JP)

(73) Assignee: Panasonic Corporation, Osaka (JP)

( * ) Notice: Subject to any disclaimer, the term of this patent is extended or adjusted under 35 U.S.C. 154(b) by 327 days.

This patent is subject to a terminal disclaimer.

(21) Appl. No.: 13/260,825

(22) PCT Filed: Aug. 5, 2010

(86) PCT No.: PCT/JP2010/004942
§ 371 (c)(1),
(2), (4) Date: Sep. 28, 2011

(87) PCT Pub. No.: WO2011/016244
PCT Pub. Date: Feb. 10, 2011

(65) Prior Publication Data
US 2012/0028141 A1  Feb. 2, 2012

(30) Foreign Application Priority Data

Aug. 5, 2009  (JP) ................. 2009-182879

(51) Int. Cl.
| C25B 9/00 | (2006.01) |
| C25B 9/06 | (2006.01) |
| C25B 11/00 | (2006.01) |
| C25B 11/04 | (2006.01) |
| C25B 9/16 | (2006.01) |
| C25B 9/12 | (2006.01) |

(52) U.S. Cl.
USPC ........... 204/278; 204/193; 204/194; 204/242; 204/248; 136/255; 136/243

(58) Field of Classification Search
CPC .............. C25B 9/00; C25B 9/04; C25B 9/06; C25B 9/12; C25B 9/16; C25B 11/00; C25B 11/04
USPC .......... 204/248, 242, 193, 194, 278; 136/243, 136/255
See application file for complete search history.

(56) References Cited

U.S. PATENT DOCUMENTS

| 4,061,555 A | 12/1977 | Miyatani et al. |
| 4,181,754 A | 1/1980 | McKinzie et al. |

(Continued)

FOREIGN PATENT DOCUMENTS

| JP | 51-123779 | 10/1976 |
| JP | 2002-143688 | 5/2002 |

(Continued)

OTHER PUBLICATIONS

Bard, "Design of Semiconductor Photoelectrochemical Systems for Solar Energy Conversion", Journal of Physical Chemistry, 1982, vol. 26, pp. 172-177.

(Continued)

Primary Examiner — Harry D Wilkins, III
Assistant Examiner — Zulmariam Mendez
(74) Attorney, Agent, or Firm — Hamre, Schumann, Mueller & Larson, P.C.

(57) ABSTRACT

A photoelectrochemical cell (100) includes: a semiconductor electrode (120) including a substrate (121), a first n-type semiconductor layer (122) disposed on the substrate (121), and a second n-type semiconductor layer (123) and a conductor (124) disposed apart from each other on the first n-type semiconductor layer (122); a counter electrode (130) connected electrically to the conductor (124); an electrolyte (140) in contact with surfaces of the second n-type semiconductor layer (123) and the counter electrode (130); and a container (110) accommodating the semiconductor electrode (120), the counter electrode (130) and the electrolyte (140). In the semiconductor electrode (120), relative to a vacuum level, (I) band edge levels of a conduction band and a valence band in the second n-type semiconductor layer (123), respectively, are higher than band edge levels of a conduction band and a valence band in the first n-type semiconductor layer (122), (II) a Fermi level of the first n-type semiconductor layer (122) is higher than a Fermi level of the second n-type semiconductor layer (123), and (III) a Fermi level of the conductor (124) is higher than the Fermi level of the first n-type semiconductor layer (122). The photoelectrochemical cell (100) generates hydrogen by irradiation of the second n-type semiconductor layer (123) with light.

16 Claims, 37 Drawing Sheets

(56) References Cited

U.S. PATENT DOCUMENTS

| | | | |
|---|---|---|---|
| 4,203,814 A | 5/1980 | Grantham | |
| 4,251,289 A | 2/1981 | Moustakas et al. | |
| 4,310,405 A | 1/1982 | Heller | |
| 8,236,146 B2 | 8/2012 | Nomura et al. | |
| 2003/0025113 A1 | 2/2003 | Van De Walle | |
| 2004/0262154 A1 | 12/2004 | Gibson et al. | |
| 2006/0137739 A1 | 6/2006 | Imoto et al. | |
| 2007/0227896 A1 | 10/2007 | McNulty et al. | |
| 2007/0256729 A1 | 11/2007 | Vijh et al. | |
| 2009/0050205 A1 | 2/2009 | Duerr et al. | |
| 2009/0127124 A1 | 5/2009 | Guerra | |

FOREIGN PATENT DOCUMENTS

| | | |
|---|---|---|
| JP | 2002-234105 | 8/2002 |
| JP | 2002-306963 | 10/2002 |
| JP | 2003-024764 | 1/2003 |
| JP | 2003-154272 | 5/2003 |
| JP | 2004-087148 | 3/2004 |
| JP | 2007-039298 | 2/2007 |
| JP | 2008-012478 | 1/2008 |
| JP | 2009-016236 | 1/2009 |
| JP | 2009-527879 | 7/2009 |
| WO | 2006/082801 | 8/2006 |

OTHER PUBLICATIONS

Gratzel, "Photoelectrochemical Cells", Nature, Nov. 2001, vol. 414, pp. 338-344.

Zhao, et al., "Preparation and photoelectrochemical properties of $Ti_{1-x}V_xO_2$ solid solution thin film photoelectrodes with gradient band gap", Thin Solid Films, No. 340, (1998).

PHOTOELECTROCHEMICAL CELL AND ENERGY SYSTEM USING THE SAME

TECHNICAL FIELD

The present invention relates to a photoelectrochemical cell in which water is decomposed by irradiation with light and to an energy system using the photoelectrochemical cell.

BACKGROUND ART

There are conventionally known techniques, for example, in which water is decomposed for obtaining hydrogen and oxygen by irradiation of a semiconductor material that functions as a photocatalyst with light (see Patent Literatures 1 and 2, for example), or in which a surface of a base material is rendered hydrophilic by covering the surface of the base material with the semiconductor material (see Patent Literature 3, for example).

Patent Literature 1 discloses a technique in which an n-type semiconductor electrode and a counter electrode are disposed in an electrolyte and the surface of the n-type semiconductor electrode is irradiated with light, so that hydrogen and oxygen are obtained from the surfaces of both electrodes. Specifically, use of a $TiO_2$ electrode, a ZnO electrode, a CdS electrode, and the like as the n-type semiconductor electrode is described therein.

Patent Literature 2 discloses a gas generating apparatus in which a semiconductor electrode formed of a group III nitride semiconductor and a counter electrode are disposed in an electrolyte and the surface of the semiconductor electrode is irradiated with light, so that hydrogen and oxygen are generated from the surfaces of both electrodes.

Further, Patent Literature 3 discloses a hydrophilic member formed of a base material and a coating layer formed on the surface of the base material, in which the coating layer has a titanium oxide layer that contains titanium oxide particles, and an island-shaped portion that is disposed on the titanium oxide layer and that is made of a second photocatalytic material other than titanium oxide. Specifically, use, as the second photocatalytic material, of a material having potentials at the bottom of a conduction band and the top of a valence band on a more positive side relative to the standard hydrogen electrode potential (negative side relative to the vacuum level) than the titanium oxide is described therein.

Further, there is proposed a photocatalytic thin film that brings about a highly efficient photocatalytic performance under natural light, in which at least one of metal ions such as Nb, V and Cr is injected into a photocatalytic thin film produced on a base to cause a change in the band gap or the potential gradient in the thickness direction of the photocatalytic thin film, thereby forming a gradient film (see Patent Literature 4).

Further, there also is proposed a technique for producing hydrogen by immersing, in a solution containing hydrogen sulfide, a multilayer thin film photocatalyst in which a first compound semiconductor layer and a second compound semiconductor layer that has a band gap different from the first compound semiconductor layer are disposed sequentially on an electrically conductive base material, and then irradiating this multilayer thin film photocatalyst with light (see Patent Literature 5).

CITATION LIST

Patent Literature

PTL 1: JP 51 (1976)-123779 A
PTL 2: JP 2003-24764 A
PTL 3: JP 2002-234105 A
PTL 4: JP 2002-143688 A
PTL 5: JP 2003-154272 A

SUMMARY OF INVENTION

Technical Problem

However, the techniques described in Patent Literatures 1 and 2 suffer from a problem of a low quantum efficiency for the water-splitting reaction by irradiation with light. This is because it is highly probable that holes and electrons generated by photoexcitation disappear due to recombination before being used for the electrolysis of water.

For example, Patent Literature 2 describes an electrode in which a p-type semiconductor is disposed on the back of an n-type group III nitride semiconductor and an n-type semiconductor is disposed on the back of the p-type semiconductor, or an electrode in which an n-type semiconductor is disposed on the back of a p-type semiconductor and a p-type semiconductor is disposed on the back of the n-type semiconductor, and the effect of charge separation by the electromotive force generated from the pn junction. However, such a configuration causes a carrier accumulation in the semiconductor at the outermost surface of the electrode, and thus a significant charge separation effect cannot be expected.

Patent Literature 3 describes that, among electrons and holes generated by photoexcitation, the electrons transfer to the conduction band of the second photocatalytic material and the holes transfer to the valence band of the titanium oxide, so that the electron-hole pairs are separated, which decreases the probability of the recombination. However, in Patent Literature 3, there is no description about the energy state to be set at the junction plane between the titanium oxide and the second photocatalytic material. When a Schottky barrier junction is formed at the junction plane between the titanium oxide and the second photocatalytic material, Schottky barriers occur at the junction plane in the conduction band and the valence band. At this time, among the electrons and holes generated by photoexcitation, the electrons are confined by the Schottky barrier in the conduction band at the junction plane, and the holes are accumulated around the junction plane of the valence band by the Schottky barrier that serves as a hole stopper in the valence band at the junction plane. Therefore, there has been a problem that the probability of recombination of electrons and holes is increased, compared to the case where the titanium oxide and the second photocatalytic material each are used independently.

In Patent Literature 4, metal ion doping is used for making a photocatalyst thin film into a gradient film. However, this configuration has been developed for the purpose of extending the utilized region to the visible light region and improving the light-use efficiency by making a photocatalyst thin film into a gradient film. Therefore, there is no description about the photocatalytic energy state to be set in the gradient film, and thus optimization of charge separation and the like is not performed.

A multilayer thin film photocatalyst described in Patent Literature 5 has a structure in which two semiconductors, CdS and ZnS, each having a band gap different from the other are joined, and the semiconductor ZnS further is joined to an electrically conductive base material Pt. Patent Literature 5 describes that since these materials with a different band gap are joined, electrons can transfer to the semiconductor ZnS, and further to the electrically conductive base material Pt along the gradient of the band gaps, and therefore can be coupled easily to hydrogen ions on the electrically conductive base material, which facilitates the generation of hydrogen (Paragraphs [0026] and [0027] in Patent Literature 5). However, focusing attention on the junction portions of materials in consideration of the Fermi level (vacuum reference level) of each of the materials, Schottky barriers occur in both the junction portion between CdS (−5.0 eV) and ZnS (−5.4 eV) and the junction portion between ZnS (−5.4 eV) and Pt (−5.7 eV) because the Fermi levels decrease in the transfer direction of the electrons (transfer direction from CdS to ZnS, further from ZnS to Pt). Accordingly, although this configuration can allow the electrons to transfer along the gradient of the band gaps, it hardly allows the electrons to transfer smoothly.

In view of such conventional problems, it is an object of the present invention to provide a photoelectrochemical cell capable of efficient charge separation between electrons and holes generated by photoexcitation and thus improving the quantum efficiency of the hydrogen evolution reaction by irradiation with light, and an energy system using the photoelectrochemical cell.

Solution to Problem

In order to achieve the object, the present invention provides a first photoelectrochemical cell including:

a semiconductor electrode including a substrate, a first n-type semiconductor layer disposed on the substrate, and a second n-type semiconductor layer and a conductor disposed apart from each other on the first n-type semiconductor layer;

a counter electrode connected electrically to the conductor;

an electrolyte in contact with surfaces of the second n-type semiconductor layer and the counter electrode; and a container accommodating the semiconductor electrode, the counter electrode and the electrolyte.

In the semiconductor electrode, relative to a vacuum level, (I) band edge levels of a conduction band and a valence band in the second n-type semiconductor layer, respectively, are higher than band edge levels of a conduction band and a valence band in the first n-type semiconductor layer, (II) a Fermi level of the first n-type semiconductor layer is higher than a Fermi level of the second n-type semiconductor layer, and (III) a Fermi level of the conductor is higher than the Fermi level of the first n-type semiconductor layer.

The first photoelectrochemical cell generates hydrogen by irradiation of the second n-type semiconductor layer with light.

Furthermore, in order to achieve the object, the present invention provides a second photoelectrochemical cell including:

a semiconductor electrode including a substrate, a first p-type semiconductor layer disposed on the substrate, and a second p-type semiconductor layer and a conductor disposed apart from each other on the first p-type semiconductor layer;

a counter electrode connected electrically to the conductor;

an electrolyte in contact with surfaces of the second p-type semiconductor layer and the counter electrode; and a container accommodating the semiconductor electrode, the counter electrode and the electrolyte.

In the semiconductor electrode, relative to a vacuum level, (I) band edge levels of a conduction band and a valence band in the second p-type semiconductor layer, respectively, are lower than band edge levels of a conduction band and a valence band in the first p-type semiconductor layer, (II) a Fermi level of the first p-type semiconductor layer is lower than a Fermi level of the second p-type semiconductor layer, and (III) a Fermi level of the conductor is lower than the Fermi level of the first p-type semiconductor layer.

The second photoelectrochemical cell generates hydrogen by irradiation of the second p-type semiconductor layer with light.

An energy system according to the present invention includes:

the first or second photoelectrochemical cell of the present invention;

a hydrogen storage that is connected to the first or second photoelectrochemical cell by a first pipe and that stores hydrogen generated in the first or second photoelectrochemical cell; and a fuel cell that is connected to the hydrogen storage by a second pipe and that converts hydrogen stored in the hydrogen storage into electricity.

Advantageous Effects of Invention

The first and second photoelectrochemical cells of the present invention allow efficient charge separation between electrons and holes generated by photoexcitation to be achieved, and the quantum efficiency of the hydrogen evolution reaction by irradiation with light to be improved. Since the energy system of the present invention is provided with such a photoelectrochemical cell, efficient power supply is rendered possible.

DESCRIPTION OF EMBODIMENTS

Hereinafter, the embodiments of the present invention are described in detail with reference to the drawings. The embodiments described below are examples and the present invention is not limited to the following embodiments. Furthermore, in the following embodiments, the same members are indicated with identical numerals and the same descriptions thereof may be omitted.

(Embodiment 1)

Figure 1:
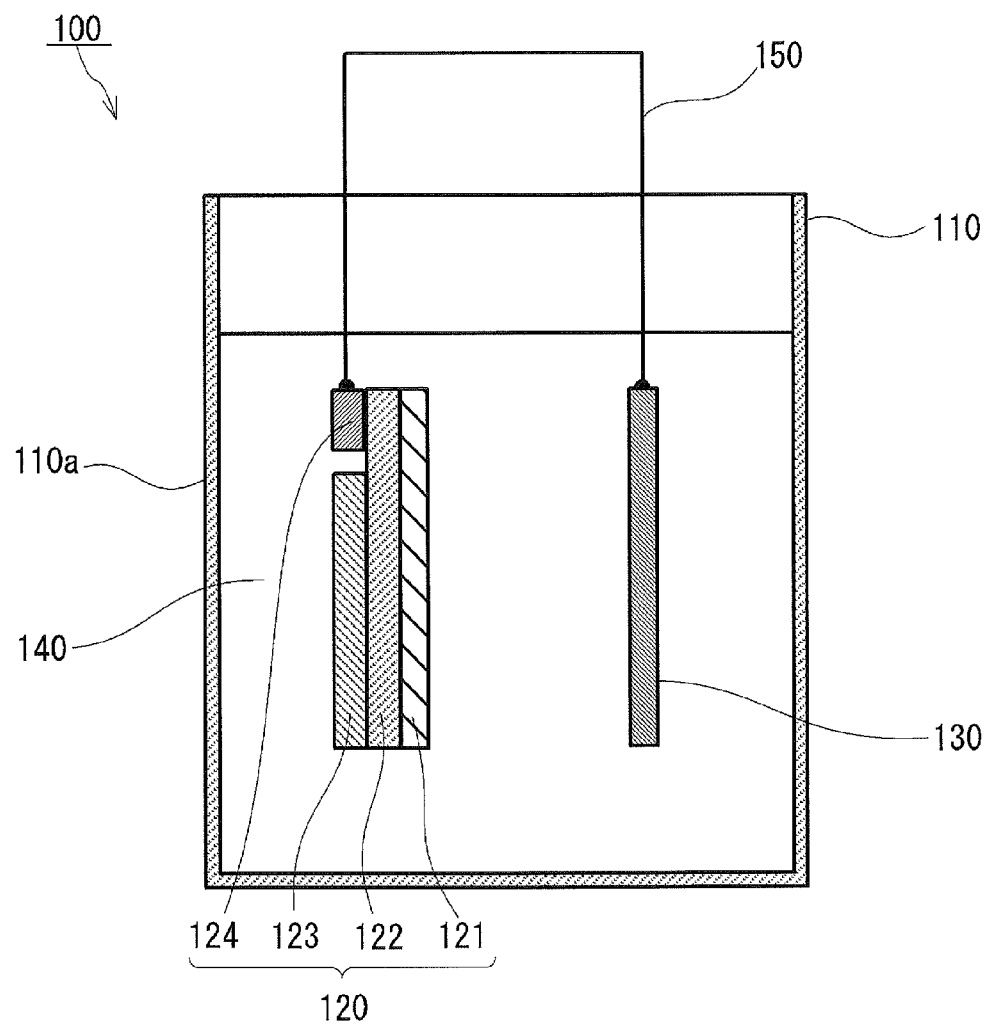
FIG. 1 is a schematic view illustrating a configuration of the photoelectrochemical cell of Embodiment 1 of the present invention.
Figure 2:
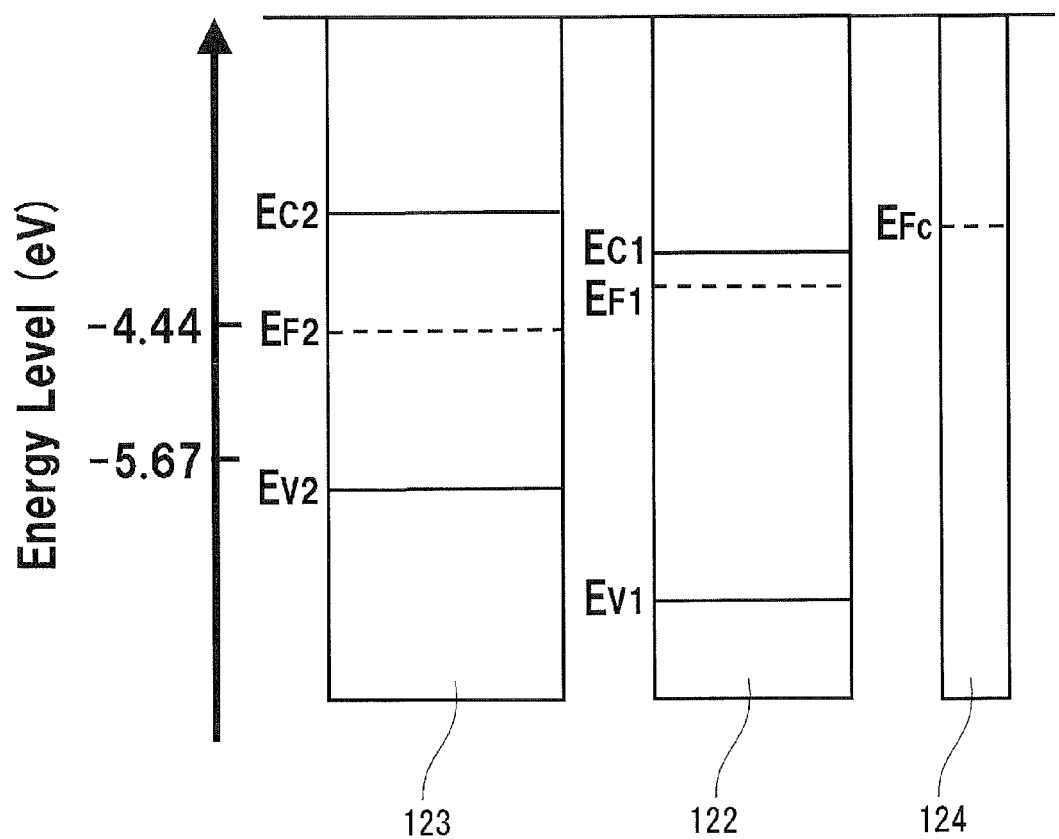
FIG. 2 is a conceptual diagram indicating a band structure of a conductor, a first n-type semiconductor layer and a second n-type semiconductor layer, before being joined, which constitute a semiconductor electrode in the photoelectrochemical cell of Embodiment 1 of the present invention.
Figure 3:
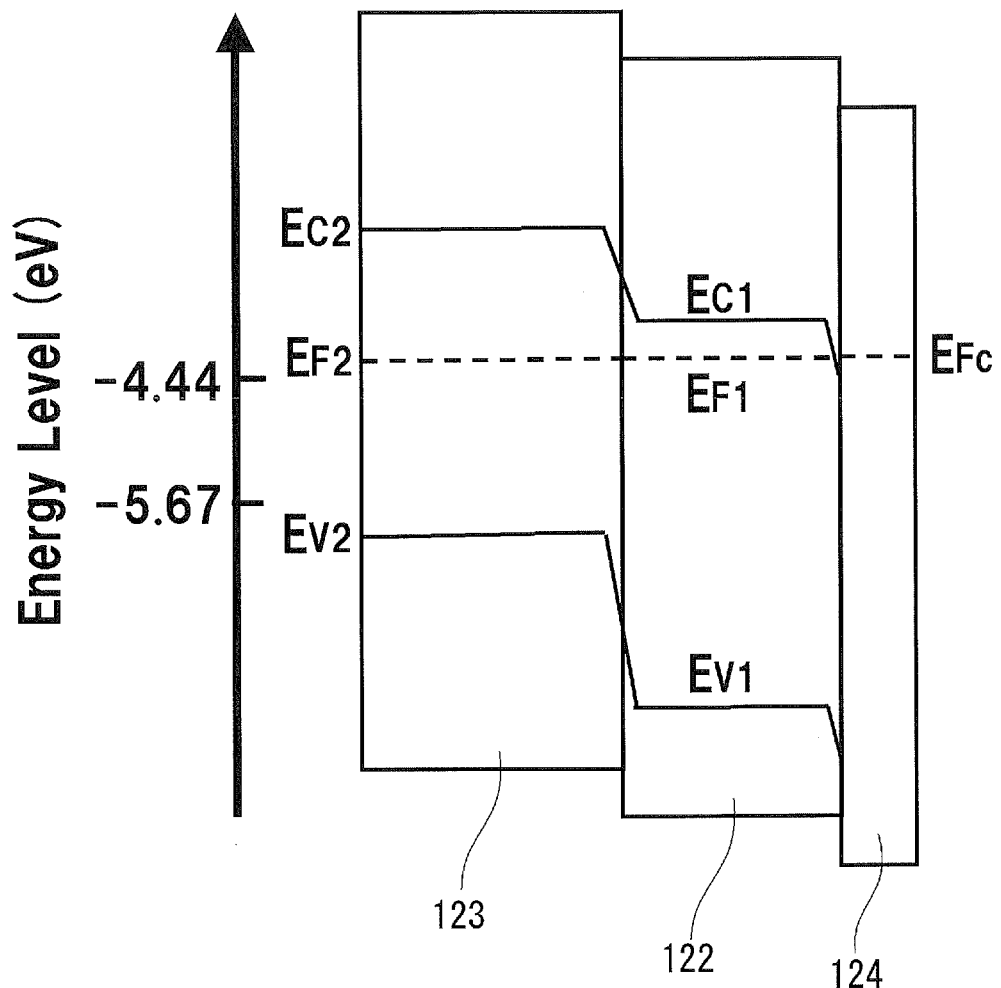
FIG. 3 is a conceptual diagram indicating a band structure of the conductor, the first n-type semiconductor layer and the second n-type semiconductor layer, after being joined, which constitute the semiconductor electrode in the photoelectrochemical cell of Embodiment 1 of the present invention.

The configuration of the photoelectrochemical cell according to Embodiment 1 of the present invention is described with reference to FIG. 1 to FIG. 3. FIG. 1 is a schematic view illustrating the configuration of the photoelectrochemical cell of the present embodiment. FIG. 2 is a conceptual diagram indicating a band structure of a conductor, a first n-type semiconductor layer and a second n-type semiconductor layer, before being joined, which constitute a semiconductor electrode in the photoelectrochemical cell of the present embodiment. FIG. 3 is a conceptual diagram indicating a band structure of the conductor, the first n-type semiconductor layer and the second n-type semiconductor layer, after being joined, which constitute the semiconductor electrode in the photoelectrochemical cell of the present embodiment. In each of FIGS. 2 and 3, the vertical axis indicates energy levels relative to the vacuum level (unit: eV).

As illustrated in FIG. 1, a photoelectrochemical cell 100 of the present embodiment includes a semiconductor electrode 120, a counter electrode 130 paired with the semiconductor electrode 120, an electrolyte 140 containing water, and a container 110 that has an opening and accommodates the semiconductor electrode 120, the counter electrode 130 and the electrolyte 140.

The semiconductor electrode 120 and the counter electrode 130 are disposed inside the container 110 so that the surfaces thereof are in contact with the electrolyte 140. The semiconductor electrode 120 includes a substrate 121, a first n-type semiconductor layer 122 disposed on the substrate 121, and a second n-type semiconductor layer 123 and a conductor 124 disposed apart from each other on the first n-type semiconductor layer 122. A portion of the container 110 facing the second n-type semiconductor layer 123 of the semiconductor electrode 120 that is disposed inside the container 110 (which is, hereinafter, abbreviated as a light incident portion 110a) is made of a material that allows transmission of light, such as sunlight.

The conductor 124 of the semiconductor electrode 120 is connected electrically to the counter electrode 130 by a conducting wire 150. Here, the counter electrode means an electrode that can exchange electrons with a semiconductor electrode without the intermediation of an electrolyte. Accordingly, there is no limitation on the configuration such as the positional relationship and the like of the counter electrode 130 with the semiconductor electrode 120, as long as the counter electrode 130 is connected electrically to the conductor 124 that constitutes the semiconductor electrode 120. It should be noted that since an n-type semiconductor is used for the semiconductor electrode 120 in the present embodiment, the counter electrode 130 should be an electrode capable of receiving electrons from the semiconductor electrode 120 without the intermediation of the electrolyte 140.

Next, the operation of the photoelectrochemical cell 100 of the present embodiment is described.

When the second n-type semiconductor layer 123 of the semiconductor electrode 120 disposed inside the container 110 is irradiated with sunlight from the light incident portion 110a of the container 110 in the photoelectrochemical cell 100, electrons are generated in the conduction band and holes are generated in the valence band in the second n-type semiconductor layer 123. The holes generated at this time transfer toward the surface side of the second n-type semiconductor layer 123. Thereby, water is decomposed on the surface of the second n-type semiconductor layer 123 according to the reaction formula (1) below, so that oxygen is generated. On the other hand, the electrons transfer toward the conductor 124 along the bending of the band edge of the conduction band at the interface between the second n-type semiconductor layer 123 and the first n-type semiconductor layer 122 and at the interface between the first n-type semiconductor layer 122 and the conductor 124. The electrons that have transferred to the conductor 124 transfer toward the side of the counter electrode 130 connected electrically to the semiconductor electrode 120 through the conducting wire 150. Thereby, hydrogen is generated on the surface of the counter electrode 130 according to the reaction formula (2) below.

$$4h^+ + 2H_2O \rightarrow O_2\uparrow + 4H^+ \qquad (1)$$

$$4e^- + 4H^+ \rightarrow 2H_2\uparrow \qquad (2)$$

As is described in detail later, since no Schottky barriers occur at the junction plane between the first n-type semiconductor layer 122 and the second n-type semiconductor layer 123, the electrons can transfer from the second n-type semiconductor layer 123 to the first n-type semiconductor layer 122 without being prevented. Furthermore, since no Schottky barriers occur also at the junction plane between the first n-type semiconductor layer 122 and the conductor 124, the electrons can transfer from the first n-type semiconductor layer 122 to the conductor 124 without being prevented. Accordingly, the probability of the recombination between the electrons and holes generated by photoexcitation inside the second n-type semiconductor layer 123 is reduced. Thus, according to the photoelectrochemical cell 100 of the present embodiment, it is possible to improve the quantum efficiency of the hydrogen evolution reaction by irradiation with light.

Next, the band structure of the conductor 124, the first n-type semiconductor layer 122 and the second n-type semiconductor layer 123 in the semiconductor electrode 120 is described in detail. It should be noted that the energy levels of the band structure described herein are indicated relative to the vacuum level. Hereinafter, the energy levels of the band structure of the semiconductor and the conductor described in the specification also are indicated relative to the vacuum level in the same manner.

As indicated in FIG. 2, the band edge level $E_{C2}$ of the conduction band and the band edge level $E_{V2}$ of the valence band in the second n-type semiconductor layer 123, respectively, are higher than the band edge level $E_{C1}$ of the conduction band and the band edge level $E_{V1}$ of the valence band in the first n-type semiconductor layer 122.

Moreover, the Fermi level $E_{F1}$ of the first n-type semiconductor layer 122 is higher than the Fermi level $E_{F2}$ of the second n-type semiconductor layer 123, and the Fermi level $E_{Fc}$ of the conductor 124 is higher than the Fermi level $E_{F1}$ of the first n-type semiconductor layer 122.

Next, when the conductor 124, the first n-type semiconductor layer 122 and the second n-type semiconductor layer 123 are joined to one another, carriers transfer between the first n-type semiconductor layer 122 and the second n-type semiconductor layer 123 so that the Fermi levels match each other, thereby causing bending of the band edge, at the junction plane therebetween, as indicated in FIG. 3. At this time, the band edge level $E_{C2}$ of the conduction band and the band edge level $E_{V2}$ of the valence band in the second n-type semiconductor layer 123, respectively, are higher than the band edge level $E_{C1}$ of the conduction band and the band edge level $E_{V1}$ of the valence band in the first n-type semiconductor layer 122, and the Fermi level $E_{F1}$ of the first n-type semiconductor layer 122 is higher than the Fermi level $E_{F2}$ of the second n-type semiconductor layer 123. Therefore, no Schottky barriers occur at the junction plane between the first n-type semiconductor layer 122 and the second n-type semiconductor layer 123.

Further, also at the junction plane between the conductor 124 and the first n-type semiconductor layer 122, carriers transfer so that the Fermi levels match each other, thereby causing bending of the band edge around the junction plane. At this time, since the Fermi level $E_{Fc}$ of the conductor 124 is higher than the Fermi level $E_{F1}$ of the first n-type semiconductor layer 122, the junction between the conductor 124 and the first n-type semiconductor layer 122 is formed by an ohmic contact.

When the above-mentioned semiconductor electrode 120 is made to be in contact with the electrolyte 140, the band edge level $E_{C2}$ of the conduction band and the band edge level $E_{V2}$ of the valence band around the surface of the second n-type semiconductor layer 123 are raised at the interface between the second n-type semiconductor layer 123 and the electrolyte 140. Thus, a space charge layer occurs around the surface of the second n-type semiconductor layer 123.

As a comparative embodiment, an embodiment having a band edge level of the conduction band in the second n-type semiconductor layer lower than the band edge level of the conduction band in the first n-type semiconductor layer is assumed. In this case, a square well potential is developed in the band edge level of the conduction band inside the second n-type semiconductor layer due to the bending of the band edge of the conduction band around the surface of the second n-type semiconductor layer and the difference in the band edge levels of the conduction band between the first n-type semiconductor layer and the second n-type semiconductor layer. This square well potential causes the electrons to be accumulated inside the second n-type semiconductor layer, and the probability of recombination between the electrons and holes generated by photoexcitation to increase.

In contrast, in the photoelectrochemical cell 100 of the present embodiment, since the band edge level $E_{C2}$ of the conduction band in the second n-type semiconductor layer 123 is set higher than the band edge level $E_{C1}$ of the conduction band in the first n-type semiconductor layer 122, no square well potential as mentioned above occurs in the band edge level of the conduction band inside the second n-type semiconductor layer 123. Therefore, the electrons are not accumulated inside the second n-type semiconductor layer 123 and can transfer toward the side of the first n-type semiconductor layer 122, so that the efficiency of charge separation is improved significantly.

Further, as another comparative embodiment, an embodiment having a band edge level of the valence band in the second n-type semiconductor layer lower than the band edge level of the valence band in the first n-type semiconductor layer 122 is assumed. In this case, a square well potential is developed in the band edge level of the valence band inside the second n-type semiconductor layer due to the bending of the band edge of the valence band around the surface of the second n-type semiconductor layer and the difference in the band edge levels of the valence band between the first n-type semiconductor layer and the second n-type semiconductor layer. This square well potential causes the holes that have been generated inside the second n-type semiconductor layer by photoexcitation to transfer separately in the interface direction with the electrolyte and in the interface direction with the first n-type semiconductor layer.

In contrast, in the photoelectrochemical cell 100 of the present embodiment, since the band edge level $E_{V2}$ of the valence band in the second n-type semiconductor layer 123 is set higher than the band edge level $E_{V1}$ of the valence band in the first n-type semiconductor layer 122, no square well potential as mentioned above occurs in the band edge level $E_{V2}$ of the valence band inside the second n-type semiconductor layer 123. Therefore, the holes are not accumulated inside the second n-type semiconductor layer 123 and can transfer toward the interface direction with the electrolyte 140, so that the efficiency of charge separation is improved significantly.

Further, in the photoelectrochemical cell 100 of the present embodiment, the Fermi level $E_{F1}$ of the first n-type semiconductor layer 122 is set higher than the Fermi level $E_{F2}$ of the second n-type semiconductor layer 123. This configuration causes band bending but no Schottky barriers at the interface between the first n-type semiconductor layer 122 and the second n-type semiconductor layer 123. As a result, among the electrons and holes generated by photoexcitation inside the second n-type semiconductor layer 123, the electrons transfer to the conduction band of the first n-type semiconductor layer 122, and the holes transfer in the valence band toward the interface direction with the electrolyte 140. Therefore, efficient charge separation between the electrons and holes is possible without being prevented by Schottky barriers. This reduces the probability of the recombination between the electrons and holes generated by photoexcitation inside the second n-type semiconductor layer 123, therefore improving the quantum efficiency of the hydrogen evolution reaction by irradiation with light.

Further, in the photoelectrochemical cell 100 of the present embodiment, the Fermi level of the conductor 124 is set higher than the Fermi level of the first n-type semiconductor layer 122. This configuration causes no Schottky barriers also at the junction plane between the conductor 124 and the first n-type semiconductor layer 122. Therefore, the electrons can transfer from the first n-type semiconductor layer 122 to the conductor 124 without being prevented by Schottky barriers. This further reduces the probability of the recombination between the electrons and holes generated by photoexcitation inside the second n-type semiconductor layer 123, therefore further improving the quantum efficiency of the hydrogen evolution reaction by irradiation with light.

In the present embodiment, when the semiconductor electrode 120 is in contact with the electrolyte 140 at a pH of 0 and a temperature of 25° C., the Fermi level $E_{F1}$ of the first n-type semiconductor layer 122 is −4.44 eV or more and the band edge level $E_{V2}$ of the valence band in the second n-type semiconductor layer 123 is −5.67 eV or less. When the semiconductor electrode 120 satisfies such energy levels, the Fermi level $E_{Fc}$ of the conductor 124 in contact with the first n-type semiconductor layer 122 is allowed to be −4.44 eV or more. This value of −4.44 eV is the oxidation reduction potential of hydrogen. Thus, hydrogen ions can be reduced efficiently on the surface of the counter electrode 130 that is connected electrically to the conductor 124, so that hydrogen can be generated efficiently.

Moreover, the band edge level $E_{V2}$ of the valence band in the second n-type semiconductor layer 123 is −5.67 eV or less. This value of −5.67 eV is the oxidation reduction potential of water. Thus, water is oxidized efficiently on the surface of the second n-type semiconductor layer 123, and therefore oxygen can be generated efficiently.

As described above, when the semiconductor electrode 120 is in contact with the electrolyte 140 at a pH of 0 and a temperature of 25° C., water can be decomposed efficiently by setting the Fermi level $E_{F1}$ of the first n-type semiconductor layer 122 to −4.44 eV or more and the band edge level $E_{V2}$ of the valence band in the second n-type semiconductor layer 123 to −5.67 eV or less.

It should be noted that although the semiconductor electrode 120 that satisfies such energy levels as mentioned above is exemplified in the present embodiment, the Fermi level $E_{F1}$ of the first n-type semiconductor layer 122 may be less than −4.44 eV, and the band edge level $E_{V2}$ of the valence band in the second n-type semiconductor layer 123 may exceed −5.67 eV, for example. Also in such a case, it is possible to generate hydrogen and oxygen.

Here, the Fermi level and the potential (band edge level) at the bottom of the conduction band of each of the first n-type semiconductor layer 122 and the second n-type semiconductor layer 123 can be calculated using the flat band potential and carrier concentration. The flat band potential and carrier concentration of a semiconductor can be determined from the Mott-Schottky plot obtained by measurement using a semiconductor that is a measurement object as an electrode.

Further, the Fermi level of each of the first n-type semiconductor layer 122 and the second n-type semiconductor layer 123 in the state of being in contact with the electrolyte 140 at a pH of 0 and a temperature of 25° C. can be determined by measurement of the Mott-Schottky plot using a semiconductor that is a measurement object as an electrode in the state where the semiconductor electrode is in contact with an electrolyte at a pH of 0 and a temperature of 25° C.

The potential (band edge level) at the top of the valence band in each of the first n-type semiconductor layer 122 and the second n-type semiconductor layer 123 can be calculated using the band gap and the potential at the bottom of the conduction band in each of the n-type semiconductor layer 122 and the second n-type semiconductor layer 123 calculated by the above-mentioned method. Here, the band gap of each of the n-type semiconductor layer 122 and the second n-type semiconductor layer 123 can be obtained from the optical absorption edge to be observed in the measurement of the light absorption spectrum of a semiconductor that is a measurement object.

The Fermi level of the conductor 124 can be determined, for example, by photoelectron spectroscopy.

Next, the material of each constituent member provided in the photoelectrochemical cell 100 of the present embodiment is described.

Preferably, the first n-type semiconductor layer 122 is formed of n-type gallium nitride (n-GaN), for example. N—GaN can achieve a Fermi level of −4.44 eV or more in the state of being in contact with the electrolyte at a pH of 0 and a temperature of 25° C. Thus, a particularly high quantum efficiency can be obtained for the water-splitting reaction. Furthermore, since n-GaN has a low sheet resistance, electrons can be taken out through the conductor 124 disposed on the n-GaN. Moreover, n-GaN allows the first n-type semiconductor layer 122 to achieve high durability.

In the case where the first n-type semiconductor layer 122 is formed of n-type gallium nitride (n-GaN), it is preferable that an n-type group III nitride semiconductor containing, as group III elements, gallium and at least one element selected from the group consisting of indium and aluminum be used for the second n-type semiconductor layer 123. More specifically, the second n-type semiconductor layer 123 preferably is n-type gallium nitride-indium mixed crystal (n-GaInN), n-type gallium nitride-aluminum mixed crystal (n-GaAlN), or n-type gallium nitride-indium-aluminum mixed crystal (n-GaInAlN). These n-type group III nitride semiconductors can achieve a band edge level of the valence band of −5.67 eV or less in the state of being in contact with the electrolyte at a pH of 0 and a temperature of 25° C. Thus, a particularly high quantum efficiency can be obtained for the water-splitting reaction.

In the case where the first n-type semiconductor layer 122 is formed of n-GaN and the second n-type semiconductor layer 123 is formed of the n-type group III nitride semiconductor mentioned above, the first n-type semiconductor layer 122 and the second n-type semiconductor layer 123 preferably are crystal films obtained by epitaxial growth.

In the configuration of the semiconductor electrode in the photoelectrochemical cell of the present invention, even a semiconductor material, such as a GaN crystal film, that needs to be formed into a film by epitaxial growth can be used easily by selecting the substrate 121 appropriately. This offers a wider choice of materials.

Moreover, the first n-type semiconductor layer 122 may be formed of an n-type oxide semiconductor containing gallium, indium and zinc. Such an oxide can achieve a Fermi level of −4.44 eV or more in the state of being in contact with the electrolyte at a pH of 0 and a temperature of 25° C. Thus, a particularly high quantum efficiency can be obtained for the water-splitting reaction. Furthermore, since the oxide has a low sheet resistance, electrons can be taken out efficiently through the conductor 124 disposed on the oxide. Moreover, the oxide allows the first n-type semiconductor layer 122 to achieve high durability. This oxide can exhibit sufficiently the above-mentioned performances even if it is amorphous. For example, the oxide can be formed into a film also by an inexpensive method, such as sputtering and printing, at room temperature.

In the case where the first n-type semiconductor layer 122 is formed of an n-type oxide semiconductor containing gallium, indium and zinc, it is preferable that an n-type semiconductor having a composition in which a part of oxygen in an oxide containing gallium, indium and zinc is substituted by nitrogen be used for the second n-type semiconductor layer 123. The n-type semiconductor having such a composition can achieve a band edge level $E_{V2}$ of the valence band of −5.67 eV or less in the state of being in contact with the electrolyte at a pH of 0 and a temperature of 25° C. Thus, a particularly high quantum efficiency can be obtained for the water-splitting reaction. In addition, the n-type semiconductor having such a composition can exhibit sufficiently the above-mentioned performances even if it is amorphous. For example, the n-type semiconductor can be formed into a film also by an inexpensive method, such as sputtering and printing, at room temperature.

The n-type oxide semiconductor containing gallium, indium and zinc and capable of exhibiting the above-mentioned performances can be represented by, for example, $$In_{2x}Ga_{2(1-x)}O_3(ZnO)_y$$

(where x and y each satisfy $0.2 < x < 1$ and $0.5 \leq y$).

Particularly, an oxide represented by the above-mentioned formula where x is 0.5 is preferable. By substituting a part of oxygen contained in this oxide by nitrogen, it is possible to achieve a nitride with high In content that cannot be achieved, for example, by a nitride containing gallium and indium ($Ga_zIn_{1-z}N$ where z satisfies 0<z<1). Furthermore, in this oxide, the wavelength corresponding to its band gap is around 900 nm, and thereby the oxide can absorb light with a wavelength up to around 900 nm. Semiconductors used for the photolysis of water have a band gap of 1.23 eV or more, and the wavelength corresponding to this band gap is 1000 nm or less. Therefore, this oxide is most suitable for the photolysis of water from the viewpoint of increasing the sunlight utilization efficiency. Moreover, $InGaO_3(ZnO)_y$ and a nitride obtained by substituting a part of oxygen in $InGaO_3(ZnO)_y$ by nitrogen are very stable. It should be noted that even compounds other than these are relatively stable as long as ZnO is dissolved therein. Particularly, when x>0.2 is satisfied in the above-mentioned formula, it is possible to obtain optical semiconductors that can exhibit the effect resulting from the dissolution of ZnO, which cannot be obtained by $Ga_zIn_{1-z}N$.

Preferably, y satisfies $1 \leq y \leq 6$ in the above-mentioned formula. Use of such an oxide makes it easy to obtain a single-phase optical semiconductor, and thus excellent optical semiconductor performance can be achieved. Particularly, when y is 2 or 6 in the above-mentioned formula, a part of oxygen lattice completely can be substituted by nitrogen, and thus a single phase optical semiconductor, such as $InGaZn_2N_2O_2$ and $InGaZn_6N_2O_6$, can be obtained.

Semiconductor materials other than the above-mentioned materials also can be used for the first n-type semiconductor layer 122 and the second n-type semiconductor layer 123. For example, there can be mentioned oxide, sulfide, selenide, telluride, nitride, oxynitride, phosphide, and the like containing titanium, zirconium, vanadium, niobium, tantalum, chromium, molybdenum, tungsten, manganese, iron, cobalt, zinc, cadmium, or the like, as a constituent element.

As the first n-type semiconductor layer 122, oxide containing titanium, zirconium, niobium, or zinc as a constituent element may be used, for example. The first n-type semiconductor layer 122 may be formed of a single substance of this oxide, or may be formed of a complex compound containing this oxide. Or the first n-type semiconductor layer 122 may be formed of this oxide additionally containing alkali metal ions, alkaline earth metal, or the like.

The carrier concentration of the second n-type semiconductor layer 123 preferably is lower than the carrier concentration of the first n-type semiconductor layer 122. The second n-type semiconductor layer 123 may be one selected from the group consisting of oxide, nitride and oxynitride. In this way, stable operation of the photoelectrochemical cell is possible because the second n-type semiconductor layer 123 is prevented from dissolving in the electrolyte 140, even if the second n-type semiconductor layer 123 is irradiated with light in the state where the semiconductor electrode 120 is in contact with the electrolyte 140.

For example, in the case of using titanium oxide for the first n-type semiconductor layer 122, tantalum nitride, tantalum oxynitride or cadmium sulfide, for example, can be used for the second n-type semiconductor layer 123. Among these, use of tantalum nitride or tantalum oxynitride is preferable. In this way, stable operation of the photoelectrochemical cell is possible because the second n-type semiconductor layer 123 is prevented from dissolving in the electrolyte, even if the second n-type semiconductor layer 123 is irradiated with light in the state where the semiconductor electrode 120 is in contact with the electrolyte 140.

The second n-type semiconductor layer 123 may have a gradient composition along the thickness direction of the second n-type semiconductor layer 123. Here, the gradient composition refers to the state in which at least one of the elements constituting the second n-type semiconductor layer 123 has a concentration increasing or decreasing along the thickness direction of the second n-type semiconductor layer 123. The gradient composition of the second n-type semiconductor layer 123 allows the electrons and holes in the second n-type semiconductor layer 123 to transfer more smoothly and makes it possible to achieve the effect of reducing further the probability of the recombination between the electrons and holes. It should be noted, however, that even in the case where the second n-type semiconductor layer 123 has the gradient composition, the second n-type semiconductor layer 123 needs to satisfy the relationship with the first n-type semiconductor layer 122, in terms of the band edge levels of the conduction band and the valence band as well as the Fermi level, specified for the photoelectrochemical cell of the present invention.

In the present embodiment, the conductor 124 of the semiconductor electrode 120 is joined to the first n-type semiconductor layer 122 by an ohmic contact. Accordingly, for the conductor 124, electrically conductive materials, such as ITO (Indium Tin Oxide) and FTO (Fluorine doped Tin Oxide), or metals such as Ti, Ni, Ta, Nb, Al and Ag, can be used, for example.

It is preferable that, in the surface of the conductor 124, the area that is not covered by the first n-type semiconductor layer 122 be covered, for example, by an insulating material such as a resin. With such a configuration, the conductor 124 can be prevented from dissolving in the electrolyte 140.

In order not to affect the transfer of the electrons from the first n-type semiconductor layer 122 to the conductor 124, an insulated substrate, such as a sapphire substrate and a glass substrate, preferably is used for the substrate 121. In the case where the first n-type semiconductor layer 122 is formed of n-GaN, the second n-type semiconductor layer 123 is formed of the n-type group III nitride semiconductor mentioned above, and the first n-type semiconductor layer 122 and the second n-type semiconductor layer 123 are crystal films obtained by epitaxial growth, a sapphire substrate is used for the substrate 121.

A material with a low overvoltage is used preferably for the counter electrode 130. In the present embodiment, since an n-type semiconductor is used for the semiconductor electrode 120, hydrogen is generated at the counter electrode 130. Therefore, Pt, Au, Ag, Fe, or the like is used preferably as the counter electrode 130, for example.

Any electrolyte containing water can be used for the electrolyte 140. The electrolyte containing water may be acidic or alkali. In the case where a solid electrolyte is disposed between the semiconductor electrode 120 and the counter electrode 130, the electrolyte 140 in contact with the surface of the second n-type semiconductor layer 123 of the semiconductor electrode 120 and the surface of the counter electrode 130 can be replaced by pure water for electrolysis.

The photoelectrochemical cells of Comparative Embodiments 1-1 to 1-7 each having a relationship of the energy levels among a first n-type semiconductor layer, a second n-type semiconductor layer and a conductor different from that in the semiconductor electrode 120 are exemplified below and the differences in the operational effects are described. It should be noted that although the relationship of the energy levels among the first n-type semiconductor layer, the second n-type semiconductor layer and the conductor in each of Comparative Embodiments 1-1 to 1-7 indicated below is different from that in the photoelectrochemical cell 100 of the present embodiment, other configurations are the same as in the photoelectrochemical cell 100, and thus descriptions thereof are omitted.

<Comparative Embodiment 1-1>

Figure 4:
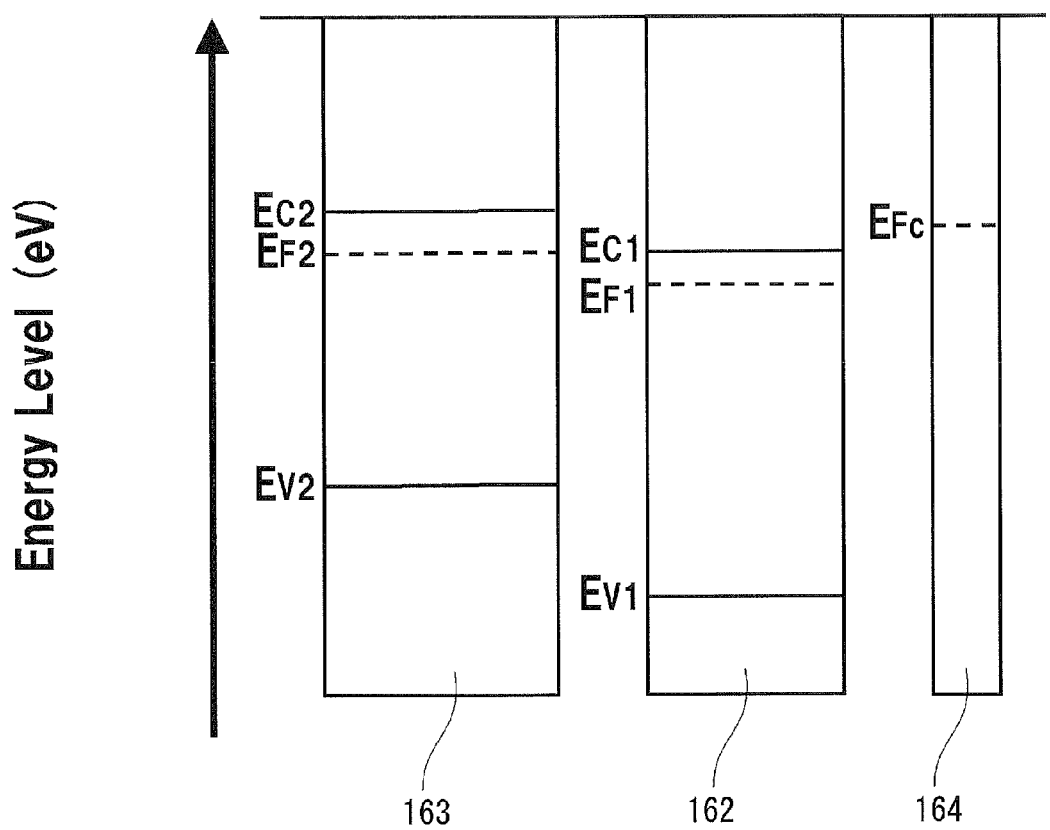
FIG. 4 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-1.
Figure 5:
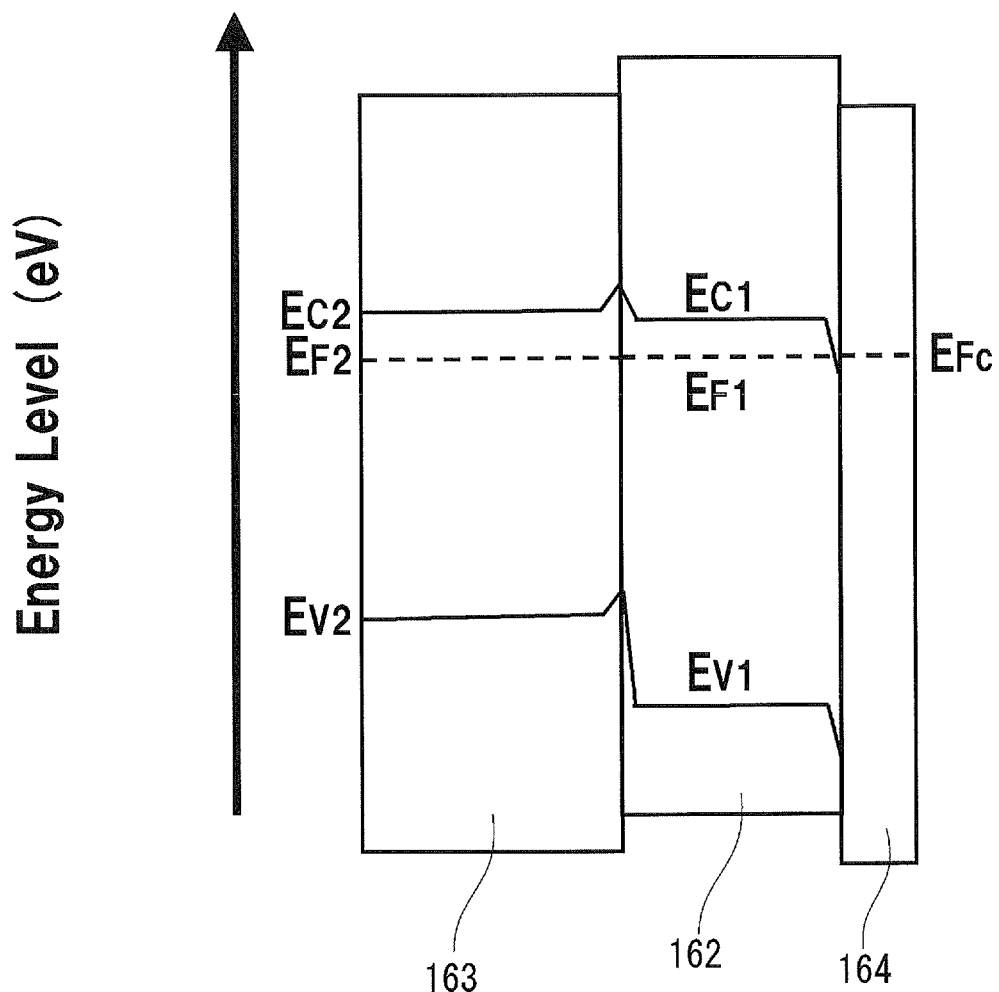
FIG. 5 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-1.

The photoelectrochemical cell according to Comparative Embodiment 1-1 is described with reference to FIGS. 4 and 5. FIG. 4 is a conceptual diagram indicating a band structure of a conductor, a first n-type semiconductor layer and a second n-type semiconductor layer, before being joined, in the present comparative embodiment. FIG. 5 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 162 disposed on the substrate, and a second n-type semiconductor layer 163 and a conductor 164 that are disposed on the first n-type semiconductor layer 162. The semiconductor electrode of the present comparative embodiment is different from the semiconductor electrode 120 of Embodiment 1 in that the Fermi level $E_{F1}$ of the first n-type semiconductor layer 162 is lower than the Fermi level $E_{F2}$ of the second n-type semiconductor layer 163, as indicated in FIG. 4.

Next, when the conductor 164, the first n-type semiconductor layer 162 and the second n-type semiconductor layer 163 are joined to one another, carriers transfer between the first n-type semiconductor layer 162 and the second n-type semiconductor layer 163 so that the Fermi levels match each other, thereby causing bending of the band edge, at the junction plane therebetween, as indicated in FIG. 5. The band edge level $E_{C2}$ of the conduction band and the band edge level $E_{V2}$ of the valence band in the second n-type semiconductor layer 163, respectively, are higher than the band edge level $E_{C1}$ of the conduction band and the band edge level $E_{V1}$ of the valence band in the first n-type semiconductor layer 162, but the Fermi level $E_{F1}$ of the first n-type semiconductor layer 162 is lower than the Fermi level $E_{F2}$ of the second n-type semiconductor layer 163. Therefore, Schottky barriers occur at the junction plane between the first n-type semiconductor layer 162 and the second n-type semiconductor layer 163, which is different from the case of the semiconductor electrode 120 in Embodiment 1.

At the junction plane between the first n-type semiconductor layer 162 and the conductor 164, carriers transfer so that the Fermi levels match each other, thereby causing bending of the band edge around the junction plane. At this time, since the Fermi level $E_{Fc}$ of the conductor 164 is higher than the Fermi level $E_{F1}$ of the first n-type semiconductor layer 162, the junction between the conductor 164 and the first n-type semiconductor layer 162 is formed by an ohmic contact, as is the case of the semiconductor electrode 120 in Embodiment 1.

In the case of the semiconductor electrode of the present comparative embodiment, Schottky barriers occur at the junction plane between the first n-type semiconductor layer 162 and the second n-type semiconductor layer 163, which is different from the case of the semiconductor electrode 120 in Embodiment 1. The Schottky barrier prevents the transfer of the electrons from the second n-type semiconductor layer 163 to the first n-type semiconductor layer 162. Accordingly, in the present comparative embodiment, the probability of the recombination between the electrons and holes generated by photoexcitation inside the second n-type semiconductor layer 163 is increased, compared to that in the photoelectrochemical cell 100 according to Embodiment 1, and the quantum efficiency of the hydrogen evolution reaction by irradiation with light is decreased.

<Comparative Embodiment 1-2>

Figure 6:
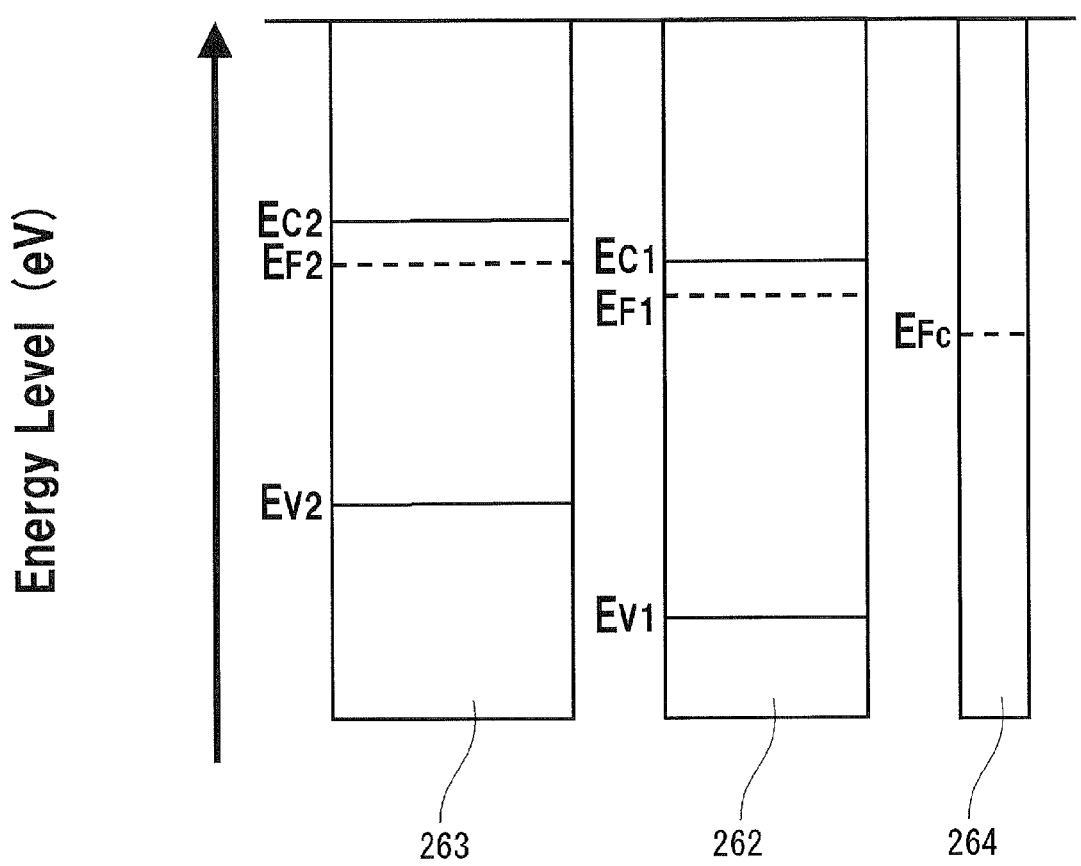
FIG. 6 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-2.
Figure 7:
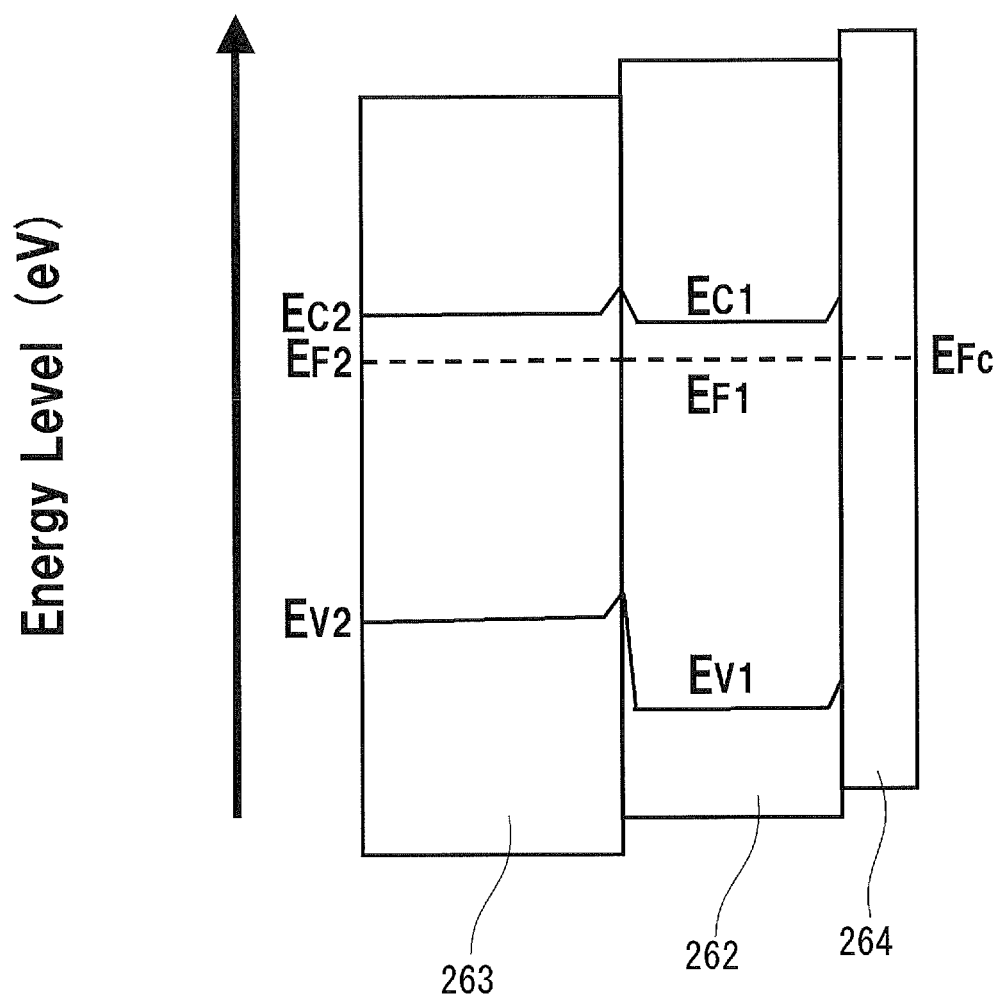
FIG. 7 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-2.

The photoelectrochemical cell according to Comparative Embodiment 1-2 is described with reference to FIGS. 6 and 7. FIG. 6 is a conceptual diagram indicating a band structure of a conductor, a first n-type semiconductor layer and a second n-type semiconductor layer, before being joined, in the present comparative embodiment. FIG. 7 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 262 disposed on the substrate, and a second n-type semiconductor layer 263 and a conductor 264 that are disposed on the first n-type semiconductor layer 262. The semiconductor electrode of the present comparative embodiment is different from the semiconductor electrode 120 of Embodiment 1 in that the Fermi level $E_{F1}$ of the first n-type semiconductor layer 262 is lower than the Fermi level $E_{F2}$ of the second n-type semiconductor layer 263, and the Fermi level $E_{Fc}$ of the conductor 264 is lower than the Fermi level $E_{F1}$ of the first n-type semiconductor layer 262, as indicated in FIG. 6.

When the conductor 264, the first n-type semiconductor layer 262 and the second n-type semiconductor layer 263 are joined to one another, carriers transfer between the first n-type semiconductor layer 262 and the second n-type semiconductor layer 263 so that the Fermi levels match each other, thereby causing bending of the band edge, at the junction plane therebetween, as indicated in FIG. 7. At this time, the band edge level $E_{C2}$ of the conduction band and the band edge level $E_{V2}$ of the valence band in the second n-type semiconductor layer 263, respectively, are higher than the band edge level $E_{C1}$ of the conduction band and the band edge level $E_{V1}$ of the valence band in the first n-type semiconductor layer 262, but the Fermi level $E_{F1}$ of the first n-type semiconductor layer 262 is lower than the Fermi level $E_{F2}$ of the second n-type semiconductor layer 263. Therefore, Schottky barriers occur at the junction plane between the first n-type semiconductor layer 262 and the second n-type semiconductor layer 263, which is different from the case of the semiconductor electrode 120 in Embodiment 1.

At the junction plane between the first n-type semiconductor layer 262 and the conductor 264, carriers transfer so that the Fermi levels match each other, thereby causing bending of the band edge around the junction plane of the first n-type semiconductor layer 262. At this time, since the Fermi level $E_{Fc}$ of the conductor 264 is lower than the Fermi level $E_{F1}$ of the first n-type semiconductor layer 262, Schottky barriers occur at the junction plane between the conductor 264 and the first n-type semiconductor layer 262.

In the case of the semiconductor electrode of the present comparative embodiment, Schottky barriers occur at the junction plane between the first n-type semiconductor layer 262 and the second n-type semiconductor layer 263, which is different from the case of the semiconductor electrode 120 in Embodiment 1. The Schottky barrier prevents the transfer of the electrons from the second n-type semiconductor layer 263 to the first n-type semiconductor layer 262. Furthermore, in the semiconductor electrode of the present comparative embodiment, Schottky barriers occur also at the junction plane between the conductor 264 and the first n-type semiconductor layer 262. The Schottky barrier prevents the transfer of the electrons from the first n-type semiconductor layer 262 to the conductor 264. Accordingly, in the photoelectrochemical cell of the present comparative embodiment, the probability of the recombination between the electrons and holes generated by photoexcitation inside the second n-type semiconductor layer is increased, compared to that in the photoelectrochemical cell 100 of Embodiment 1, and the quantum efficiency of the hydrogen evolution reaction by irradiation with light is decreased.

<Comparative Embodiment 1-3>

Figure 8:
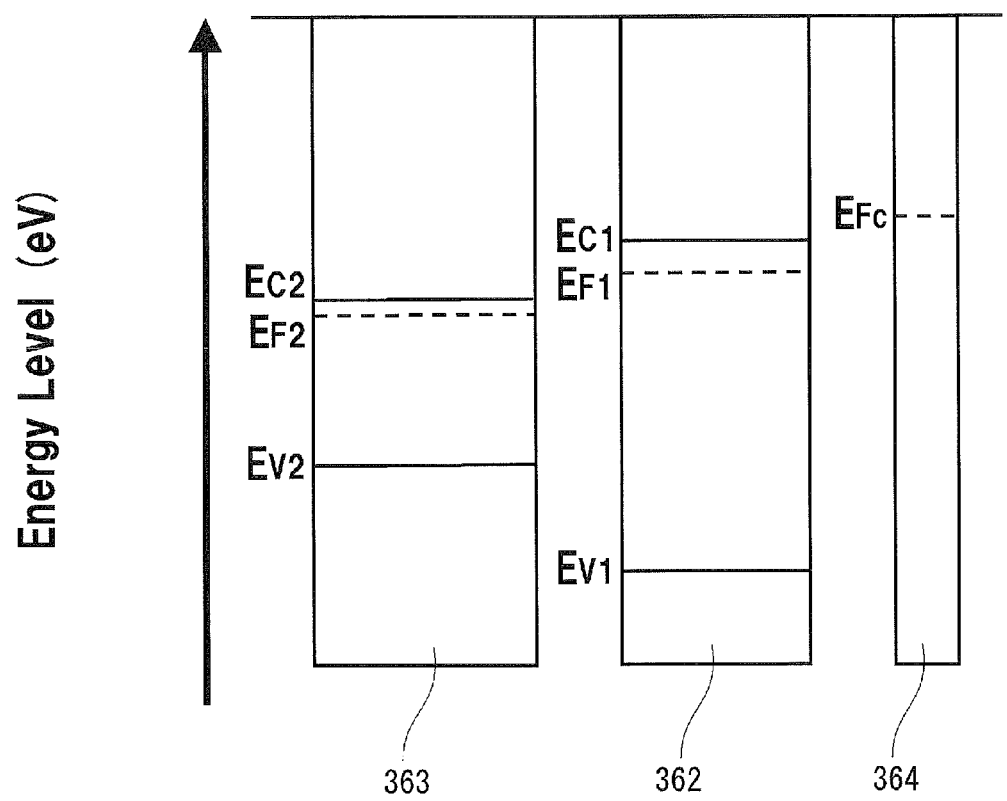
FIG. 8 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-3.
Figure 9:
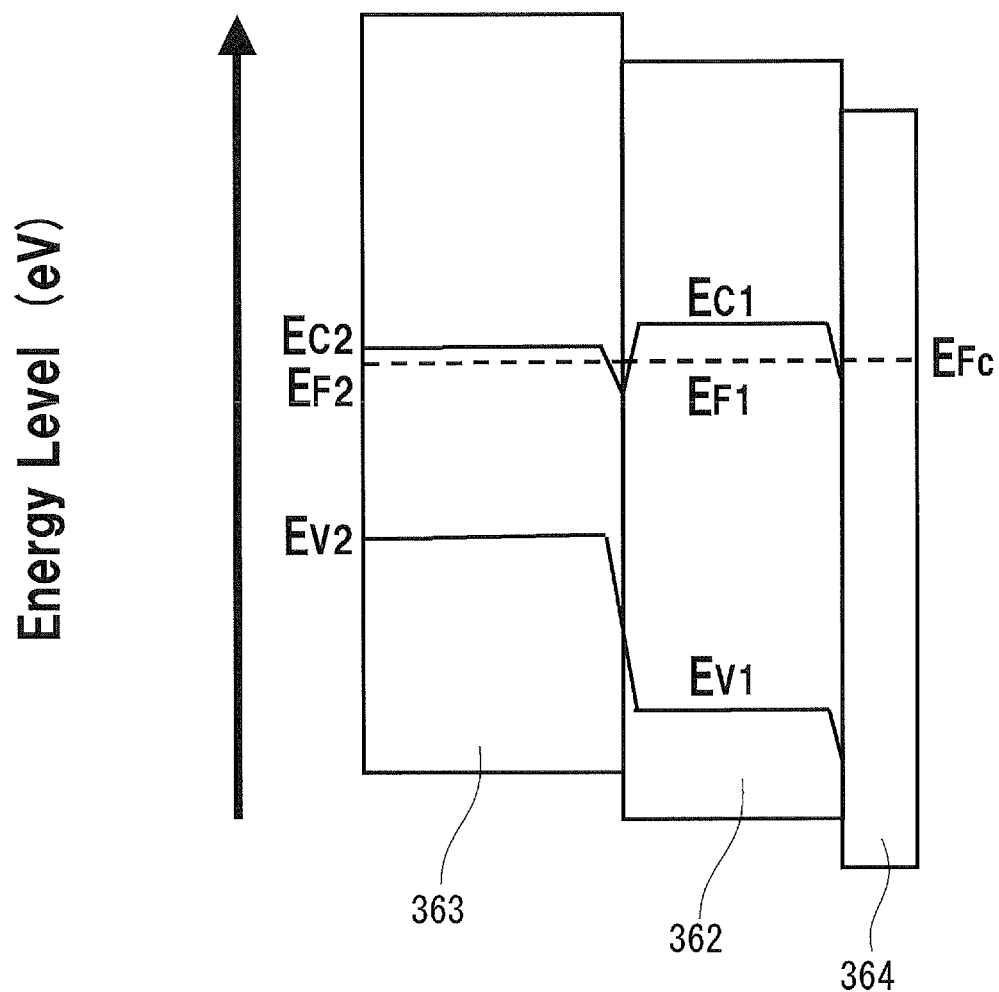
FIG. 9 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-3.

The photoelectrochemical cell according to Comparative Embodiment 1-3 is described with reference to FIGS. 8 and 9. FIG. 8 is a conceptual diagram indicating a band structure of a conductor, a first n-type semiconductor layer and a second n-type semiconductor layer, before being joined, in the present comparative embodiment. FIG. 9 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 362 disposed on the substrate, and a second n-type semiconductor layer 363 and a conductor 364 that are disposed on the first n-type semiconductor layer 362. The semiconductor electrode of the present comparative embodiment is different from the semiconductor electrode 120 of Embodiment 1 in that the band edge level $E_{C2}$ of the conduction band in the second n-type semiconductor layer 363 is lower than the band edge level $E_{C1}$ of the conduction band in the first n-type semiconductor layer 362, as indicated in FIG. 8.

Next, when the conductor 364, the first n-type semiconductor layer 362 and the second n-type semiconductor layer 363 are joined to one another, carriers transfer between the first n-type semiconductor layer 362 and the second n-type semiconductor layer 363 so that the Fermi levels match each other, thereby causing bending of the band edge, at the junction plane therebetween, as indicated in FIG. 9. At this time, the band edge level $E_{C2}$ of the conduction band in the second n-type semiconductor layer 363 is lower than the band edge level $E_{C1}$ of the conduction band in the first n-type semiconductor layer 362, and the Fermi level $E_{F1}$ of the first n-type semiconductor layer 362 is higher than the Fermi level $E_{F2}$ of the second n-type semiconductor layer 363. Therefore, the band edge of the conduction band decreases from the side of the second n-type semiconductor layer 363 toward the junction plane with the first n-type semiconductor layer 362, but increases from the junction plane toward the side of the first n-type semiconductor layer 362.

At the junction plane between the first n-type semiconductor layer 362 and the conductor 364, carriers transfer so that the Fermi levels match each other, thereby causing bending of the band edge around the junction plane of the first n-type semiconductor layer 362. At this time, since the Fermi level $E_{Fc}$ of the conductor 364 is higher than the Fermi level $E_{F1}$ of the first n-type semiconductor layer 362, the junction between the conductor 364 and the first n-type semiconductor layer 362 is formed by an ohmic contact, as is the case of the semiconductor electrode 120 in Embodiment 1.

In the case of the semiconductor electrode of the present comparative embodiment, the band edge of the conduction band increases from the junction plane between the first n-type semiconductor layer 362 and the second n-type semiconductor layer 363 toward the side of the first n-type semiconductor layer 362, which is different from the case of the semiconductor electrode 120 in Embodiment 1. Therefore, the transfer of the electrons from the second n-type semiconductor layer 363 to the first n-type semiconductor layer 362 is prevented. Accordingly, in the photoelectrochemical cell of the present comparative embodiment, the probability of the recombination between the electrons and holes generated by photoexcitation inside the second n-type semiconductor is increased, compared to that in the photoelectrochemical cell 100 of Embodiment 1, and the quantum efficiency of the hydrogen evolution reaction by irradiation with light is decreased.

<Comparative Embodiment 1-4>

Figure 10:
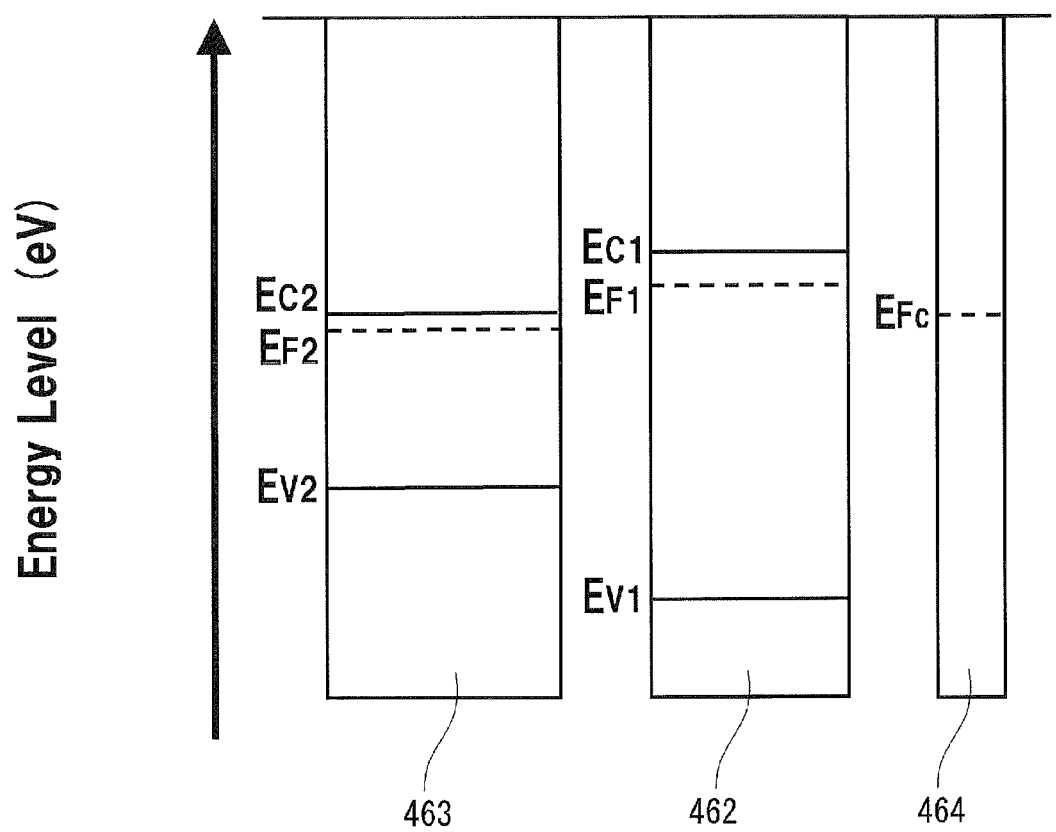
FIG. 10 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-4.
Figure 11:
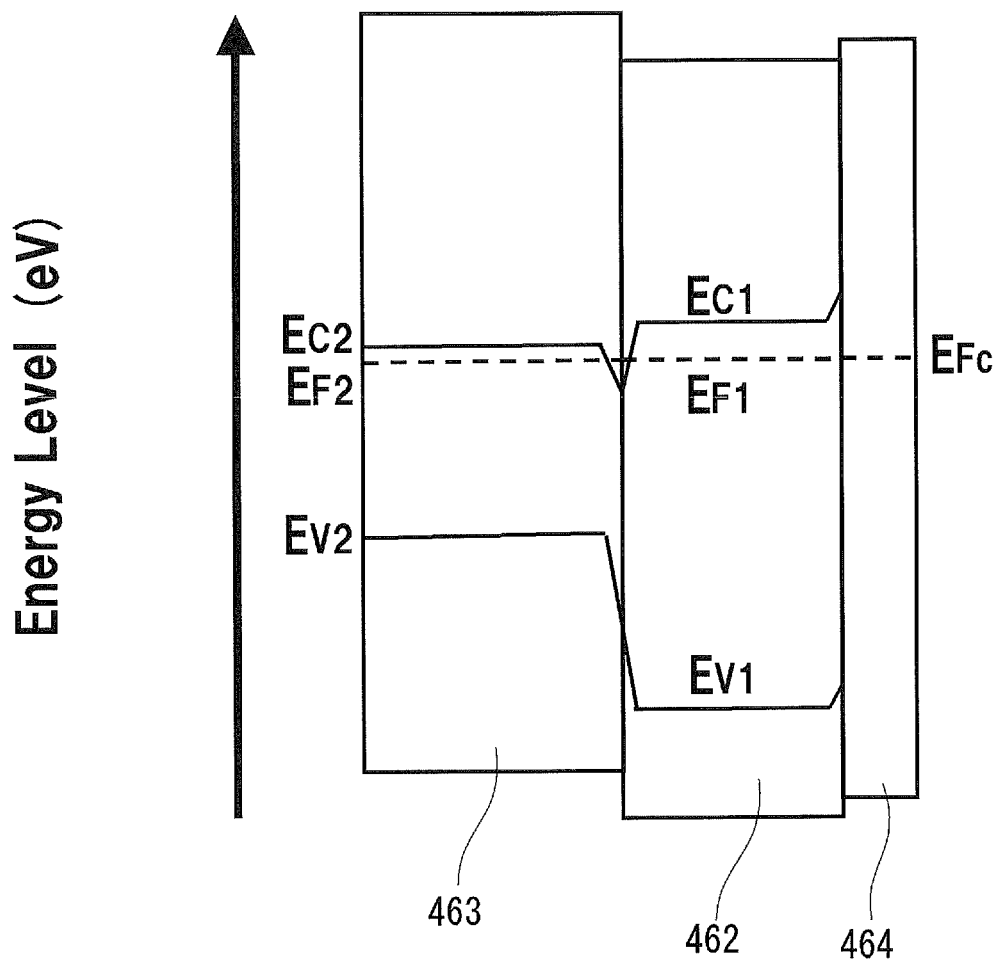
FIG. 11 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-4.

The photoelectrochemical cell according to Comparative Embodiment 1-4 is described with reference to FIGS. 10 and 11. FIG. 10 is a conceptual diagram indicating a band structure of a conductor, a first n-type semiconductor layer and a second n-type semiconductor layer, before being joined, in the present comparative embodiment. FIG. 11 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 462 disposed on the substrate, and a second n-type semiconductor layer 463 and a conductor 464 that are disposed on the first n-type semiconductor layer 462. The semiconductor electrode of the present comparative embodiment is different from the semiconductor electrode 120 of Embodiment 1 in that the band edge level $E_{C2}$ of the conduction band in the second n-type semiconductor layer 463 is lower than the band edge level $E_{C1}$ of the conduction band in the first n-type semiconductor layer 462, and the Fermi level $E_{Fc}$ of the conductor 464 is lower than the Fermi level $E_{F1}$ of the first n-type semiconductor layer 462, as indicated in FIG. 10.

Next, when the conductor 464, the first n-type semiconductor layer 462 and the second n-type semiconductor layer 463 are joined to one another, carriers transfer between the first n-type semiconductor layer 462 and the second n-type semiconductor layer 463 so that the Fermi levels match each other, thereby causing bending of the band edge, at the junction plane therebetween, as indicated in FIG. 11. At this time, the band edge level $E_{C2}$ of the conduction band in the second n-type semiconductor layer 463 is lower than the band edge level $E_{C1}$ of the conduction band in the first n-type semiconductor layer 462, and the Fermi level $E_{F1}$ of the first n-type semiconductor layer 462 is higher than the Fermi level $E_{F2}$ of the second n-type semiconductor layer 463. Therefore, the band edge of the conduction band decreases from the side of the second n-type semiconductor layer 463 toward the junction plane with the first n-type semiconductor layer 462, but increases from the junction plane toward the side of the first n-type semiconductor layer 462.

At the junction plane between the first n-type semiconductor layer 462 and the conductor 464, carriers transfer so that the Fermi levels match each other, thereby causing bending of the band edge around the junction plane of the first n-type semiconductor layer 462. At this time, since the Fermi level $E_{Fc}$ of the conductor 464 is lower than the Fermi level $E_{F1}$ of the first n-type semiconductor layer 462, the junction between the conductor 464 and the first n-type semiconductor layer 462 is formed by a Schottky contact.

In the case of the semiconductor electrode of the present comparative embodiment, the band edge of the conduction band increases from the junction plane between the first n-type semiconductor layer 462 and the second n-type semiconductor layer 463 toward the first n-type semiconductor layer 462, which is different from the case of the semiconductor electrode 120 in Embodiment 1. Therefore, the transfer of the electrons from the second n-type semiconductor layer 463 to the first n-type semiconductor layer 462 is prevented. Furthermore, Schottky barriers occur at the junction plane between the conductor 464 and the first n-type semiconductor layer 462. The Schottky barrier prevents the transfer of the electrons from the first n-type semiconductor layer 462 to the conductor 464. Accordingly, in the photoelectrochemical cell of the present comparative embodiment, the probability of the recombination between the electrons and holes generated by photoexcitation inside the second n-type semiconductor layer is increased, compared to that in the photoelectrochemical cell 100 of Embodiment 1, and the quantum efficiency of the hydrogen evolution reaction by irradiation with light is decreased.

<Comparative Embodiment 1-5>

Figure 12:
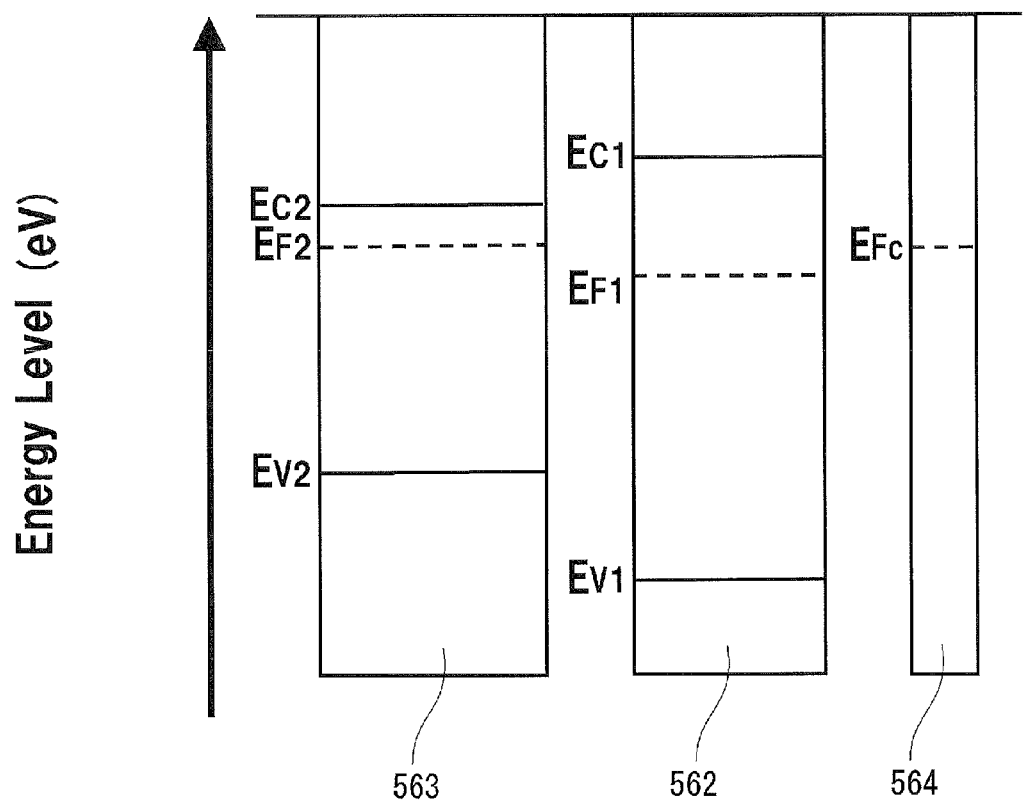
FIG. 12 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-5.
Figure 13:
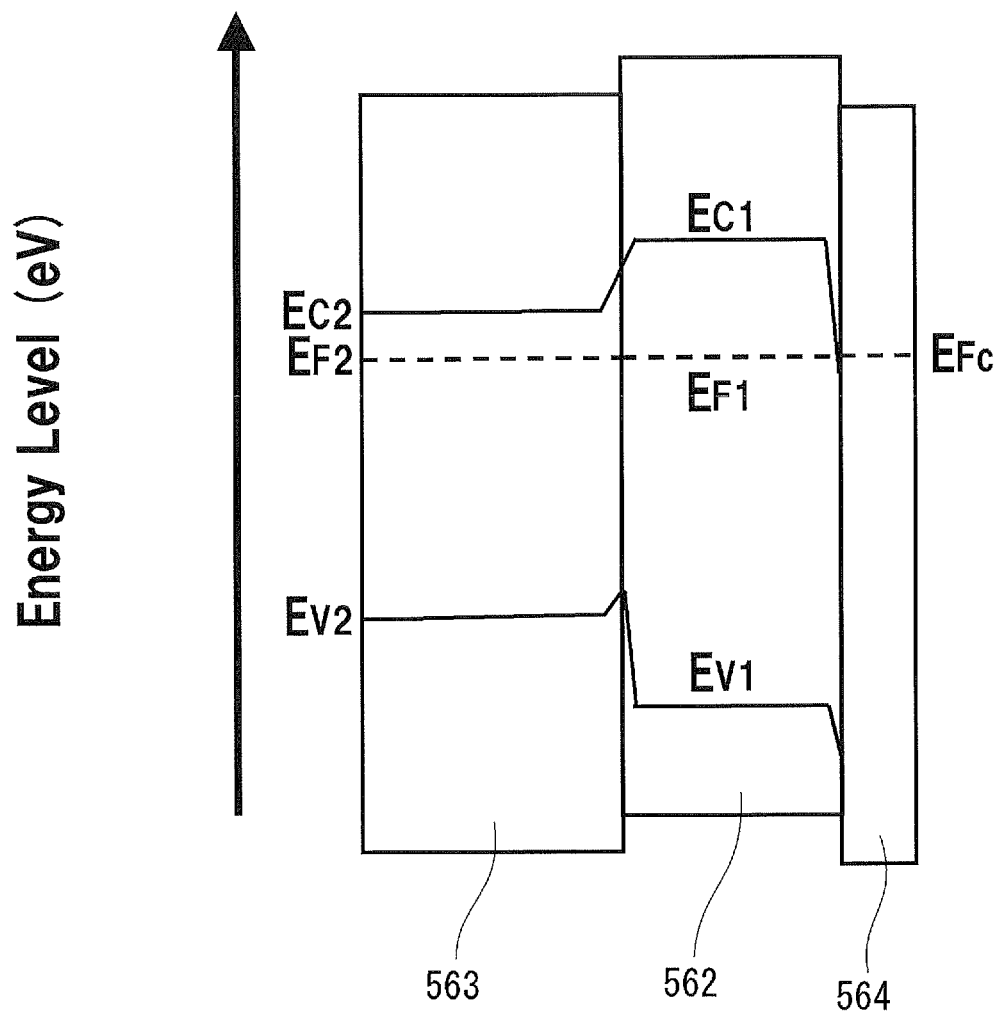
FIG. 13 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-5.

The photoelectrochemical cell according to Comparative Embodiment 1-5 is described with reference to FIGS. 12 and 13. FIG. 12 is a conceptual diagram indicating a band structure of a conductor, a first n-type semiconductor layer and a second n-type semiconductor layer, before being joined, in the present comparative embodiment. FIG. 13 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 562 disposed on the substrate, and a second n-type semiconductor layer 563 and a conductor 564 that are disposed on the first n-type semiconductor layer 562. The semiconductor electrode of the present comparative embodiment is different from the semiconductor electrode 120 of Embodiment 1 in that the band edge level $E_{C2}$ of the conduction band in the second n-type semiconductor layer 563 is lower than the band edge level $E_{C1}$ of the conduction band in the first n-type semiconductor layer 562, and the Fermi level $E_{F1}$ of the first n-type semiconductor layer 562 is lower than the Fermi level $E_{F2}$ of the second n-type semiconductor layer 563, as indicated in FIG. 12.

Next, when the conductor 564, the first n-type semiconductor layer 562 and the second n-type semiconductor layer 563 are joined to one another, carriers transfer between the first n-type semiconductor layer 562 and the second n-type semiconductor layer 563 so that the Fermi levels match each other, thereby causing bending of the band edge, at the junction plane therebetween, as indicated in FIG. 13. At this time, the band edge level $E_{C2}$ of the conduction band in the second n-type semiconductor layer 563 is lower than the band edge level $E_{C1}$ of the conduction band in the first n-type semiconductor layer 562, and the Fermi level $E_{F1}$ of the first n-type semiconductor layer 562 is lower than the Fermi level $E_{F2}$ of the second n-type semiconductor layer 563. Therefore, no Schottky barriers occur at the junction plane between the first n-type semiconductor layer 562 and the second n-type semiconductor layer 563 in the band edge of the conduction band, as is the case of the semiconductor electrode 120 in Embodiment 1. However, the band edge level $E_{C1}$ of the conduction band in the first n-type semiconductor layer 562 is higher than the band edge level $E_{C2}$ of the conduction band in the second n-type semiconductor layer 563, as indicated in FIG. 13.

At the junction plane between the first n-type semiconductor layer 562 and the conductor 564, carriers transfer so that the Fermi levels match each other, thereby causing bending of the band edge around the junction plane of the first n-type semiconductor layer 562. At this time, since the Fermi level $E_{Fc}$ of the conductor 564 is higher than the Fermi level $E_{F1}$ of the first n-type semiconductor layer 562, the junction between the conductor 564 and the first n-type semiconductor layer 562 is formed by an ohmic contact, as is the case of the semiconductor electrode 120 in Embodiment 1.

In the case of the semiconductor electrode of the present comparative embodiment, the band edge level $E_{C1}$ of the conduction band in the first n-type semiconductor layer 562 is higher than the band edge level $E_{C2}$ of the conduction band in the second n-type semiconductor layer 563, which is different from the case of the semiconductor electrode 120 in Embodiment 1. Therefore, the transfer of the electrons from the second n-type semiconductor layer 563 to the first n-type semiconductor layer 562 is prevented. Accordingly, in the photoelectrochemical cell of the present comparative embodiment, the probability of the recombination between the electrons and holes generated by photoexcitation inside the second n-type semiconductor layer is increased, compared to that in the photoelectrochemical cell 100 of Embodiment 1, and the quantum efficiency of the hydrogen evolution reaction by irradiation with light is decreased.

<Comparative Embodiment 1-6>

Figure 14:
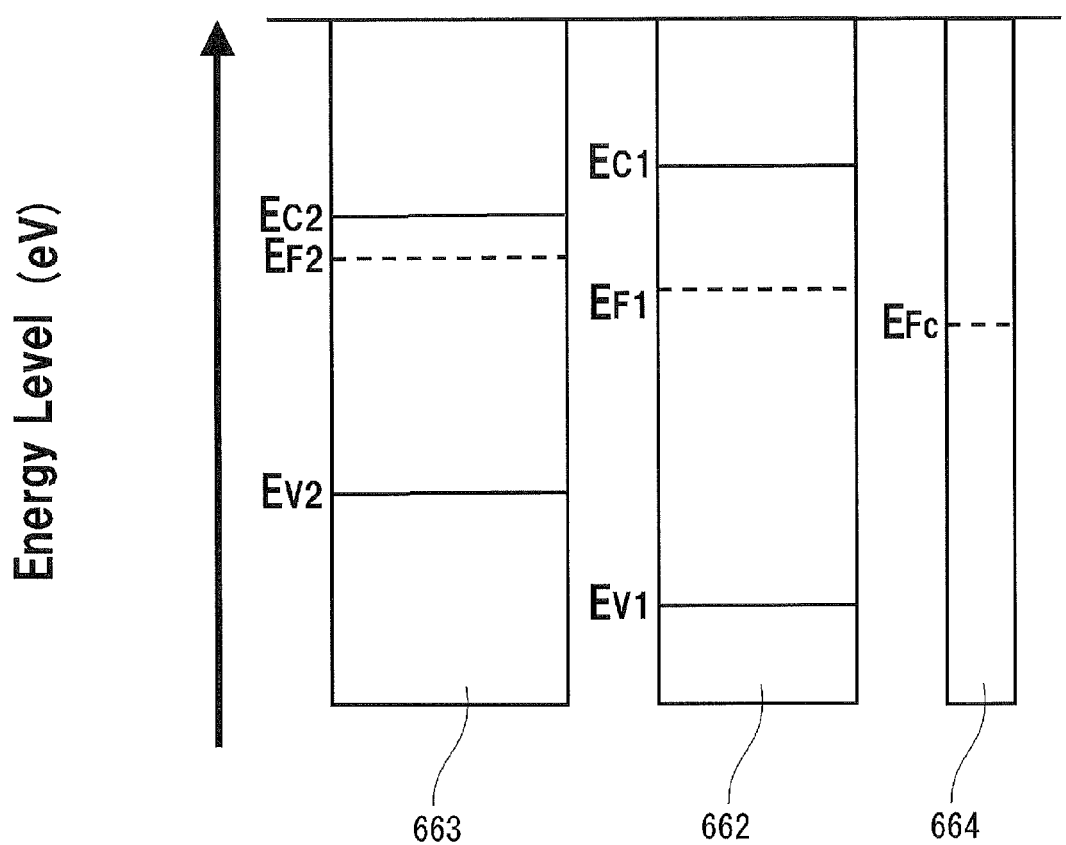
FIG. 14 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-6.
Figure 15:
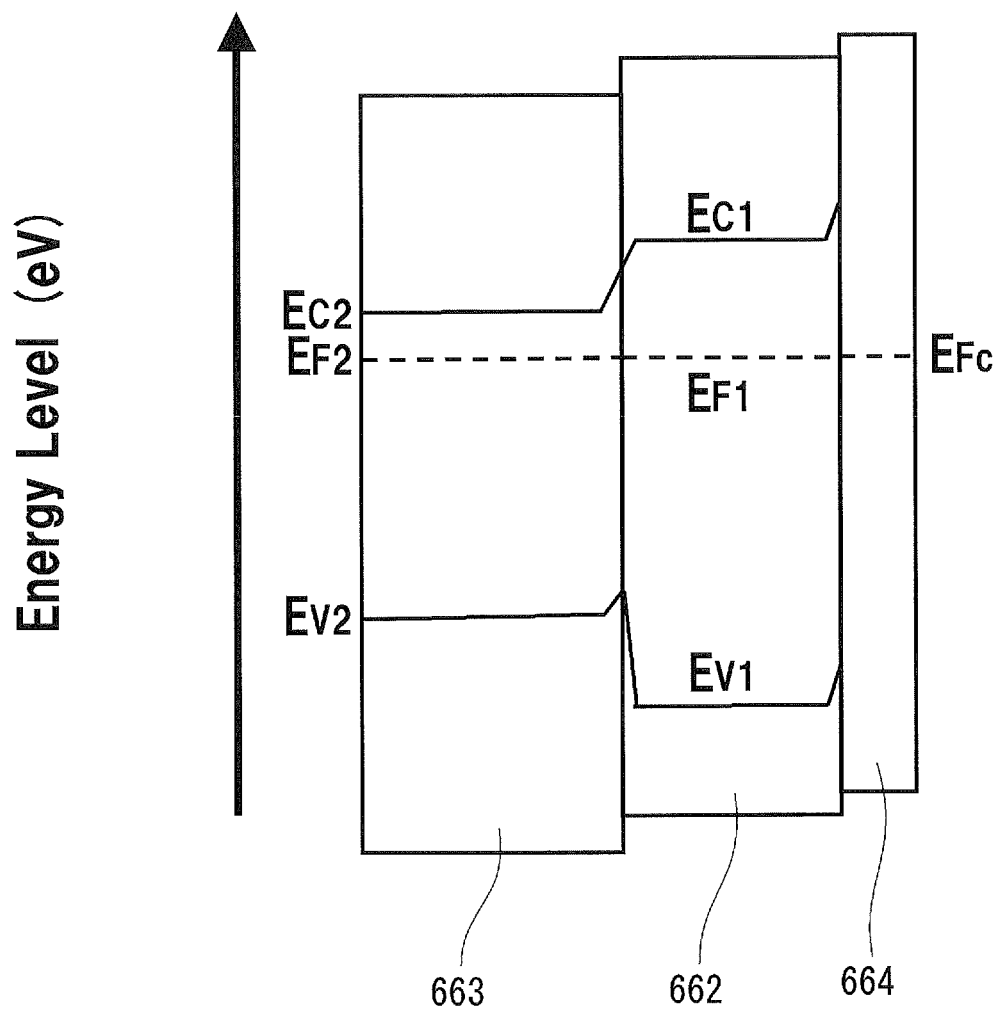
FIG. 15 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-6.

The photoelectrochemical cell according to Comparative Embodiment 1-6 is described with reference to FIGS. 14 and 15. FIG. 14 is a conceptual diagram indicating a band structure of a conductor, a first n-type semiconductor layer and a second n-type semiconductor layer, before being joined, in the present comparative embodiment. FIG. 15 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 662 disposed on the substrate, and a second n-type semiconductor layer 663 and a conductor 664 that are disposed on the first n-type semiconductor layer 662. The semiconductor electrode of the present comparative embodiment is different from the semiconductor electrode 120 of Embodiment 1 in that the band edge level $E_{C2}$ of the conduction band in the second n-type semiconductor layer 663 is lower than the band edge level $E_{C1}$ of the conduction band in the first n-type semiconductor layer 662, the Fermi level $E_{F1}$ of the first n-type semiconductor layer 662 is lower than the Fermi level $E_{F2}$ of the second n-type semiconductor layer 663, and the Fermi level $E_{Fc}$ of the conductor 664 is lower than the Fermi level $E_{F1}$ of the first n-type semiconductor layer 662, as indicated in FIG. 14.

Next, when the conductor 664, the first n-type semiconductor layer 662 and the second n-type semiconductor layer 663 are joined to one another, carriers transfer between the first n-type semiconductor layer 662 and the second n-type semiconductor layer 663 so that the Fermi levels match each other, thereby causing bending of the band edge, at the junction plane therebetween, as indicated in FIG. 15. At this time, the band edge level $E_{C2}$ of the conduction band in the second n-type semiconductor layer 663 is lower than the band edge level $E_{C1}$ of the conduction band in the first n-type semiconductor layer 662, and the Fermi level $E_{F1}$ of the first n-type semiconductor layer 662 is lower than the Fermi level $E_{F2}$ of the second n-type semiconductor layer 663. Therefore, no Schottky barriers occur at the junction plane between the first n-type semiconductor layer 662 and the second n-type semiconductor layer 663 in the band edge of the conduction band, as is the case of the semiconductor electrode 120 in Embodiment 1. However, the band edge level $E_{C1}$ of the conduction band in the first n-type semiconductor layer 662 is higher than the band edge level $E_{C2}$ of the conduction band in the second n-type semiconductor layer 663, as indicated in FIG. 15, which is different from the case of the semiconductor electrode 120 in Embodiment 1.

At the junction plane between the first n-type semiconductor layer 662 and the conductor 664, carriers transfer so that the Fermi levels match each other. This causes bending of the band edge around the junction plane of the first n-type semiconductor layer 662. At this time, since the Fermi level $E_{Fc}$ of the conductor 664 is lower than the Fermi level $E_{F1}$ of the first n-type semiconductor layer 662, Schottky barriers occur at the junction plane between the conductor 664 and the first n-type semiconductor layer 662.

In the case of the semiconductor electrode of the present comparative embodiment, the band edge level $E_{C1}$ of the conduction band in the first n-type semiconductor layer 662 is higher than the band edge level $E_{C2}$ of the conduction band in the second n-type semiconductor layer 663, which is different from the case of the semiconductor electrode 120 in Embodiment 1. Therefore, the transfer of the electrons from the second n-type semiconductor layer 663 to the first n-type semiconductor layer 662 is prevented. Further, Schottky barriers occur at the junction plane between the conductor 664 and the first n-type semiconductor layer 662, which is different from the case of the semiconductor electrode 120 in Embodiment 1. The Schottky barrier prevents the transfer of the electrons from the first n-type semiconductor layer 662 to the conductor 664. Accordingly, in the photoelectrochemical cell of the present comparative embodiment, the probability of the recombination between the electrons and holes generated by photoexcitation inside the second n-type semiconductor layer 663 is increased, compared to that in the photoelectrochemical cell 100 of Embodiment 1, and the quantum efficiency of the hydrogen evolution reaction by irradiation with light is decreased.

<Comparative Embodiment 1-7>

Figure 16:
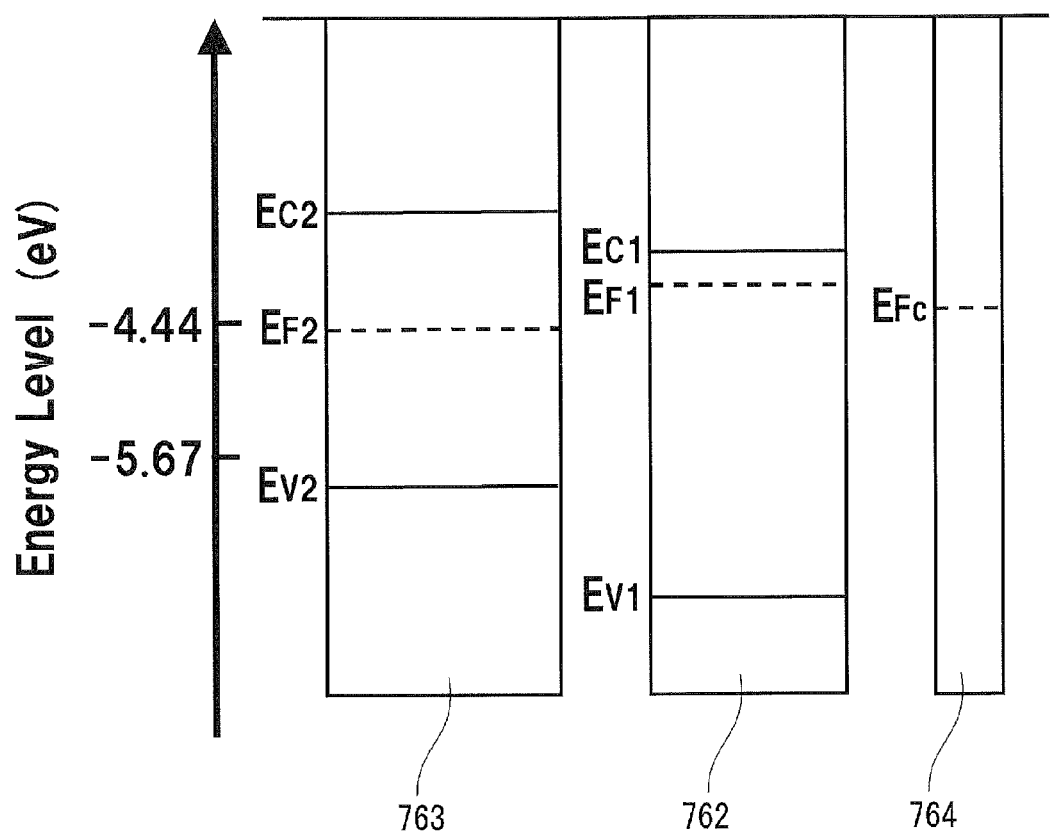
FIG. 16 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 1-7.
Figure 17:
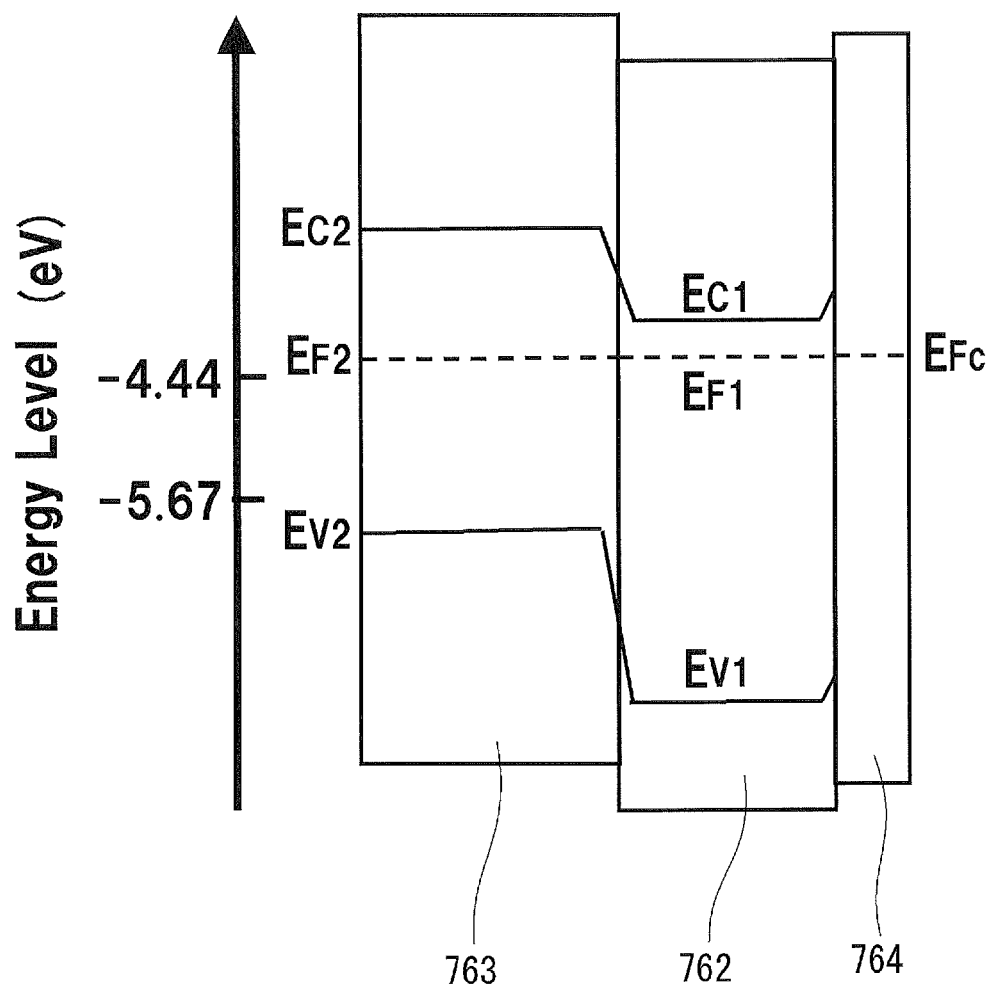
FIG. 17 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 1-7.

The photoelectrochemical cell according to Comparative Embodiment 1-7 is described with reference to FIGS. 16 and 17. FIG. 16 is a conceptual diagram indicating a band structure of a conductor, a first n-type semiconductor layer and a second n-type semiconductor layer, before being joined, in the present comparative embodiment. FIG. 17 is a conceptual diagram indicating a band structure of the conductor, the first n-type semiconductor layer and the second n-type semiconductor layer, after being joined, in the present comparative embodiment.

The semiconductor electrode of the present comparative embodiment includes a substrate, a first n-type semiconductor layer 762 disposed on the substrate, and a second n-type semiconductor layer 763 and a conductor 764 that are disposed on the first n-type semiconductor layer 762. The semiconductor electrode of the present comparative embodiment is different from the semiconductor electrode 120 of Embodiment 1 in that the Fermi level $E_{Fc}$ of the conductor 764 is lower than the Fermi level $E_{F1}$ of the first n-type semiconductor layer 762, as indicated in FIG. 16.

When the conductor 764, the first n-type semiconductor layer 762 and the second n-type semiconductor layer 763 are joined to one another, carriers transfer between the first n-type semiconductor layer 762 and the second n-type semiconductor layer 763 so that the Fermi levels match each other, thereby causing bending of the band edge, at the junction plane therebetween, as indicated in FIG. 17. At this time, the band edge level $E_{C2}$ of the conduction band and the band edge level $E_{V2}$ of the valence band in the second n-type semiconductor layer 763, respectively, are higher than the band edge level $E_{C1}$ of the conduction band and the band edge level $E_{V1}$ of the valence band in the first n-type semiconductor layer 762, and the Fermi level $E_{F1}$ of the first n-type semiconductor layer 762 is higher than the Fermi level $E_{F2}$ of the second n-type semiconductor layer 763. Therefore, no Schottky barriers occur at the junction plane between the first n-type semiconductor layer 762 and the second n-type semiconductor layer 763.

At the junction plane between the first n-type semiconductor layer 762 and the conductor 764, carriers transfer so that the Fermi levels match each other, thereby causing bending of the band edge around the junction plane of the first n-type semiconductor layer 762. At this time, since the Fermi level $E_{Fc}$ of the conductor 764 is lower than the Fermi level $E_{F1}$ of the first n-type semiconductor layer 762, Schottky barriers occur at the junction plane between the conductor 764 and the first n-type semiconductor layer 762.

In the case of the semiconductor electrode of the present comparative embodiment, Schottky barriers occur at the junction plane between the conductor 764 and the first n-type semiconductor layer 762, which is different from the semiconductor electrode 120 in Embodiment 1. The Schottky barrier prevents the transfer of the electrons from the first n-type semiconductor layer 762 to the conductor 764. Accordingly, in the photoelectrochemical cell of the present comparative embodiment, the probability of the recombination between the electrons and holes generated by photoexcitation inside the second n-type semiconductor layer 762 is increased, compared to that in the photoelectrochemical cell 100 of Embodiment 1, and the quantum efficiency of the hydrogen evolution reaction by irradiation with light is decreased.

(Embodiment 2)

Figure 18:
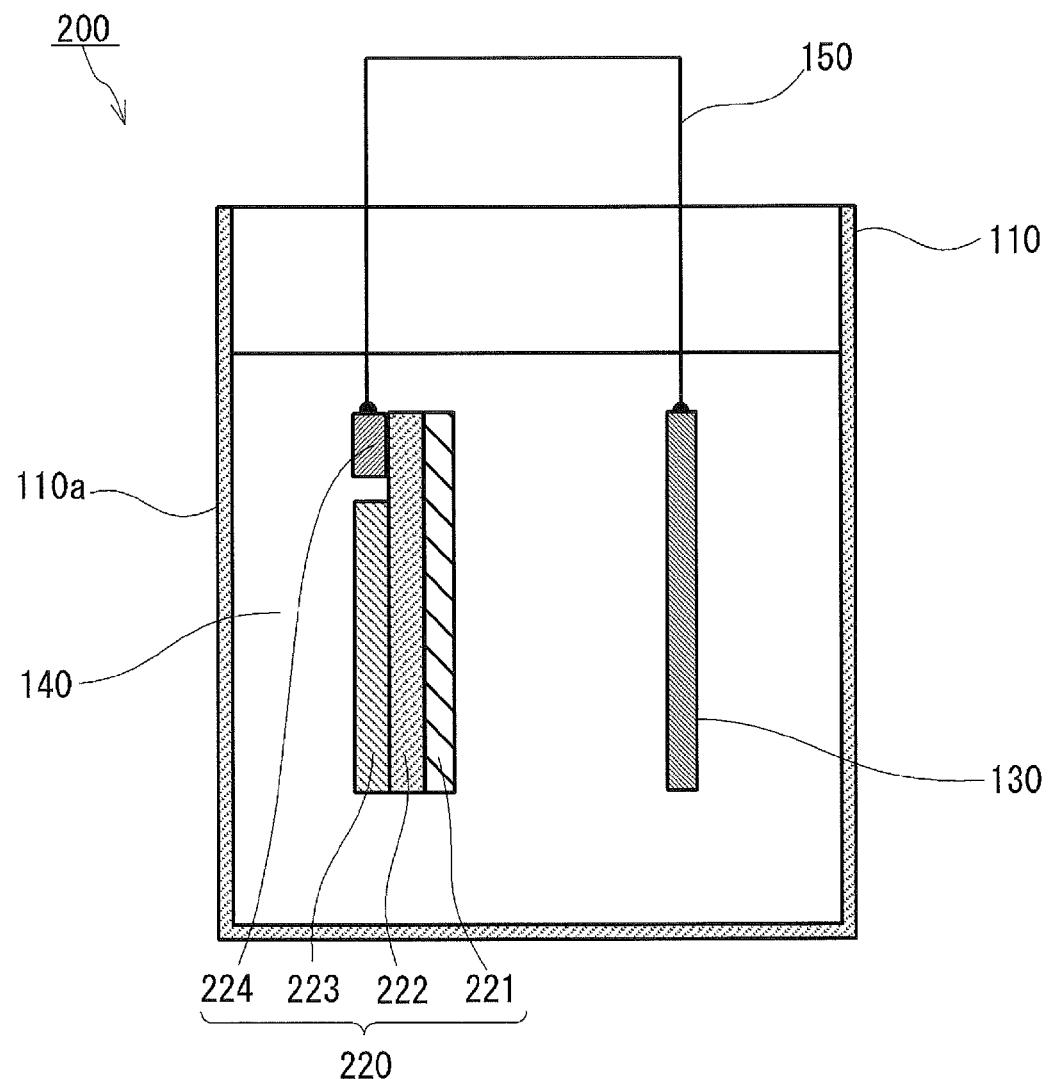
FIG. 18 is a schematic view illustrating a configuration of the photoelectrochemical cell of Embodiment 2 of the present invention.
Figure 19:
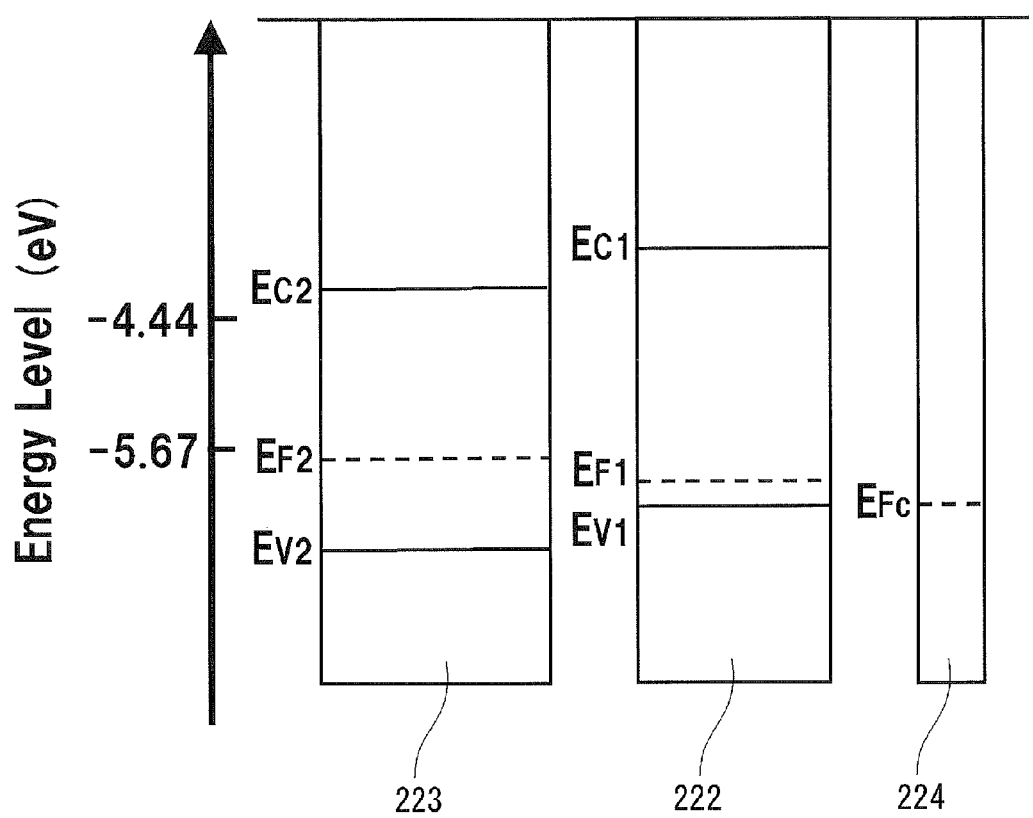
FIG. 19 is a conceptual diagram indicating a band structure of a conductor, a first p-type semiconductor layer and a second p-type semiconductor layer, before being joined, which constitute a semiconductor electrode in the photoelectrochemical cell of Embodiment 2 of the present invention.
Figure 20:
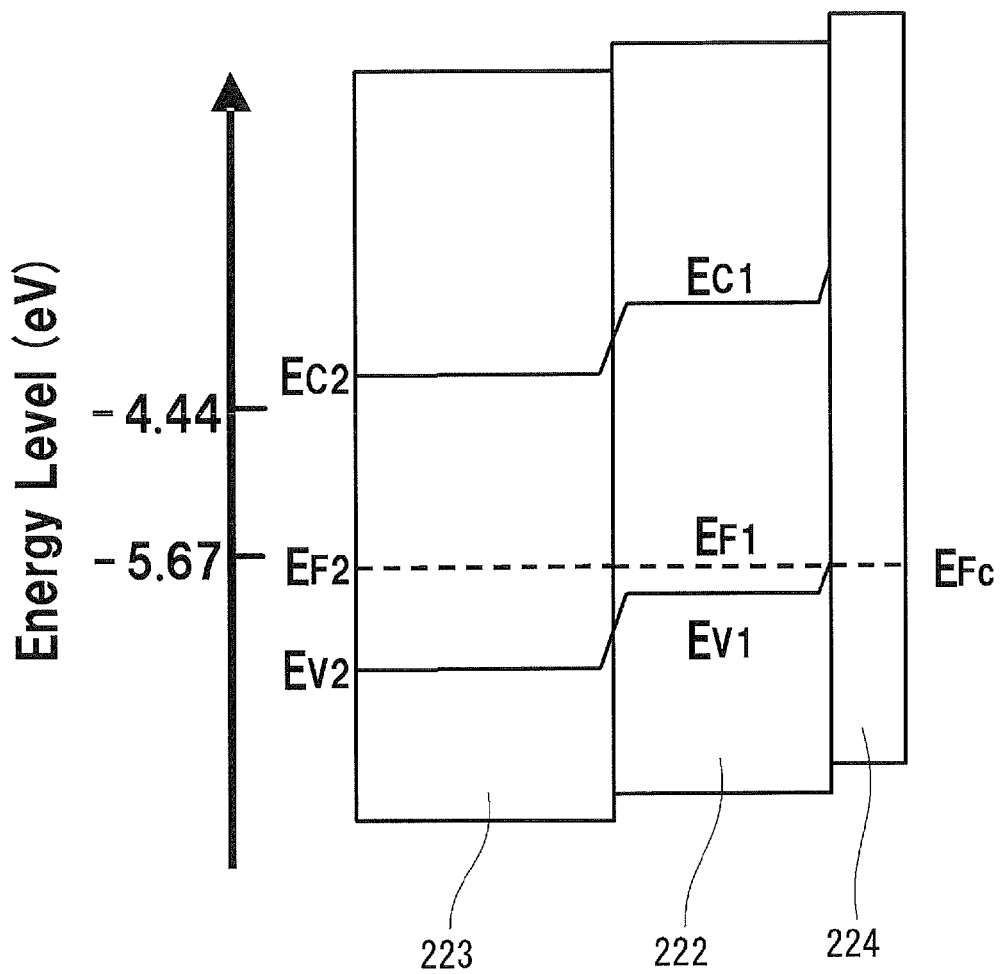
FIG. 20 is a conceptual diagram indicating a band structure of the conductor, the first p-type semiconductor layer and the second p-type semiconductor layer, after being joined, which constitute the semiconductor electrode in the photoelectrochemical cell of Embodiment 2 of the present invention.

The configuration of the photoelectrochemical cell according to Embodiment 2 of the present invention is described with reference to FIG. 18 to FIG. 20. FIG. 18 is a schematic view illustrating the configuration of the photoelectrochemical cell of the present embodiment. FIG. 19 is a conceptual diagram indicating a band structure of a conductor, a first p-type semiconductor layer and a second p-type semiconductor layer, before being joined, which constitute a semiconductor electrode in the photoelectrochemical cell of the present embodiment. FIG. 20 is a conceptual diagram indicating a band structure of the conductor, the first p-type semiconductor layer and the second p-type semiconductor layer, after being joined, which constitute the semiconductor electrode in the photoelectrochemical cell of the present embodiment.

As indicated in FIG. 18, a photoelectrochemical cell 200 of the present embodiment has the same configuration as that of the photoelectrochemical cell 100 of Embodiment 1 except that a semiconductor electrode 220 has a different configuration from that of the semiconductor electrode 120 of Embodiment 1. Accordingly, only the semiconductor electrode 220 is described in the present embodiment. The same components as those in the photoelectrochemical cell 100 of Embodiment 1 are indicated with identical numerals, and the descriptions thereof are omitted.

The semiconductor electrode 220 is disposed in the same manner as in Embodiment 1 so that the surface thereof is in contact with the electrolyte 140. The semiconductor electrode 220 includes a substrate 221, a first p-type semiconductor layer 222 disposed on the substrate 221, and a second p-type semiconductor layer 223 and a conductor 224 disposed apart from each other on the first p-type semiconductor layer 222. The second p-type semiconductor layer 223 faces the light incident portion 110a of the container 110.

The conductor 224 of the semiconductor electrode 220 is connected electrically to the counter electrode 130 by the conducting wire 150.

Next, the operation of the photoelectrochemical cell 200 of the present embodiment is described.

When the second p-type semiconductor layer 223 of the semiconductor electrode 220 disposed inside the container 110 is irradiated with sunlight from the light incident portion 110a of the container 110 in the photoelectrochemical cell 200, electrons are generated in the conduction band and holes are generated in the valence band in the second p-type semiconductor layer 223. The holes thus generated transfer to the conductor 224 along the bending of the band edge of the valence band at the interface between the second p-type semiconductor layer 223 and the first p-type semiconductor layer 222 and at the interface between the first p-type semiconductor layer 222 and the conductor 224. The holes that have transferred to the conductor 224 transfer toward the side of the counter electrode 130 connected electrically to the semiconductor electrode 220 through the conducting wire 150. Thus, oxygen is generated due to decomposition of water on the surface of the counter electrode 130 according to the above reaction formula (1). On the other hand, the electrons transfer toward the surface side of the second p-type semiconductor layer 223 (the side of the interface with the electrolyte 140). Thus, hydrogen is generated on the surface of the second p-type semiconductor layer 223 according to the above reaction formula (2).

As is described in detail later, since no Schottky barriers occur at the junction plane between the first p-type semiconductor layer 222 and the second p-type semiconductor layer 223, the holes can transfer from the second p-type semiconductor layer 223 to the first p-type semiconductor layer 222 without being prevented. Furthermore, since no Schottky barriers occur also at the junction plane between the conductor 224 and the first p-type semiconductor layer 222, the holes can transfer from the first p-type semiconductor layer 222 to the conductor 224 without being prevented. Accordingly, the probability of the recombination between the electrons and holes generated by photoexcitation inside the second p-type semiconductor layer 223 is reduced. Thus, according to the photoelectrochemical cell 200 in the present embodiment, it is possible to improve the quantum efficiency of the hydrogen evolution reaction by irradiation with light.

Next, the band structure of the conductor 224, the first p-type semiconductor layer 222 and the second p-type semiconductor layer 223 in the semiconductor electrode 220 is described.

As indicated in FIG. 19, the band edge level $E_{C2}$ of the conduction band and the band edge level $E_{V2}$ of the valence band in the second p-type semiconductor layer 223, respectively, are lower than the band edge level $E_{C1}$ of the conduction band and the band edge level $E_{V1}$ of the valence band in the first p-type semiconductor layer 222.

Moreover, the Fermi level $E_{F1}$ of the first p-type semiconductor layer 222 is lower than the Fermi level $E_{F2}$ of the second p-type semiconductor layer 223, and the Fermi level $E_{Fc}$ of the conductor 224 is lower than the Fermi level $E_{F1}$ of the first p-type semiconductor layer 222.

Next, when the conductor 224, the first p-type semiconductor layer 222 and the second p-type semiconductor layer 223 are joined to one another, carriers transfer between the first p-type semiconductor layer 222 and the second p-type semiconductor layer 223 so that the Fermi levels match each other, thereby causing bending of the band edge, at the junction plane therebetween, as indicated in FIG. 20. The band edge level $E_{C2}$ of the conduction band and the band edge level $E_{V2}$ of the valence band in the second p-type semiconductor layer 223, respectively, are lower than the band edge level $E_{C1}$ of the conduction band and the band edge level $E_{V1}$ of the valence band in the first p-type semiconductor layer 222, and the Fermi level $E_{F1}$ of the first p-type semiconductor layer 222 is lower than the Fermi level $E_{F2}$ of the second p-type semiconductor layer 223. Therefore, no Schottky barriers occur at the junction plane between the first p-type semiconductor layer 222 and the second p-type semiconductor layer 223.

At the junction plane between the first p-type semiconductor layer 222 and the conductor 224, carriers transfer so that the Fermi levels match each other, thereby causing bending of the band edge around the junction plane of the first p-type semiconductor layer 222. Since the Fermi level $E_{Fc}$ of the conductor 224 is lower than the Fermi level $E_{F1}$ of the first p-type semiconductor layer 222, the junction between the conductor 224 and the first p-type semiconductor layer 222 is formed by an ohmic contact.

When the above-mentioned semiconductor electrode 220 is made to be in contact with the electrolyte 140, the band edge level $E_{C2}$ of the conduction band and the band edge level $E_{V2}$ of the valence band around the surface of the second p-type semiconductor layer 223 are lowered at the interface between the second p-type semiconductor layer 223 and the electrolyte 140. Thus, a space charge layer occurs around the surface of the second p-type semiconductor layer 223.

As a comparative embodiment, an embodiment having a band edge level of the conduction band in the second p-type semiconductor layer higher than the band edge level of the conduction band in the first p-type semiconductor layer is assumed. In this case, a square well potential is developed in the band edge level of the conduction band inside the second p-type semiconductor layer due to the bending of the band edge of the conduction band around the surface of the second p-type semiconductor layer and the difference in the band edge levels of the conduction band between the first p-type semiconductor layer and the second p-type semiconductor layer. This square well potential causes the electrons that have been generated inside the second p-type semiconductor layer by photoexcitation to transfer separately in the interface direction with the electrolyte and the interface direction with the first p-type semiconductor layer.

In contrast, in the photoelectrochemical cell 200 of the present embodiment, since the band edge level $E_{C2}$ of the conduction band in the second p-type semiconductor layer 223 is set lower than the band edge level $E_{C1}$ of the conduction band in the first p-type semiconductor layer 222, no square well potential as mentioned above occurs in the band edge level of the conduction band inside the second p-type semiconductor layer 223. Therefore, the electrons inside the second p-type semiconductor layer 223 transfer toward the interface direction with the electrolyte 140, so that the efficiency of charge separation is improved significantly.

Further, as another comparative embodiment, an embodiment having a band edge level of the valence band in the second p-type semiconductor layer higher than the band edge level of the valence band in the first p-type semiconductor layer is assumed. In this case, a square well potential is developed in the band edge level of the valence band inside the second p-type semiconductor layer due to the bending of the band edge of the valence band around the surface of the second p-type semiconductor layer and the difference in the band edge levels of the valence band between the first p-type semiconductor layer and the second p-type semiconductor layer. This square well potential causes the holes that have been generated by photoexcitation inside the second p-type semiconductor layer to be accumulated inside the second p-type semiconductor layer.

In contrast, in the photoelectrochemical cell 200 of the present embodiment, since the band edge level $E_{V2}$ of the valence band in the second p-type semiconductor layer 223 is set lower than the band edge level $E_{V1}$ of the valence band in the first p-type semiconductor layer 222, no square well potential as mentioned above occurs in the band edge level of the valence band inside the second p-type semiconductor layer 223. Therefore, the holes are not accumulated inside the second p-type semiconductor layer 223 and can transfer toward the interface direction with the first p-type semiconductor layer 222, so that the efficiency of charge separation is improved significantly.

Further, in the photoelectrochemical cell 200 of the present embodiment, the Fermi level $E_{F1}$ of the first p-type semiconductor layer 222 is set lower than the Fermi level $E_{F2}$ of the second p-type semiconductor layer 223, in addition to the band edge levels of the conduction band and the band edge level of the valence band inside the first p-type semiconductor layer 222 and the second p-type semiconductor layer 223 being set as mentioned above. This configuration causes band bending but no Schottky barriers at the interface between the first p-type semiconductor layer 222 and the second p-type semiconductor layer 223. As a result, among the electrons and holes generated by photoexcitation inside the second p-type semiconductor layer 223, the electrons transfer in the conduction band toward the interface direction with the electrolyte 140, and the holes transfer to the valence band of the first p-type semiconductor layer 222. That is, an efficient charge separation between the electrons and holes is possible without being prevented by Schottky barriers. This reduces the probability of the recombination between the electrons and holes generated by photoexcitation inside the second p-type semiconductor layer 223, therefore improving the quantum efficiency of the hydrogen evolution reaction by irradiation with light.

Further, in the photoelectrochemical cell 200 of the present embodiment, the Fermi level $E_{Fc}$ of the conductor 224 is set lower than the Fermi level $E_{F1}$ of the first p-type semiconductor layer 222. This configuration causes no Schottky barriers also at the junction plane between the conductor 224 and the first p-type semiconductor layer 222. Therefore, the holes can transfer from the first p-type semiconductor layer 222 to the conductor 224 without being prevented by Schottky barriers. This further reduces the probability of the recombination between the electrons and holes generated by photoexcitation inside the second p-type semiconductor layer 223, therefore further improving the quantum efficiency of the hydrogen evolution reaction by irradiation with light.

In the present embodiment, when the semiconductor electrode 220 is in contact with the electrolyte 140 at a pH of 0 and a temperature of 25° C., the Fermi level $E_{F1}$ of the first p-type semiconductor layer 222 is −5.67 eV or less, and the band edge level $E_{C2}$ of the conduction band in the second p-type semiconductor layer 223 is −4.44 eV or more. When the semiconductor electrode 220 satisfies such energy levels, the Fermi level $E_{Fc}$ of the conductor 224 in contact with the first p-type semiconductor layer 222 is allowed to be −5.67 eV or less. This value of −5.67 eV is the oxidation reduction potential of water. Thus, water is oxidized efficiently on the surface of the counter electrode 130 that is connected electrically to the conductor 224, and therefore oxygen can be generated efficiently.

The band edge level $E_{C2}$ of the conduction band in the second p-type semiconductor layer 223 is allowed to be −4.44 eV or more. This value of −4.44 eV is the oxidation reduction potential of hydrogen. Thus, hydrogen ions are reduced efficiently on the surface of the second p-type semiconductor layer 223, and therefore hydrogen can be generated efficiently.

As described above, when the semiconductor electrode 220 is in contact with the electrolyte 140 at a pH of 0 and a temperature of 25° C., water can be decomposed efficiently by setting the Fermi level $E_{F1}$ of the first p-type semiconductor layer 222 to −5.67 eV or less, and the band edge level $E_{C2}$ of the conduction band in the second p-type semiconductor layer 223 to −4.44 eV or more.

It should be noted that although the semiconductor electrode 220 that satisfies such energy levels as mentioned above is exemplified in the present embodiment, the Fermi level $E_{F1}$ of the first p-type semiconductor layer 222 may exceed −5.67 eV, and the band edge level $E_{C2}$ of the conduction band in the second p-type semiconductor layer 223 may be less than −4.44 eV, for example. Also in such a case, it is possible to generate hydrogen and oxygen.

Here, the Fermi level and the potential (band edge level) at the top of the valence band in each of the first p-type semiconductor layer 222 and the second p-type semiconductor layer 223 can be calculated using the flat band potential and carrier concentration. The flat band potential and carrier concentration of a semiconductor can be determined from the Mott-Schottky plot obtained by measurement using a semiconductor that is a measurement object as an electrode.

Further, the Fermi level of each of the first p-type semiconductor layer 222 and the second p-type semiconductor layer 223 in the state of being in contact with the electrolyte 140 at a pH of 0 and a temperature of 25° C. can be determined by measurement of the Mott-Schottky plot using a semiconductor that is a measurement object as an electrode in the state where the semiconductor electrode is in contact with an electrolyte at a pH of 0 and a temperature of 25° C.

The potential (band edge level) at the bottom of the conduction band in each of the first p-type semiconductor layer 222 and the second p-type semiconductor layer 223 can be calculated using the band gap and the potential (band edge level) at the top of the valence band in each of the first p-type semiconductor layer 222 and the second p-type semiconductor layer 223 calculated by the above-mentioned method. Here, the band gap of each of the first p-type semiconductor layer 222 and the second p-type semiconductor layer 223 can be obtained from the optical absorption edge to be observed in the measurement of the light absorption spectrum of a semiconductor that is the object of the measurement.

The Fermi level of the conductor 224 can be obtained in the same manner as in Embodiment 1.

Next, the materials of the first p-type semiconductor layer 222 and the second p-type semiconductor layer 223 in the present embodiment each are described.

Preferably, the first p-type semiconductor layer 222 is formed of p-type gallium nitride (p-GaN). P—GaN can achieve a Fermi level of −5.67 eV or less in the state of being in contact with the electrolyte at a pH of 0 and a temperature of 25° C. Thus, a particularly high quantum efficiency can be obtained for the water-splitting reaction. Furthermore, since p-GaN has a low sheet resistance, electrons can be injected into the first p-type semiconductor layer 222 through the conductor 224 disposed on the p-GaN. Moreover, p-GaN allows the first p-type semiconductor layer 222 to achieve high durability.

Preferably, the second p-type semiconductor layer 223 is formed of a p-type group III nitride semiconductor containing, as group III elements, gallium and at least one element selected from the group consisting of indium and aluminum. More specifically, the second p-type semiconductor layer 223 preferably is p-type gallium nitride-indium mixed crystal (n-GaInN), p-type gallium nitride-aluminum mixed crystal (n-GaAlN), or p-type gallium nitride-indium-aluminum mixed crystal (n-GaInAlN). These p-type group III nitride semiconductors allow the second p-type semiconductor layer 223 to achieve a band edge level of the conduction band of −4.44 eV or more in the state of being in contact with the electrolyte at a pH of 0 and a temperature of 25° C. Thus, a particularly high quantum efficiency can be obtained for the water-splitting reaction.

In the case where the first p-type semiconductor layer 222 is formed of p-GaN and the second p-type semiconductor layer 223 is formed of the p-type group III nitride semiconductor mentioned above, the first p-type semiconductor layer 222 and the second p-type semiconductor layer 223 preferably are crystal films obtained by epitaxial growth.

Semiconductor materials other than the above-mentioned materials also can be used for the first p-type semiconductor layer 222 and the second p-type semiconductor layer 223. For example, for the first p-type semiconductor layer 222 and the second p-type semiconductor layer 223, it is possible to use oxide, sulfide, selenide, telluride, nitride, oxynitride, phosphide, and the like, that contain copper, silver, gallium, indium, germanium, tin, antimony, or the like, as a constituent element.

Among these, copper oxide is used preferably for the first p-type semiconductor layer 222. In this way, the first p-type semiconductor layer 222 is allowed to have a Fermi level $E_{F2}$ of −5.67 eV or less in the state of being in contact with the electrolyte at a pH of 0 and a temperature of 25° C. The first p-type semiconductor layer 222 may be formed of a single substance of copper oxide, or may be formed of a complex compound containing copper oxide. Further, the first p-type semiconductor layer 222 may be the above-mentioned compound additionally containing metal ions other than copper.

The carrier concentration of the second p-type semiconductor layer 223 preferably is lower than the carrier concentration of the first p-type semiconductor layer 222. The second p-type semiconductor layer 223 preferably is one selected from the group consisting of oxide, nitride and oxynitride. In this way, the second p-type semiconductor layer 223 is prevented from dissolving in the electrolyte 140, even if the second p-type semiconductor layer 223 of the semiconductor electrode 220 is irradiated with light in a state where the semiconductor electrode 220 is in contact with the electrolyte 140. Accordingly, stable operation of the photoelectrochemical cell is possible.

In the case of using copper oxide for the first p-type semiconductor layer 222, copper indium sulfide, for example, can be used for the second p-type semiconductor layer 223.

The second p-type semiconductor layer 223 may have a gradient composition along the thickness direction of the second p-type semiconductor layer 223. Here, the gradient composition refers to the state in which at least one of the elements constituting the second p-type semiconductor layer 223 has a concentration increasing or decreasing along the thickness direction of the second p-type semiconductor layer 223. The gradient composition of the second p-type semiconductor layer 223 allows the electrons and holes in the second p-type semiconductor layer 223 to transfer more smoothly and makes it possible to achieve the effect of reducing further the probability of the recombination between the electrons and holes. It should be noted, however, that even in the case where the second p-type semiconductor layer 223 has the gradient composition, the second p-type semiconductor layer 223 needs to satisfy the relationship with the first p-type semiconductor layer 122, in terms of the band edge levels of the conduction band and the valence band as well as the Fermi level, specified for the photoelectrochemical cell of the present invention.

For the conductor 224, electrically conductive materials, such as ITO and FTO, or metals such as Ti, Ni, Ta, Nb, Al and Ag, can be used, for example. One capable of forming an ohmic contact at the junction with the first p-type semiconductor layer 222 can be selected appropriately from these.

It is preferable that, in the surface of the conductor 224, the area that is not covered by the first p-type semiconductor layer 222 be covered, for example, by an insulating material such as a resin. With such a configuration, the conductor 224 can be prevented from dissolving in the electrolyte 140.

In order not to affect the transfer of the holes from the first p-type semiconductor layer 222 to the conductor 224, an insulated substrate, such as a sapphire substrate and a glass substrate, preferably is used for the substrate 221. In the case where the first p-type semiconductor layer 222 is formed of p-GaN, the second p-type semiconductor layer 223 is formed of the p-type group III nitride semiconductor mentioned above, and the first p-type semiconductor layer 222 and the second p-type semiconductor layer 223 are crystal films obtained by epitaxial growth, a sapphire substrate is used for the substrate 221.

Photoelectrochemical cells of Comparative Embodiments 2-1 to 2-7 each having a relationship of the energy levels among a first p-type semiconductor layer, a second p-type semiconductor layer and a conductor different from that in the semiconductor electrode 220 are exemplified below and the differences in the operational effects are described. It should be noted that although the relationship of the energy levels among the first p-type semiconductor layer, the second p-type semiconductor layer and the conductor in each of Comparative Embodiments 2-1 to 2-7 indicated below is different from that in the photoelectrochemical cell 200 of the present embodiment, other configurations are the same as in the photoelectrochemical cell 200, and thus descriptions thereof are omitted.

<Comparative Embodiment 2-1>

Figure 21:
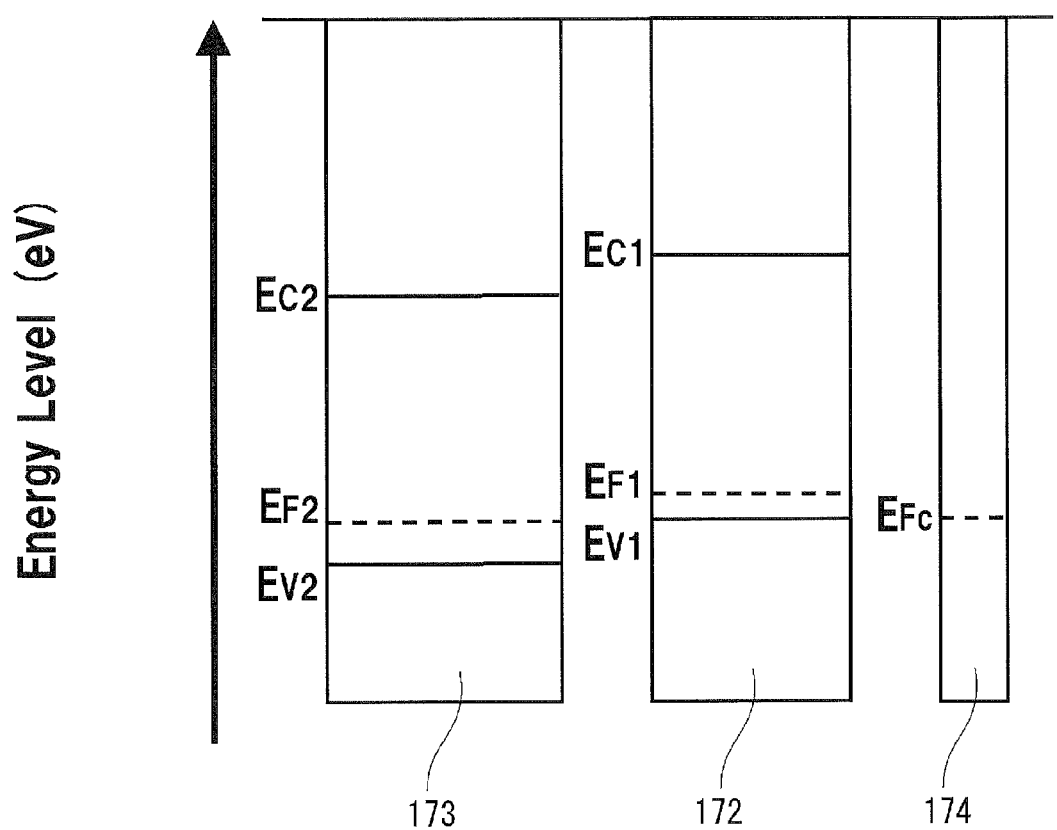
FIG. 21 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-1.
Figure 22:
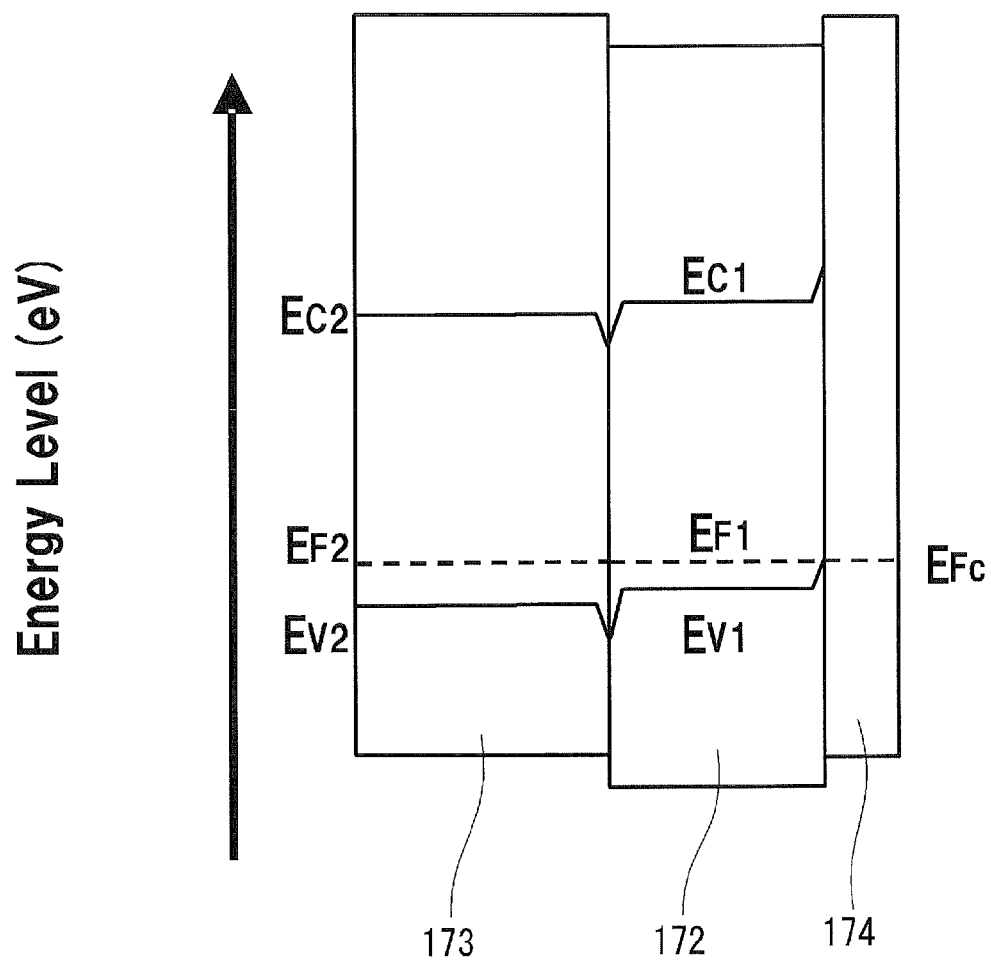
FIG. 22 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-1.

The photoelectrochemical cell according to Comparative Embodiment 2-1 is described with reference to FIGS. 21 and 22. FIG. 21 is a conceptual diagram indicating a band structure of a conductor, a first p-type semiconductor layer and a second p-type semiconductor layer, before being joined, in the present comparative embodiment. FIG. 22 is a conceptual diagram indicating a band structure of the conductor, the first p-type semiconductor layer and the second p-type semiconductor layer, after being joined, in the present comparative embodiment.

The semiconductor electrode of the present comparative embodiment includes a substrate, a first p-type semiconductor layer 172 disposed on the substrate, and a second p-type semiconductor layer 173 and a conductor 174 that are disposed on the first p-type semiconductor layer 172. The semiconductor electrode of the present comparative embodiment is different from the semiconductor electrode 220 of Embodiment 2 in that the Fermi level $E_{F1}$ of the first p-type semiconductor layer 172 is higher than the Fermi level $E_{F2}$ of the second p-type semiconductor layer 173, as indicated in FIG. 21.

Next, when the conductor 174, the first p-type semiconductor layer 172 and the second p-type semiconductor layer 173 are joined to one another, carriers transfer between the first p-type semiconductor layer 172 and the second p-type semiconductor layer 173 so that the Fermi levels match each other, thereby causing bending of the band edge, at the junction plane therebetween, as indicated in FIG. 22. At this time, the band edge level $E_{C2}$ of the conduction band and the band edge level $E_{V2}$ of the valence band in the second p-type semiconductor layer 173, respectively, are lower than the band edge level $E_{C1}$ of the conduction band and the band edge level $E_{V1}$ of the valence band in the first p-type semiconductor layer 172, but the Fermi level $E_{F1}$ of the first p-type semiconductor layer 172 is higher than the Fermi level $E_{F2}$ of the second p-type semiconductor layer 173. Therefore, Schottky barriers occur at the junction plane between the first p-type semiconductor layer 172 and the second p-type semiconductor layer 173, which is different from the case of the semiconductor electrode 220 in Embodiment 2.

At the junction plane between the first p-type semiconductor layer 172 and the conductor 174, carriers transfer so that the Fermi levels match each other, thereby causing bending of the band edge around the junction plane of the first p-type semiconductor layer 172. At this time, since the Fermi level $E_{Fc}$ of the conductor 174 is lower than the Fermi level $E_{F1}$ of the first p-type semiconductor layer 172, the junction between the conductor 174 and the first p-type semiconductor layer 172 is formed by an ohmic contact, as is the case of the semiconductor electrode 220 in Embodiment 2.

In the case of the semiconductor electrode of the present comparative embodiment, Schottky barriers occur at the junction plane between the first p-type semiconductor layer 172 and the second p-type semiconductor layer 173, which is different from the case of the semiconductor electrode 220 in Embodiment 2. The Schottky barrier prevents the transfer of the holes from the second p-type semiconductor layer 173 to the first p-type semiconductor layer 172. Accordingly, in the photoelectrochemical cell of the present comparative embodiment, the probability of the recombination between the electrons and holes generated by photoexcitation inside the second p-type semiconductor layer 173 is increased, compared to that in the photoelectrochemical cell 200 of Embodiment 2, and the quantum efficiency of the hydrogen evolution reaction by irradiation with light is decreased.

<Comparative Embodiment 2-2>

Figure 23:
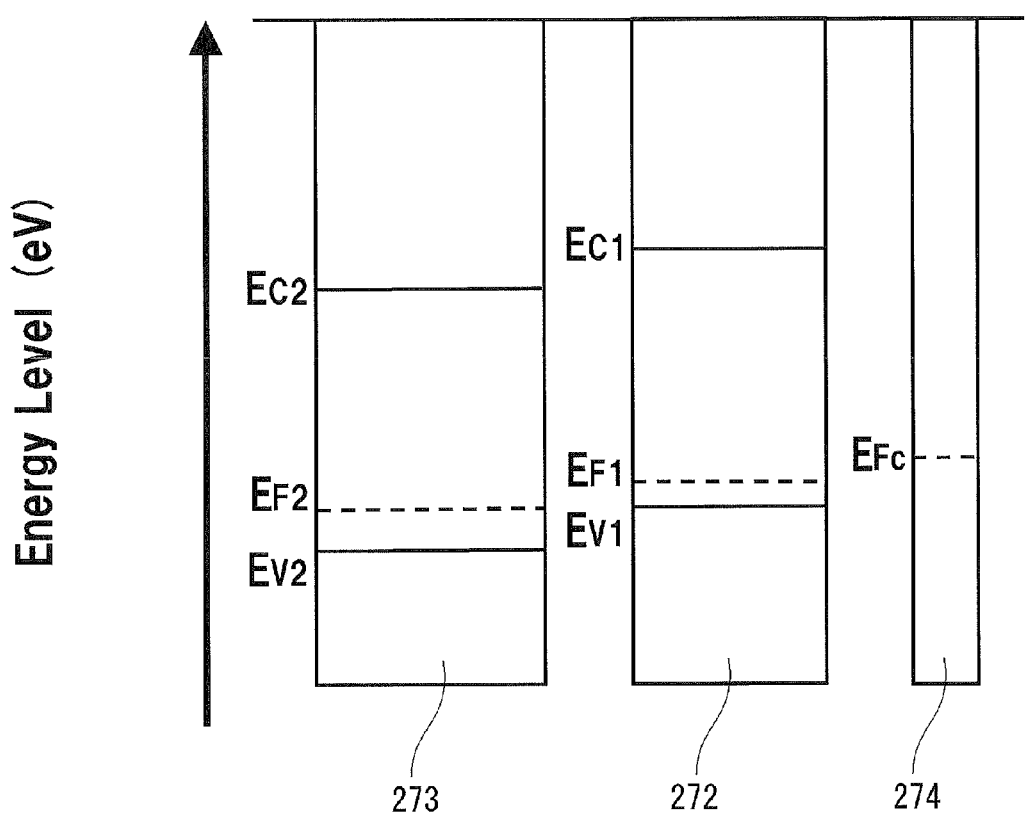
FIG. 23 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-2.
Figure 24:
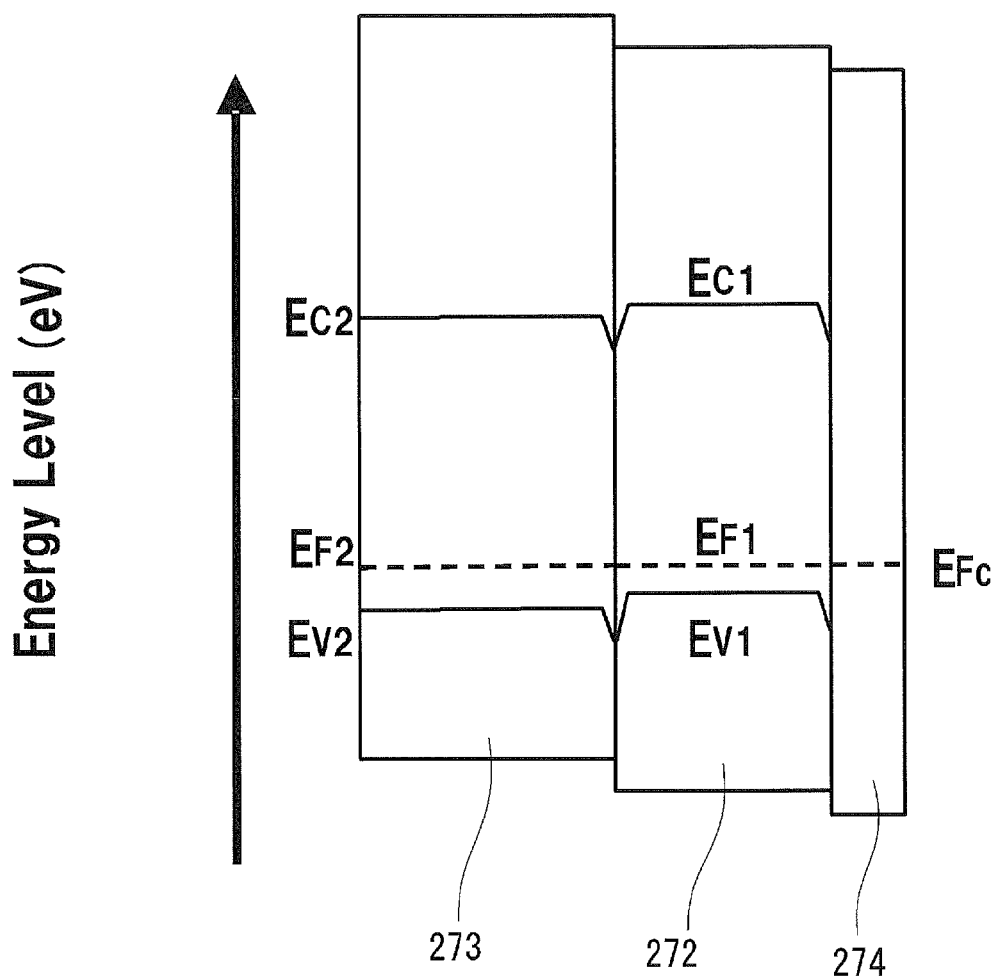
FIG. 24 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-2.

The photoelectrochemical cell according to Comparative Embodiment 2-2 is described with reference to FIGS. 23 and 24. FIG. 23 is a conceptual diagram indicating a band structure of a conductor, a first p-type semiconductor layer and a second p-type semiconductor layer, before being joined, in the present comparative embodiment. FIG. 24 is a conceptual diagram indicating a band structure of the conductor, the first p-type semiconductor layer and the second p-type semiconductor layer, after being joined, in the present comparative embodiment.

The semiconductor electrode of the present comparative embodiment includes a conductor 274, a first p-type semiconductor layer 272 and a second p-type semiconductor layer 273. The semiconductor electrode of the present comparative embodiment is different from the semiconductor electrode 220 of Embodiment 2 in that the Fermi level $E_{F1}$ of the first p-type semiconductor layer 272 is higher than the Fermi level $E_{F2}$ of the second p-type semiconductor layer 273, and the Fermi level $E_{Fc}$ of the conductor 274 is higher than the Fermi level $E_{F1}$ of the first p-type semiconductor layer 272, as indicated in FIG. 23.

Next, when the conductor 274, the first p-type semiconductor layer 272 and the second p-type semiconductor layer 273 are joined to one another, carriers transfer between the first p-type semiconductor layer 272 and the second p-type semiconductor layer 273 so that the Fermi levels match each other, thereby causing bending of the band edge, at the junction plane therebetween, as indicated in FIG. 24. At this time, the band edge level $E_{C2}$ of the conduction band and the band edge level $E_{V2}$ of the valence band in the second p-type semiconductor layer 273, respectively, are lower than the band edge level $E_{C1}$ of the conduction band and the band edge level $E_{V1}$ of the valence band in the first p-type semiconductor layer 272, but the Fermi level $E_{F1}$ of the first p-type semiconductor layer 272 is higher than the Fermi level $E_{F2}$ of the second p-type semiconductor layer 273. Therefore, Schottky barriers occur at the junction plane between the first p-type semiconductor layer 272 and the second p-type semiconductor layer 273, which is different from the case of the semiconductor electrode 220 in Embodiment 2.

At the junction plane between the first p-type semiconductor layer 272 and the conductor 274, carriers transfer so that the Fermi levels match each other, thereby causing bending of the band edge around the junction plane of the first p-type semiconductor layer 272. At this time, since the Fermi level $E_{Fc}$ of the conductor 274 is higher than the Fermi level $E_{F1}$ of the first p-type semiconductor layer 272, the junction between the conductor 274 and the first p-type semiconductor layer 272 is formed by a Schottky contact.

In the case of the semiconductor electrode of the present comparative embodiment, Schottky barriers occur at the junction plane between the first p-type semiconductor layer 272 and the second p-type semiconductor layer 273, which is different from the case of the semiconductor electrode 220 in Embodiment 2. The Schottky barrier prevents the transfer of the holes from the second p-type semiconductor layer 273 to the first p-type semiconductor layer 272. Furthermore, in the present comparative embodiment, Schottky barriers occur also at the junction plane between the conductor 274 and the first p-type semiconductor layer 272. The Schottky barrier prevents the transfer of the holes from the first p-type semiconductor layer 272 to the conductor 274. Accordingly, in the photoelectrochemical cell of the present comparative embodiment, the probability of the recombination between the electrons and holes generated by photoexcitation inside the second p-type semiconductor layer 273 is increased, compared to that in the photoelectrochemical cell 200 of Embodiment 2, and the quantum efficiency of the hydrogen evolution reaction by irradiation with light is decreased.

<Comparative Embodiment 2-3>

Figure 25:
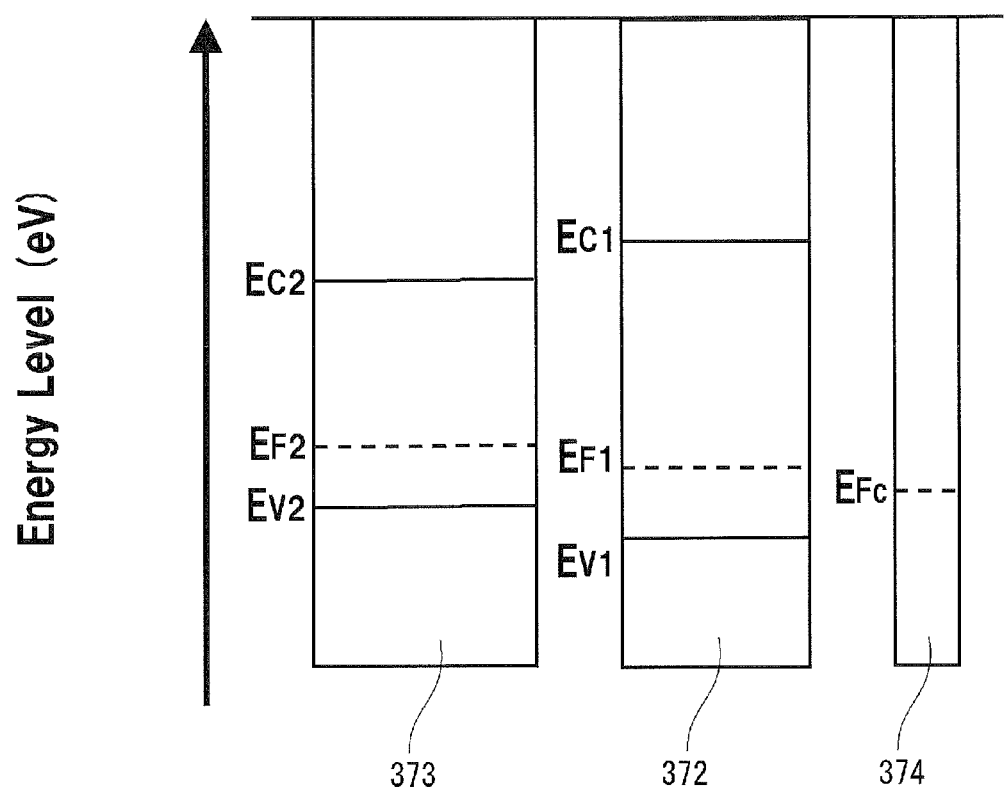
FIG. 25 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-3.
Figure 26:
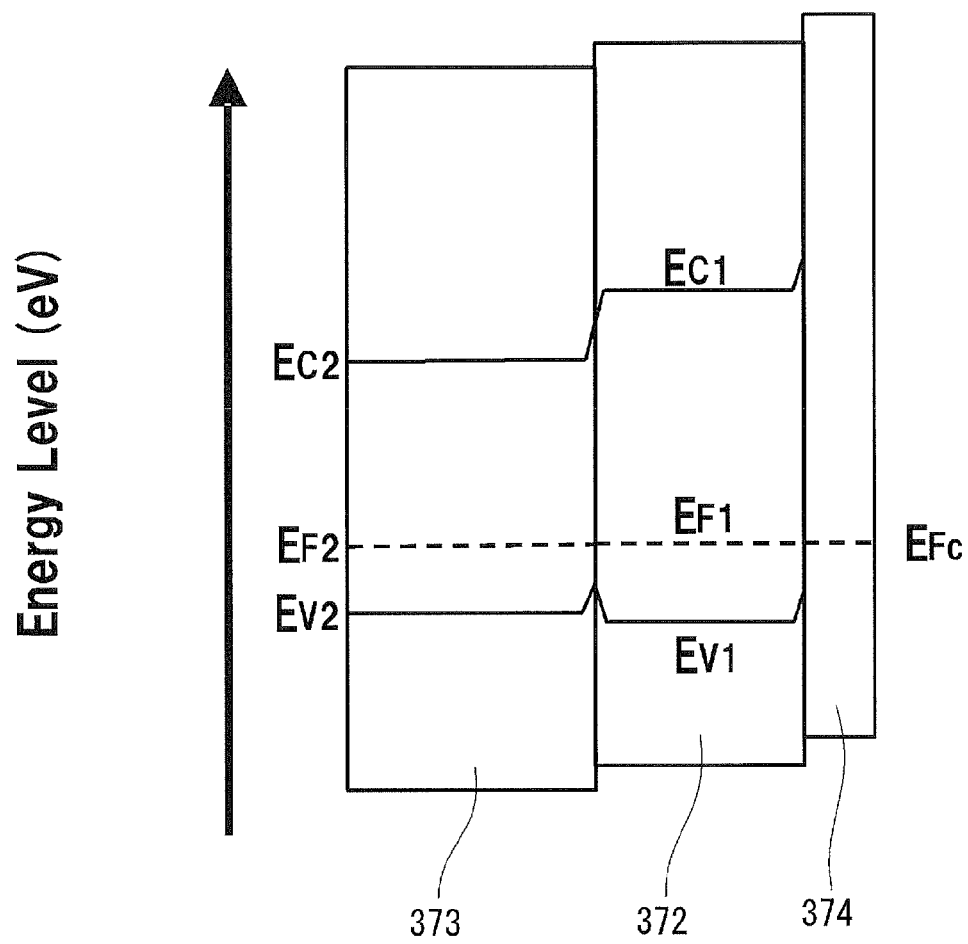
FIG. 26 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-3.

The photoelectrochemical cell according to Comparative Embodiment 2-3 is described with reference to FIGS. 25 and 26. FIG. 25 is a conceptual diagram indicating a band structure of a conductor, a first p-type semiconductor layer and a second p-type semiconductor layer, before being joined, in the present comparative embodiment. FIG. 26 is a conceptual diagram indicating a band structure of the conductor, the first p-type semiconductor layer and the second p-type semiconductor layer, after being joined, in the present comparative embodiment.

The semiconductor electrode of the present comparative embodiment includes a substrate, a first p-type semiconductor layer 372 disposed on the substrate, and a second p-type semiconductor layer 373 and a conductor 374 that are disposed on the first p-type semiconductor layer 372. The semiconductor electrode of the present comparative embodiment is different from the semiconductor electrode 220 of Embodiment 2 in that the band edge level $E_{V2}$ of the valence band in the second p-type semiconductor layer 373 is higher than the band edge level $E_{V1}$ of the valence band in the first p-type semiconductor layer 372, as indicated in FIG. 25.

Next, when the conductor 374, the first p-type semiconductor layer 372 and the second p-type semiconductor layer 373 are joined to one another, carriers transfer between the first p-type semiconductor layer 372 and the second p-type semiconductor layer 373 so that the Fermi levels match each other, thereby causing bending of the band edge, at the junction plane therebetween, as indicated in FIG. 26. At this time, the band edge level $E_{V2}$ of the valence band in the second p-type semiconductor layer 373 is higher than the band edge level $E_{V1}$ of the valence band in the first p-type semiconductor layer 372, and the Fermi level $E_{F1}$ of the first p-type semiconductor layer 372 is lower than the Fermi level $E_{F2}$ of the second p-type semiconductor layer 373. Therefore, the band edge of the valence band increases from the side of the second p-type semiconductor layer 373 toward the junction plane with the first p-type semiconductor layer 372, but decreases from the junction plane toward the side of the first p-type semiconductor layer 372.

At the junction plane between the first p-type semiconductor layer 372 and the conductor 374, carriers transfer so that the Fermi levels match each other, thereby causing bending of the band edge around the junction plane of the first p-type semiconductor layer 372. Since the Fermi level $E_{Fc}$ of the conductor 374 is lower than the Fermi level $E_{F1}$ of the first p-type semiconductor layer 372, the junction between the conductor 374 and the first p-type semiconductor layer 372 is formed by an ohmic contact, as is the case of the semiconductor electrode 220 in Embodiment 2.

In the case of the semiconductor electrode of the present comparative embodiment, the band edge of the valence band decreases from the junction plane between the first p-type semiconductor layer 372 and the second p-type semiconductor layer 373 toward the side of the first p-type semiconductor layer 372, which is different from the case of the semiconductor electrode 220 in Embodiment 2. Therefore, the transfer of the holes from the second p-type semiconductor layer 373 to the first p-type semiconductor layer 372 is prevented. Accordingly, in the photoelectrochemical cell of the present comparative embodiment, the probability of the recombination between the electrons and holes generated by photoexcitation inside the second p-type semiconductor layer 373 is increased, compared to that in the photoelectrochemical cell 200 of Embodiment 2, and the quantum efficiency of the hydrogen evolution reaction by irradiation with light is decreased.

<Comparative Embodiment 2-4>

Figure 27:
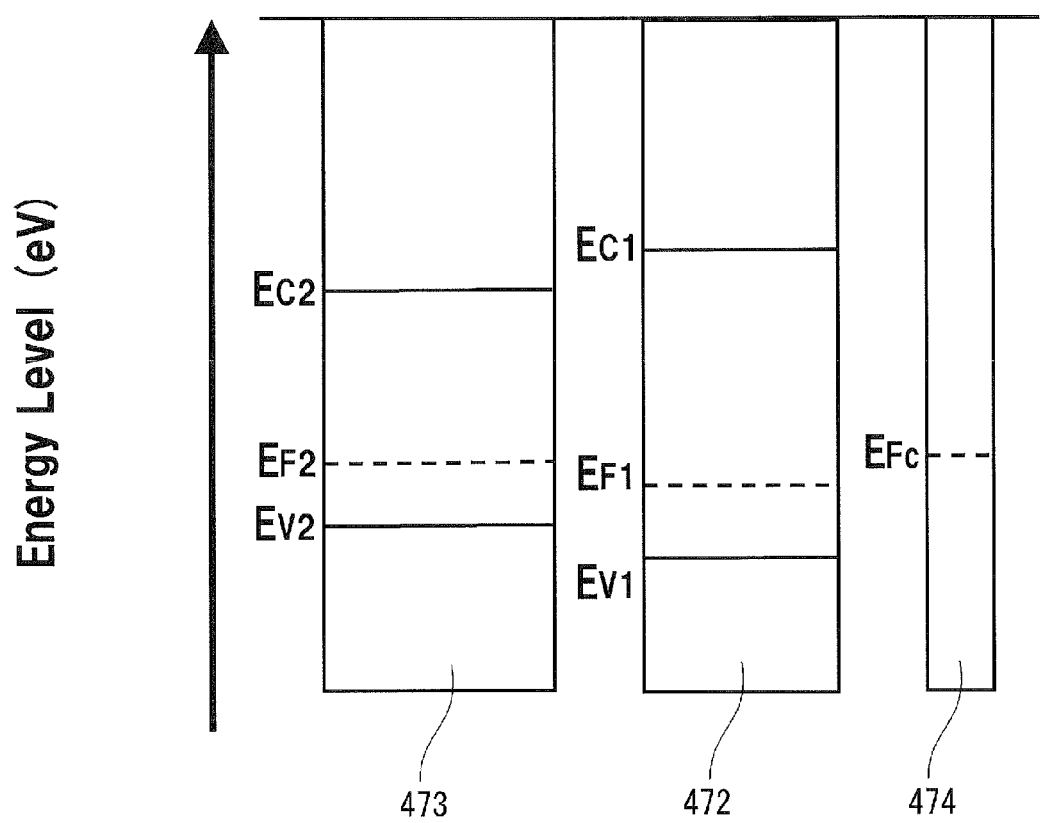
FIG. 27 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-4.
Figure 28:
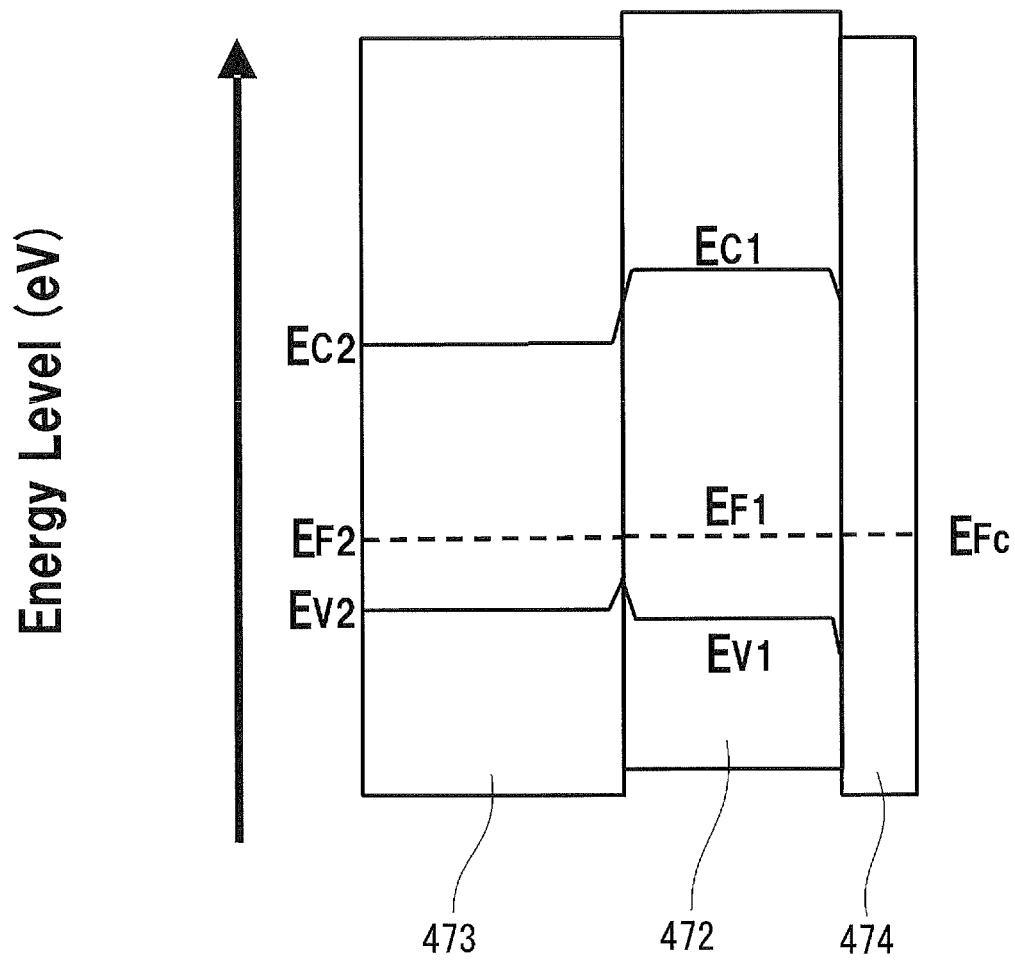
FIG. 28 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-4.

The photoelectrochemical cell according to Comparative Embodiment 2-4 is described with reference to FIGS. 27 and 28. FIG. 27 is a conceptual diagram indicating a band structure of a conductor, a first p-type semiconductor layer and a second p-type semiconductor layer, before being joined, in the present comparative embodiment. FIG. 28 is a conceptual diagram indicating a band structure of the conductor, the first p-type semiconductor layer and the second p-type semiconductor layer, after being joined, in the present comparative embodiment.

The semiconductor electrode of the present comparative embodiment includes a substrate, a first p-type semiconductor layer 472 disposed on the substrate, and a second p-type semiconductor layer 473 and a conductor 474 that are disposed on the first p-type semiconductor layer 472. The semiconductor electrode of the present comparative embodiment is different from the semiconductor electrode 220 of Embodiment 2 in that the band edge level $E_{V2}$ of the valence band in the second p-type semiconductor layer 473 is higher than the band edge level $E_{V1}$ of the valence band in the first p-type semiconductor layer 472, and the Fermi level $E_{Fc}$ of the conductor 474 is higher than the Fermi level $E_{F1}$ of the first p-type semiconductor layer 472, as indicated in FIG. 27.

Next, when the conductor 474, the first p-type semiconductor layer 472 and the second p-type semiconductor layer 473 are joined to one another, carriers transfer between the first p-type semiconductor layer 472 and the second p-type semiconductor layer 473 so that the Fermi levels match each other, thereby causing bending of the band edge, at the junction plane therebetween, as indicated in FIG. 28. The band edge level $E_{V2}$ of the valence band in the second p-type semiconductor layer 473 is higher than the band edge level $E_{V1}$ of the valence band in the first p-type semiconductor layer 472, and the Fermi level $E_{F1}$ of the first p-type semiconductor layer 472 is lower than the Fermi level $E_{F2}$ of the second p-type semiconductor layer 473. Therefore, the band edge of the valence band increases from the side of the second p-type semiconductor layer 473 toward the junction plane with the first p-type semiconductor layer 472, but decreases from the junction plane toward the side of the first p-type semiconductor layer 472.

At the junction plane between the first p-type semiconductor layer 472 and the conductor 474, carriers transfer so that the Fermi levels match each other, thereby causing bending of the band edge around the junction plane of the first p-type semiconductor layer 472. At this time, since the Fermi level $E_{Fc}$ of the conductor 474 is higher than the Fermi level $E_{F1}$ of the first p-type semiconductor layer 472, the junction between the conductor 474 and the first p-type semiconductor layer 472 is formed by a Schottky contact.

In the case of the semiconductor electrode of the present comparative embodiment, the band edge of the valence band decreases from the junction plane between the first p-type semiconductor layer 472 and the second p-type semiconductor layer 473 toward the side of the first p-type semiconductor layer 472, which is different from the case of the semiconductor electrode 220 in Embodiment 2. Therefore, the transfer of the holes from the second p-type semiconductor layer 473 to the first p-type semiconductor layer 472 is prevented. Furthermore, in the semiconductor electrode of the present comparative embodiment, Schottky barriers occur at the junction plane between the conductor 474 and the first p-type semiconductor layer 472. The Schottky barrier prevents the transfer of the holes from the first p-type semiconductor layer 472 to the conductor 474. Accordingly, in the photoelectrochemical cell of the present comparative embodiment, the probability of the recombination between the electrons and holes generated by photoexcitation inside the second p-type semiconductor layer is increased, compared to that in the photoelectrochemical cell 400 of Embodiment 2, and the quantum efficiency of the hydrogen evolution reaction by irradiation with light is decreased.

<Comparative Embodiment 2-5>

Figure 29:
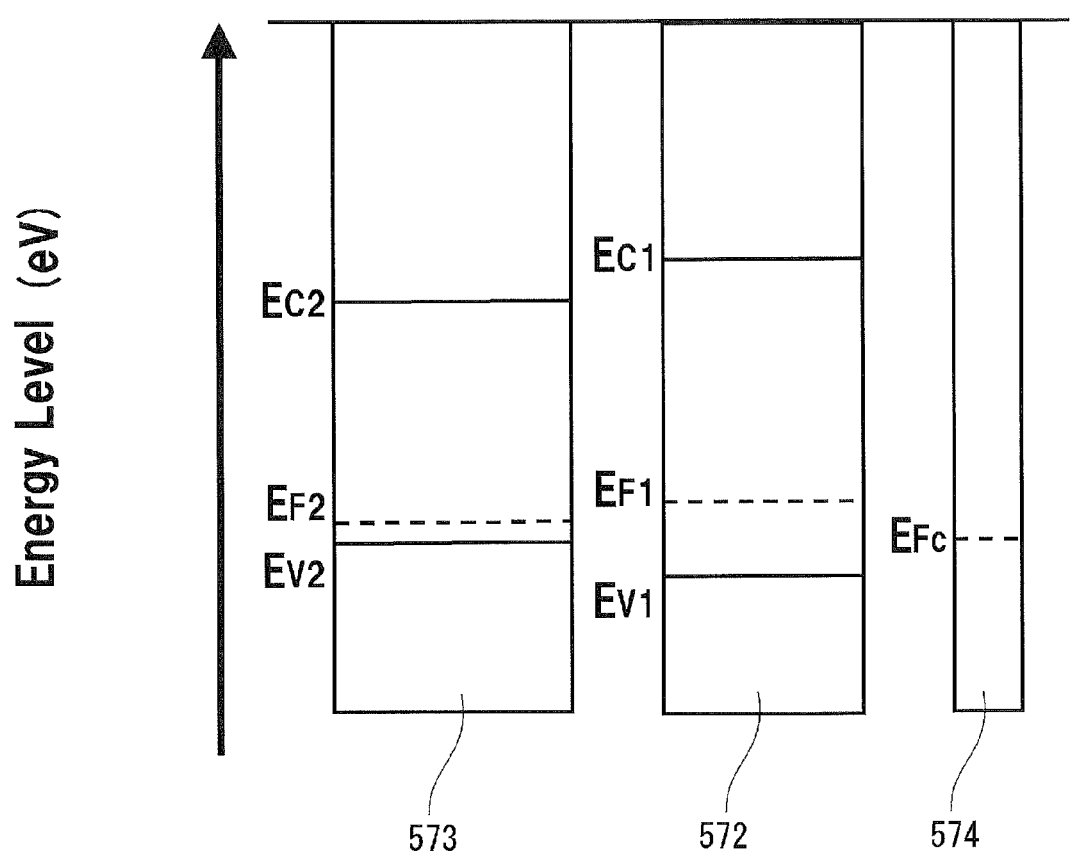
FIG. 29 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-5.
Figure 30:
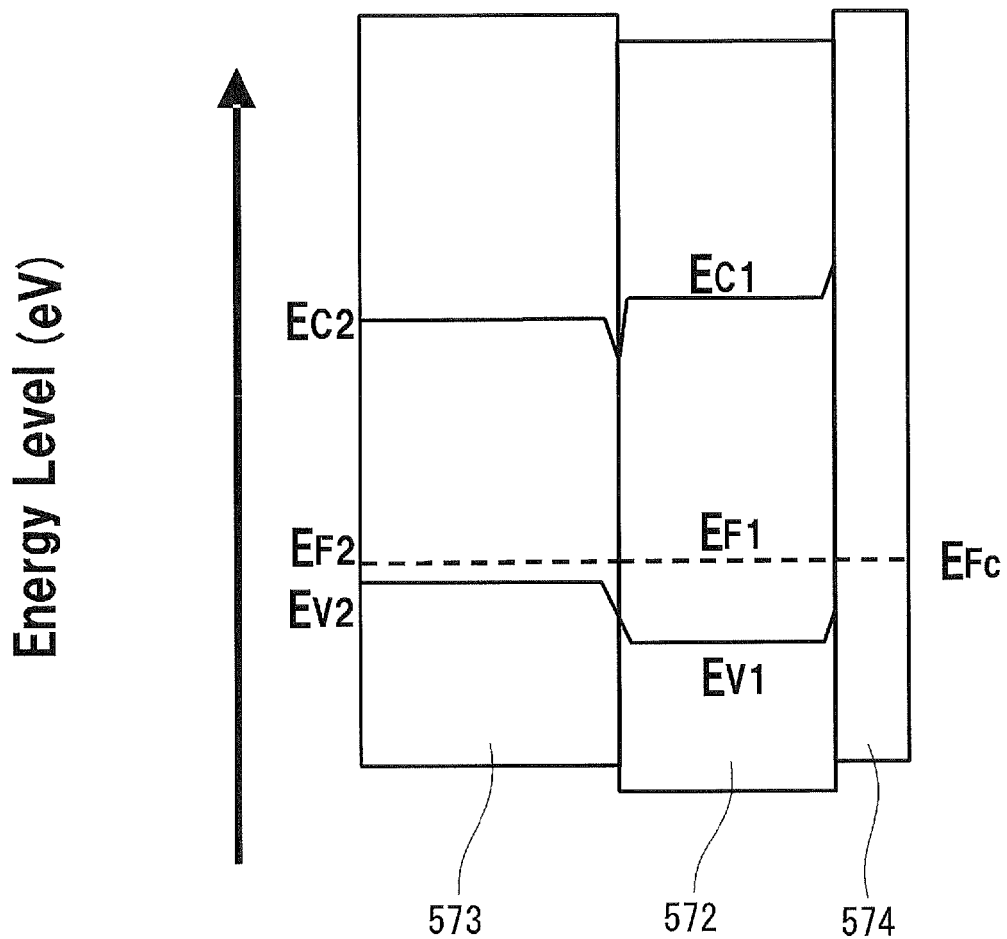
FIG. 30 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-5.

The photoelectrochemical cell according to Comparative Embodiment 2-5 is described with reference to FIGS. 29 and 30. FIG. 29 is a conceptual diagram indicating a band structure of a conductor, a first p-type semiconductor layer and a second p-type semiconductor layer, before being joined, in the present comparative embodiment. FIG. 30 is a conceptual diagram indicating a band structure of the conductor, the first p-type semiconductor layer and the second p-type semiconductor layer, after being joined, in the present comparative embodiment.

The semiconductor electrode of the present comparative embodiment includes a conductor 574, a first p-type semiconductor layer 572 and a second p-type semiconductor layer 573. The semiconductor electrode of the present comparative embodiment is different from the semiconductor electrode 220 of Embodiment 2 in that the band edge level $E_{V2}$ of the valence band in the second p-type semiconductor layer 573 is higher than the band edge level $E_{V1}$ of the valence band in the first p-type semiconductor layer 572, and the Fermi level $E_{F1}$ of the first p-type semiconductor layer 572 is higher than the Fermi level $E_{F2}$ of the second p-type semiconductor layer 573, as indicated in FIG. 29.

Next, when the conductor 574, the first p-type semiconductor layer 572 and the second p-type semiconductor layer 573 are joined to one another, carriers transfer between the first p-type semiconductor layer 572 and the second p-type semiconductor layer 573 so that the Fermi levels match each other, thereby causing bending of the band edge, at the junction plane therebetween, as indicated in FIG. 30. At this time, the band edge level $E_{V2}$ of the valence band in the second p-type semiconductor layer 573 is higher than the band edge level $E_{V1}$ of the valence band in the first p-type semiconductor layer 572, and the Fermi level $E_{F1}$ of the first p-type semiconductor layer 572 is higher than the Fermi level $E_{F2}$ of the second p-type semiconductor layer 573. Therefore, no Schottky barriers occur at the junction plane between the first p-type semiconductor layer 572 and the second p-type semiconductor layer 573 in the band edge of the valence band, as is the case of the semiconductor electrode 220 in Embodiment 2. However, the band edge level $E_{V1}$ of the valence band in the first p-type semiconductor layer 572 is lower than the band edge level $E_{V2}$ of the valence band in the second p-type semiconductor layer 573, as indicated in FIG. 30.

At the junction plane between the first p-type semiconductor layer 572 and the conductor 574, carriers transfer so that the Fermi levels match each other, thereby causing bending of the band edge around the junction plane of the first p-type semiconductor layer 572. At this time, since the Fermi level $E_{Fc}$ of the conductor 574 is lower than the Fermi level $E_{F1}$ of the first p-type semiconductor layer 572, the junction between the conductor 574 and the first p-type semiconductor layer 572 is formed by an ohmic contact, as is the case of the semiconductor electrode 220 in Embodiment 2.

In the case of the semiconductor electrode of the present comparative embodiment, the band edge level $E_{V1}$ of the valence band in the first p-type semiconductor layer 572 is lower than the band edge level $E_{V2}$ of the valence band in the second p-type semiconductor layer 573, which is different from the case of the semiconductor electrode 220 in Embodiment 2. Therefore, the transfer of the holes from the second p-type semiconductor layer 573 to the first p-type semiconductor layer 572 is prevented. Accordingly, in the photoelectrochemical cell of the present comparative embodiment, the probability of the recombination between the electrons and holes generated by photoexcitation inside the second p-type semiconductor layer 573 is increased, compared to that in the photoelectrochemical cell 200 of Embodiment 2, and the quantum efficiency of the hydrogen evolution reaction by irradiation with light is decreased.

<Comparative Embodiment 2-6>

Figure 31:
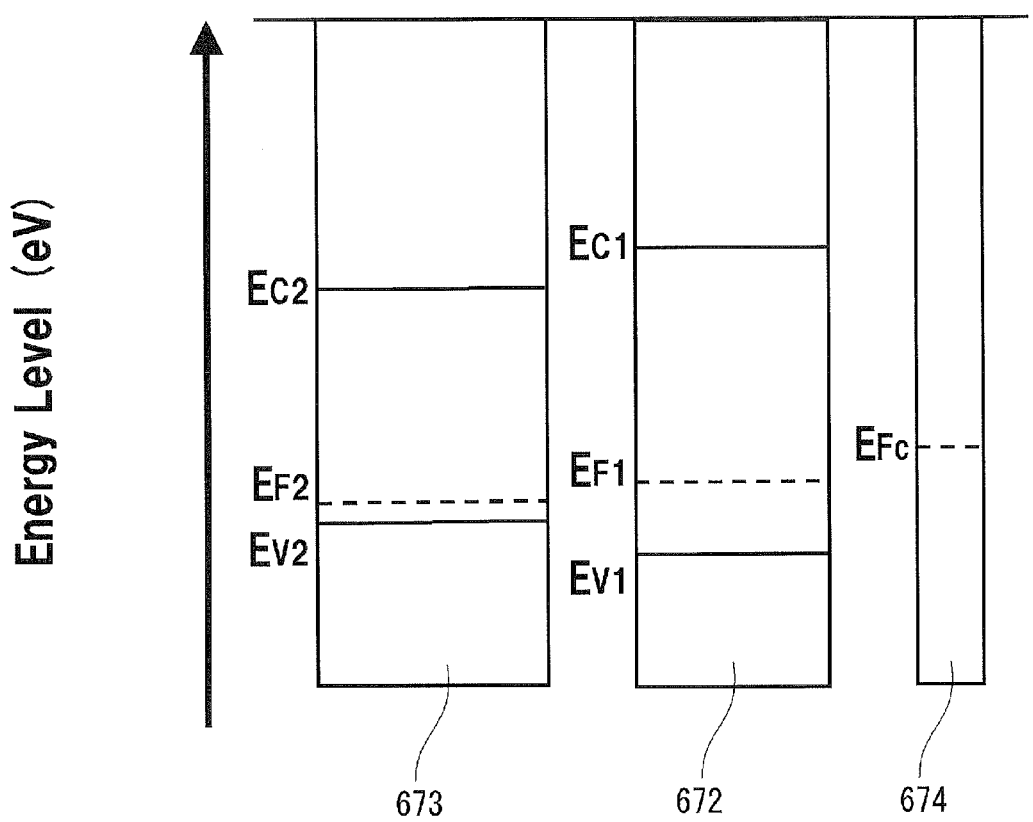
FIG. 31 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-6.
Figure 32:
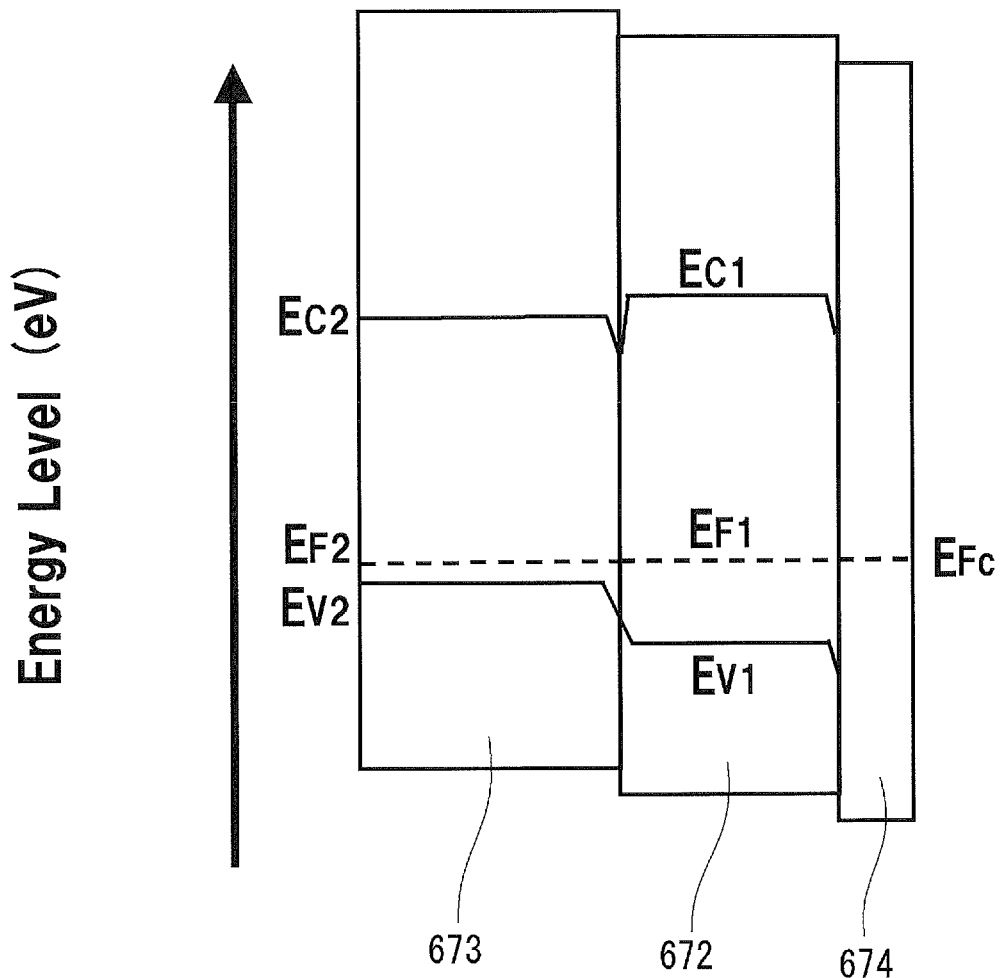
FIG. 32 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-6.

The photoelectrochemical cell according to Comparative Embodiment 2-6 is described with reference to FIGS. 31 and 32. FIG. 31 is a conceptual diagram indicating a band structure of a conductor, a first p-type semiconductor layer and a second p-type semiconductor layer, before being joined, in the present comparative embodiment. FIG. 32 is a conceptual diagram indicating a band structure of the conductor, the first p-type semiconductor layer and the second p-type semiconductor layer, after being joined, in the present comparative embodiment.

The semiconductor electrode of the present comparative embodiment includes a substrate, a first p-type semiconductor layer 672 disposed on the substrate, and a second p-type semiconductor layer 673 and a conductor 674 that are disposed on the first p-type semiconductor layer 672. The semiconductor electrode of the present comparative embodiment is different from the semiconductor electrode 220 of Embodiment 2 in that the band edge level $E_{V2}$ of the valence band in the second p-type semiconductor layer 673 is higher than the band edge level $E_{V1}$ of the valence band in the first p-type semiconductor layer 672, the Fermi level $E_{F1}$ of the first p-type semiconductor layer 672 is higher than the Fermi level $E_{F2}$ of the second p-type semiconductor layer 673, and the Fermi level $E_{Fc}$ of the conductor 674 is higher than the Fermi level $E_{F1}$ of the first p-type semiconductor layer 672, as indicated in FIG. 31.

Next, when the conductor 674, the first p-type semiconductor layer 672 and the second p-type semiconductor layer 673 are joined to one another, carriers transfer between the first p-type semiconductor layer 672 and the second p-type semiconductor layer 673 so that the Fermi levels match each other, thereby causing bending of the band edge, at the junction plane therebetween, as indicated in FIG. 32. At this time, the band edge level $E_{V2}$ of the valence band in the second p-type semiconductor layer 673 is higher than the band edge level $E_{V1}$ of the valence band in the first p-type semiconductor layer 672, and the Fermi level $E_{F1}$ of the first p-type semiconductor layer 672 is higher than the Fermi level $E_{F2}$ of the second p-type semiconductor layer 673. Therefore, no Schottky barriers occur at the junction plane between the first p-type semiconductor layer 672 and the second p-type semiconductor layer 673 in the band edge of the valence band, as is the case of the semiconductor electrode 220 in Embodiment 2. However, the band edge level $E_{V1}$ of the valence band in the first p-type semiconductor layer 672 is lower than the band edge level $E_{V2}$ of the valence band in the second p-type semiconductor layer 673, as indicated in FIG. 32.

Further, at the junction plane between the first p-type semiconductor layer 672 and the conductor 674, carriers transfer so that the Fermi levels match each other. This causes bending of the band edge around the junction plane of the first p-type semiconductor layer 672. Since the Fermi level $E_{Fc}$ of the conductor 674 is higher than the Fermi level $E_{F1}$ of the first p-type semiconductor layer 672, the junction between the conductor 674 and the first p-type semiconductor layer 672 is formed by a Schottky contact.

In the case of the semiconductor electrode of the present comparative embodiment, the band edge level $E_{V1}$ of the valence band in the first p-type semiconductor layer 672 is lower than the band edge level $E_{V2}$ of the valence band in the second p-type semiconductor layer 673, which is different from the case of the semiconductor electrode 220 in Embodiment 2. Therefore, the transfer of the holes from the second p-type semiconductor layer 673 to the first p-type semiconductor layer 672 is prevented. Furthermore, in the present comparative embodiment, Schottky barriers occur at the junction plane between the conductor 674 and the first p-type semiconductor layer 672. The Schottky barrier prevents the transfer of the holes from the first p-type semiconductor layer 672 to the conductor 674. Accordingly, in the photoelectrochemical cell of the present comparative embodiment, the probability of the recombination between the electrons and holes generated by photoexcitation inside the second p-type semiconductor layer 673 is increased, compared to that in the photoelectrochemical cell 200 of Embodiment 2, and the quantum efficiency of the hydrogen evolution reaction by irradiation with light is decreased.

<Comparative Embodiment 2-7>

Figure 33:
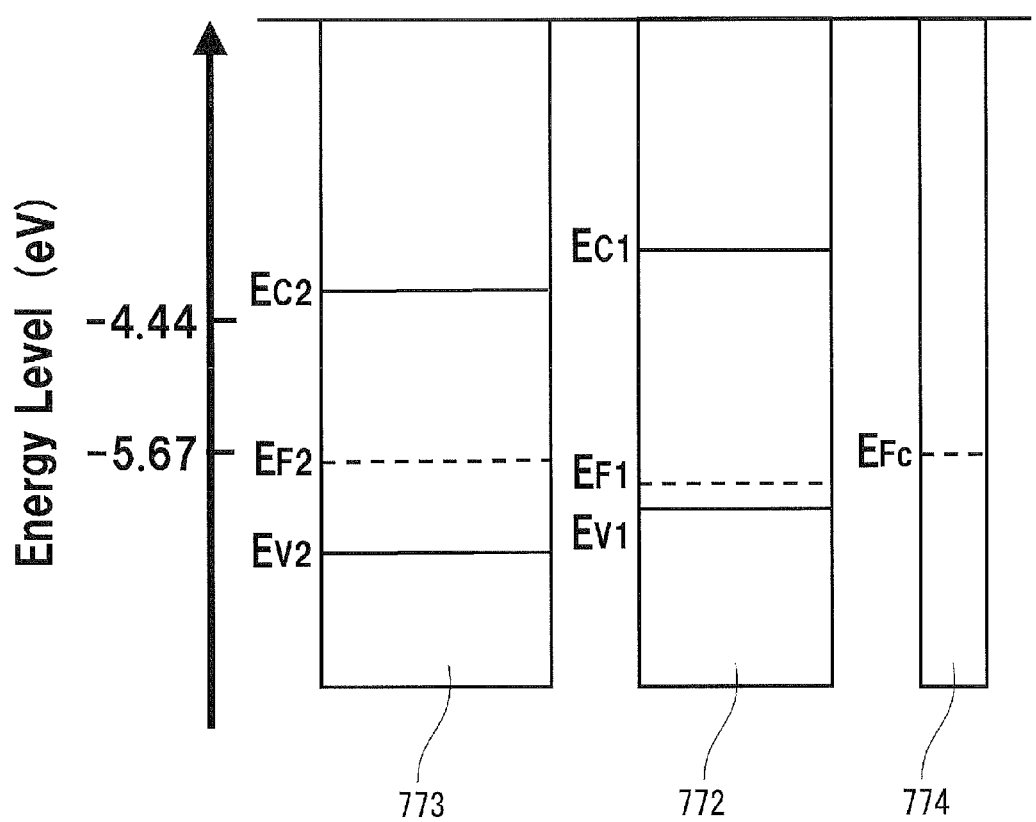
FIG. 33 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 2-7.
Figure 34:
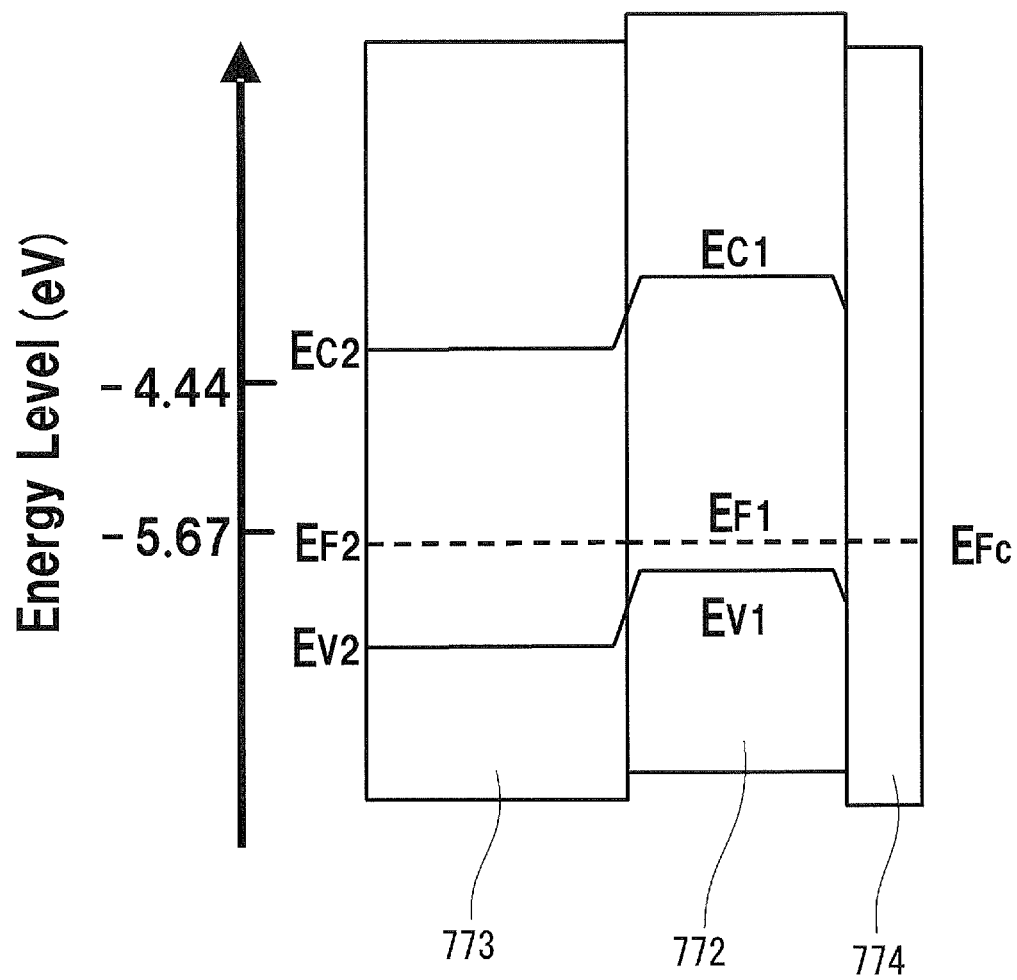
FIG. 34 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 2-7.

The photoelectrochemical cell according to Comparative Embodiment 2-7 is described with reference to FIGS. 33 and 34. FIG. 33 is a conceptual diagram indicating a band structure of a conductor, a first p-type semiconductor layer and a second p-type semiconductor layer, before being joined, in the present comparative embodiment. FIG. 34 is a conceptual diagram indicating a band structure of the conductor, the first p-type semiconductor layer and the second p-type semiconductor layer, after being joined, in the present comparative embodiment.

The semiconductor electrode of the present comparative embodiment includes a conductor 774, a first p-type semiconductor layer 772 and a second p-type semiconductor layer 773. The semiconductor electrode of the present comparative embodiment is different from the semiconductor electrode 220 of Embodiment 2 in that the Fermi level $E_{Fc}$ of the conductor 274 is higher than the Fermi level $E_{F1}$ of the first p-type semiconductor layer 772, as indicated in FIG. 33.

Next, when the conductor 774, the first p-type semiconductor layer 772 and the second p-type semiconductor layer 773 are joined to one another, carriers transfer between the first p-type semiconductor layer 772 and the second p-type semiconductor layer 773 so that the Fermi levels match each other, thereby causing bending of the band edge, at the junction plane therebetween, as indicated in FIG. 34. The band edge level $E_{C2}$ of the conduction band and the band edge level $E_{V2}$ of the valence band in the second p-type semiconductor layer 773, respectively, are lower than the band edge level $E_{C1}$ of the conduction band and the band edge level $E_{V1}$ of the valence band in the first p-type semiconductor layer 772, and the Fermi level $E_{F1}$ of the first p-type semiconductor layer 772 is lower than the Fermi level $E_{F2}$ of the second p-type semiconductor layer 773. Therefore, no Schottky barriers occur at the junction plane between the first p-type semiconductor layer 772 and the second p-type semiconductor layer 773.

At the junction plane between the first p-type semiconductor layer 772 and the conductor 774, carriers transfer so that the Fermi levels match each other, thereby causing bending of the band edge around the junction plane of the first p-type semiconductor layer 772. Since the Fermi level $E_{Fc}$ of the conductor 774 is higher than the Fermi level $E_{F1}$ of the first p-type semiconductor layer 772, the junction between the conductor 774 and the first p-type semiconductor layer 772 is formed by a Schottky contact.

In the case of the semiconductor electrode of the present comparative embodiment, Schottky barriers occur at the junction plane between the conductor 774 and the first p-type semiconductor layer 772, which is different from the semiconductor electrode 220 in Embodiment 2. The Schottky barrier prevents the transfer of the holes from the first p-type semiconductor layer 772 to the conductor 774. Accordingly, in the photoelectrochemical cell of the present comparative embodiment, the probability of the recombination between the electrons and holes generated by photoexcitation inside the second p-type semiconductor layer 773 is increased, compared to that in the photoelectrochemical cell 200 of Embodiment 2, and the quantum efficiency of the hydrogen evolution reaction by irradiation with light is decreased.

(Embodiment 3)

Figure 35:
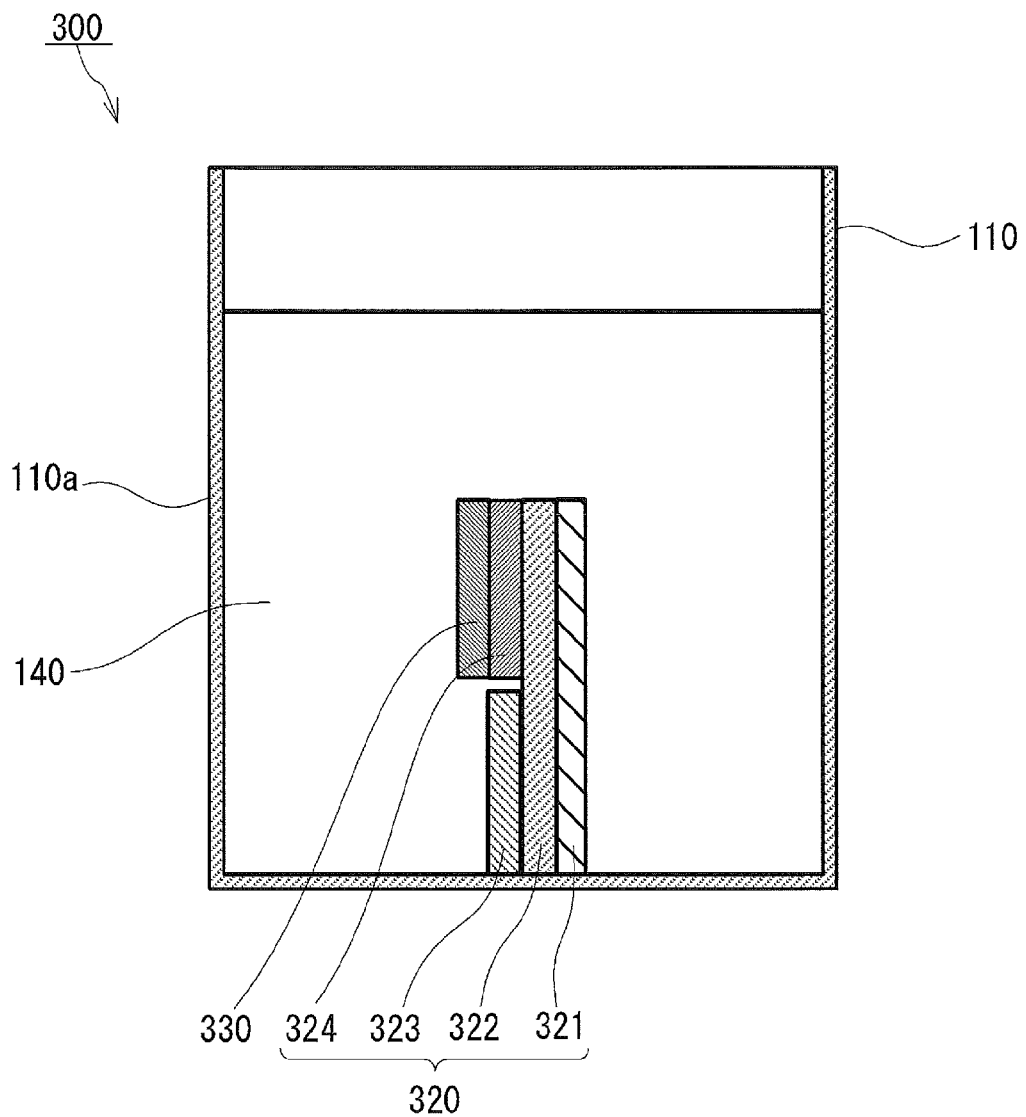
FIG. 35 is a schematic view illustrating a configuration of the photoelectrochemical cell of Embodiment 3 of the present invention.

The configuration of the photoelectrochemical cell according to Embodiment 3 of the present invention is described with reference to FIG. 35. FIG. 35 is a schematic view illustrating the configuration of the photoelectrochemical cell of the present embodiment.

In a photoelectrochemical cell 300 of the present embodiment, a semiconductor electrode 320 includes a substrate 321, a first n-type semiconductor layer 322 disposed on the substrate 321, and a second n-type semiconductor layer 323 and a conductor 324 that are disposed on the first n-type semiconductor layer 322. On the other hand, a counter electrode 330 is disposed on the conductor 324 (on the surface of the conductor 324 opposite to the surface on which the first n-type semiconductor layer 322 is disposed). The substrate 321, the first n-type semiconductor layer 322, the second n-type semiconductor layer 323, and the conductor 324, respectively, have the same configuration as the substrate 121, the first n-type semiconductor layer 122, the second n-type semiconductor layer 123, and the conductor 124 in Embodiment 1.

As is the case of the present embodiment, the configuration in which the counter electrode 330 is disposed on the conductor 324 can eliminate the need for a conducting wire for connecting the semiconductor electrode 320 electrically to the counter electrode 330. This can eliminate the ohmic loss derived from the conducting wire, therefore further improving the quantum efficiency of the hydrogen evolution reaction by irradiation with light. Further, with such a configuration, the semiconductor electrode 320 can be connected electrically to the counter electrode 330 by a simple and easy process. Further, although the above-mentioned configuration in which a counter electrode is disposed on a conductor in a photoelectrochemical cell described in Embodiment 1 is employed in the present embodiment, such a configuration can be applied also in the photoelectrochemical cell described in Embodiment 2.

(Embodiment 4)

Figure 36:
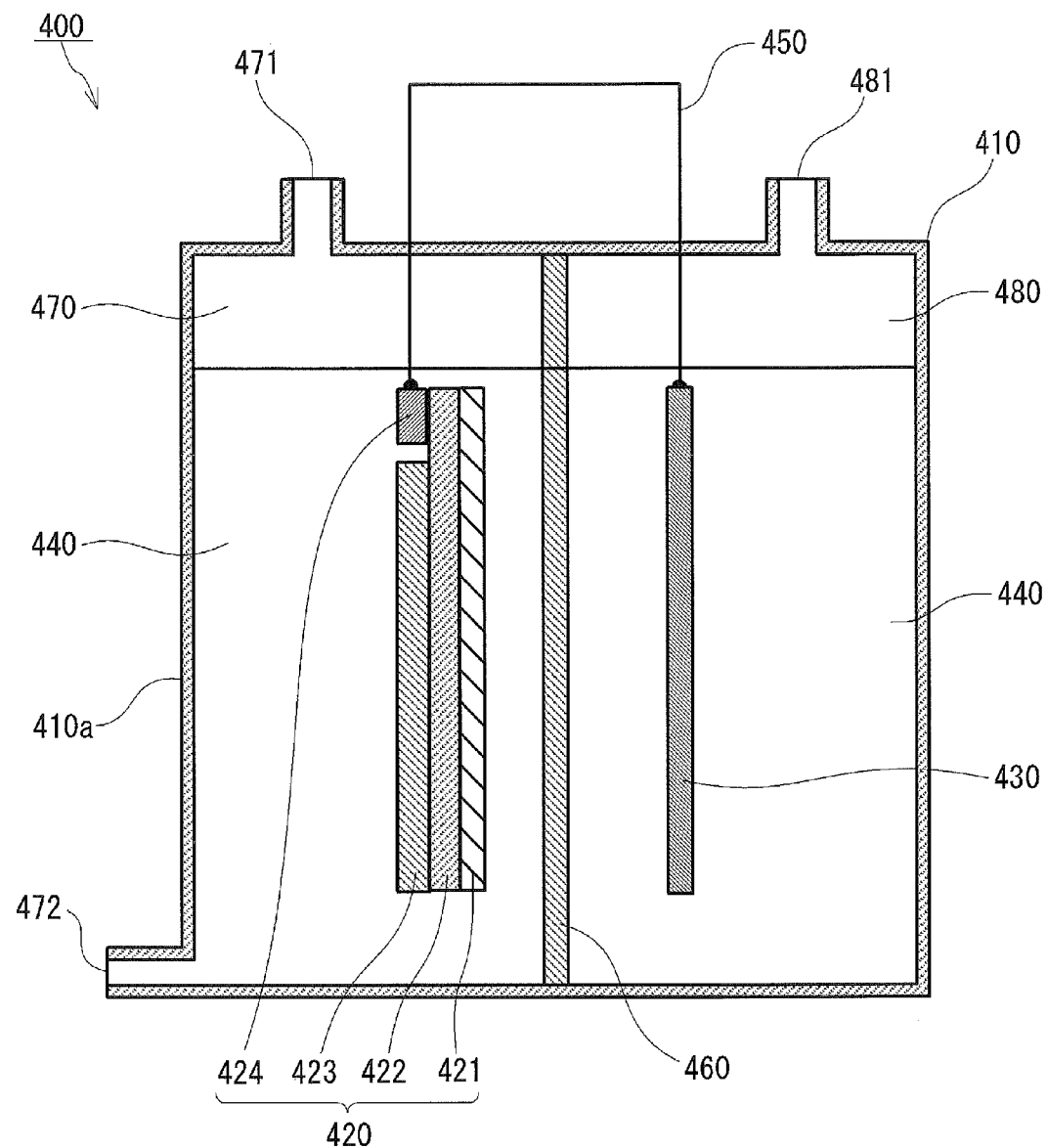
FIG. 36 is a schematic view illustrating a configuration of the photoelectrochemical cell of Embodiment 4 of the present invention.

The configuration of the photoelectrochemical cell according to Embodiment 4 of the present invention is described with reference to FIG. 36. FIG. 36 is a schematic view illustrating the configuration of the photoelectrochemical cell of the present embodiment.

As indicated in FIG. 36, a photoelectrochemical cell 400 of the present embodiment includes a housing (container) 410, a semiconductor electrode 420, a counter electrode 430 and a separator 460. The separator 460 separates the inside of the housing 410 into two chambers: a first chamber 470 and a second chamber 480. An electrolyte 440 containing water is accommodated in each of the first chamber 470 and the second chamber 480.

The semiconductor electrode 420 is disposed at a position in contact with the electrolyte 440 inside the first chamber 470. The semiconductor electrode 420 includes a substrate 421, a first n-type semiconductor layer 422 disposed on the substrate 421, and a second n-type semiconductor layer 423 and a conductor 424 that are disposed on the first n-type semiconductor layer 422. Further, the first chamber 470 includes a first gas outlet 470 for discharging oxygen generated inside the first chamber 470 and a water supply opening 472 for supplying water into the first chamber 470. A portion of the housing 410 that faces the second n-type semiconductor layer 423 of the semiconductor electrode 420 disposed inside the first chamber 470 (hereinafter, abbreviated as a light incident portion 410a) is made of a material that transmits light such as sunlight.

On the other hand, the counter electrode 430 is disposed inside the second chamber 480 at a position in contact with the electrolyte 440. Further, the second chamber 480 includes a second gas outlet 481 for discharging hydrogen generated inside the second chamber 480.

The conductor 424 of the semiconductor electrode 420 is connected electrically to the counter electrode 430 by a conducting wire 450.

The substrate 421, the first n-type semiconductor layer 422, the second n-type semiconductor layer 423 and the conductor 424 of the semiconductor electrode 420 in the present embodiment, respectively, have the same configurations as those of the substrate 121, the first n-type semiconductor layer 122, the second n-type semiconductor layer 123 and the conductor 124 of the semiconductor electrode 120 in Embodiment 1. Accordingly, the semiconductor electrode 420 has the same operational effects as those of the semiconductor electrode 120 of Embodiment 1. Further, the counter electrode 430 and the electrolyte 440 respectively are the same as the counter electrode 130 and the electrolyte 140 in Embodiment 1.

The separator 460 is formed of a material that allows the electrolyte 440 to permeate itself and has a function of blocking gas generated inside each of the first chamber 470 and the second chamber 480. Examples of the material of the separator 460 include a solid electrolyte such as polymeric solid electrolyte. As the polymeric solid electrolyte, an ion exchange membrane such as Nafion (registered trademark) can be mentioned, for example. Oxygen and hydrogen generated inside the container can be separated easily with a configuration in which, after the internal space of the container is separated into two areas using such a separator, the electrolyte and the surface of the semiconductor electrode (the surface of the second n-type semiconductor layer) are made in contact in one of the areas while the electrolyte and the surface of the counter electrode are made in contact in the other area.

It should be noted that although the photoelectrochemical cell 400 using the semiconductor electrode 420 that has the same configuration as that of the semiconductor electrode 120 in Embodiment 1 is described in the present embodiment, it also is possible to use the semiconductor electrode 220 in Embodiment 2 instead of the semiconductor electrode 420.

(Embodiment 5)

Figure 37:
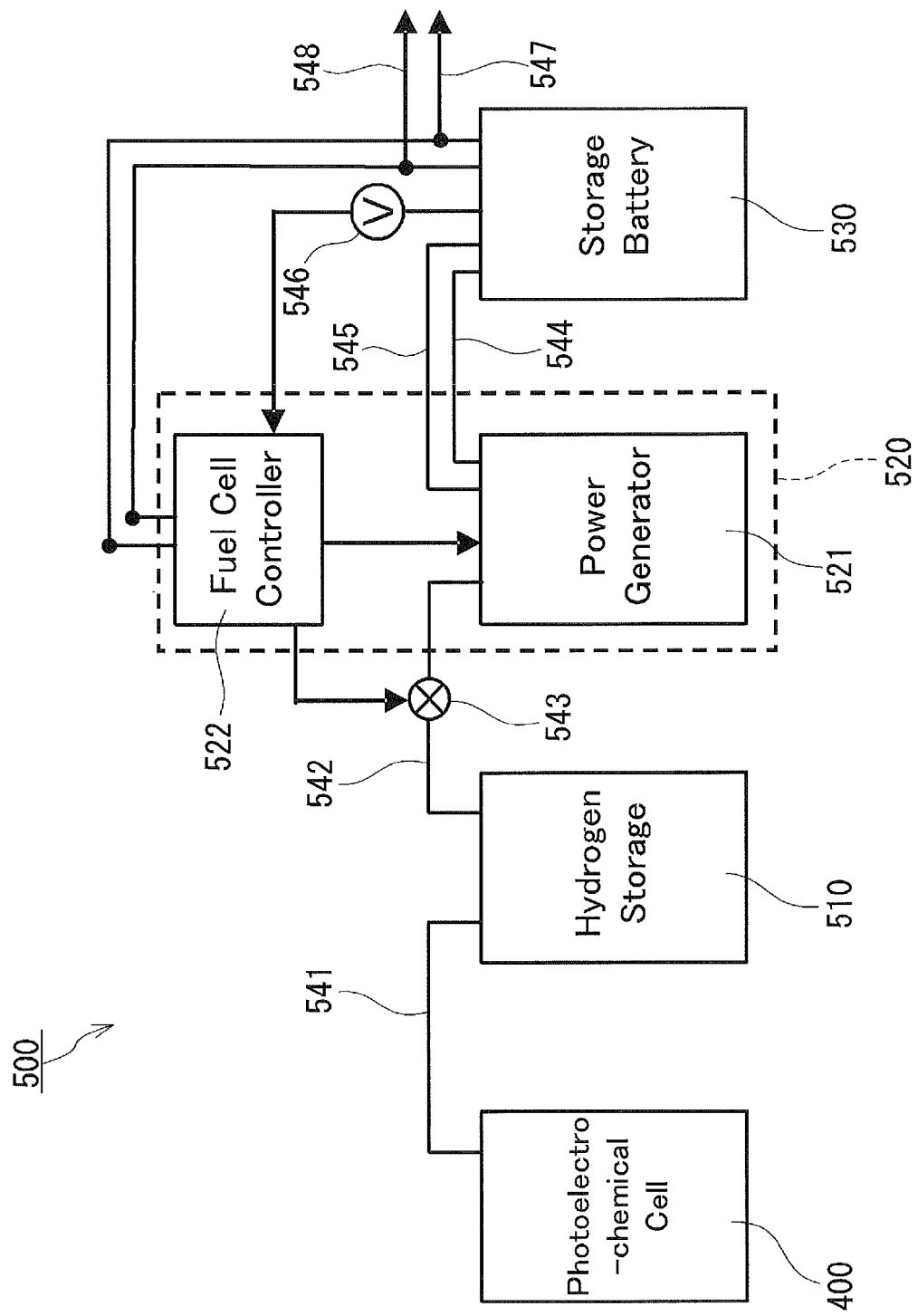
FIG. 37 is a schematic view illustrating a configuration of the energy system of Embodiment 5 of the present invention.

The configuration of the energy system according to Embodiment 5 of the present invention is described with reference to FIG. 37. FIG. 37 is a schematic view illustrating the configuration of the present embodiment.

As indicated in FIG. 37, an energy system 500 of the present embodiment includes the photoelectrochemical cell 400, a hydrogen storage 510, a fuel cell 520 and a storage battery 530.

The photoelectrochemical cell 400 is the photoelectrochemical cell described in Embodiment 4 and the specific configuration thereof is as illustrated in FIG. 36. Therefore, detailed descriptions thereof are omitted.

The hydrogen storage 510 is connected to the second chamber 480 (see FIG. 36) of the photoelectrochemical cell 400 by a first pipe 541. The hydrogen storage 510 can be constituted, for example, by a compressor for compressing the hydrogen generated in the photoelectrochemical cell 400 and a high-pressure hydrogen tank for storing the hydrogen compressed by the compressor.

The fuel cell 520 includes a power generator 521 and a fuel cell controller 522 for controlling the power generator 521. The fuel cell 520 is connected to the hydrogen storage 510 by a second pipe 542. The second pipe 542 is provided with a block valve 543. For example, a fuel cell of the polymeric solid electrolyte type can be used as the fuel cell 520.

The positive electrode and the negative electrode of the storage battery 530 respectively are connected electrically to the positive electrode and the negative electrode of the power generator 521 in the fuel cell 520 by a first line 544 and a second line 545. The storage battery 530 is provided with a capacity counter 546 for counting the remaining capacity of the storage battery 530. A lithium ion battery can be used as the storage battery 530, for example.

Next, the operation of the energy system 500 according to the present embodiment is described with reference to FIG. 36 and FIG. 37.

When the surface of the second n-type semiconductor layer 423 of the semiconductor electrode 420 disposed inside the first chamber 470 is irradiated with sunlight through the light incident portion 410a of the photoelectrochemical cell 400, electrons and holes occur inside the second n-type semiconductor layer 423. The holes generated at the present time transfer toward the surface side of the second n-type semiconductor layer 423. Thus, water is decomposed on the surface of the second n-type semiconductor layer 423 according to the above reaction formula (1), so that oxygen is generated.

On the other hand, the electrons transfer to the conductor 424 along the bending of the band edge of the conduction band at the interface between the second n-type semiconductor layer 423 and the first n-type semiconductor layer 422 and at the interface between the first n-type semiconductor layer 422 and the conductor 424. The electrons that have transferred to the conductor 424 transfer toward the side of the counter electrode 430 connected electrically to the conductor 424 through the conducting wire 450. Thus, hydrogen is generated on the surface of the counter electrode 430 according to the above reaction formula (2).

At this time, since no Schottky barriers occur at the junction plane between the second n-type semiconductor layer 423 and the first n-type semiconductor layer 422, the electrons can transfer from the second n-type semiconductor layer 423 to the first n-type semiconductor layer 422 without being prevented, as is the case of the semiconductor electrode 120 in Embodiment 1. Furthermore, since no Schottky barriers occur also at the junction plane between the first n-type semiconductor layer 422 and the conductor 424, the electrons can transfer to the conductor 424 without being prevented. Accordingly, the probability of the recombination between the electrons and holes generated by photoexcitation inside the first n-type semiconductor layer 423 is reduced, and the quantum efficiency of the hydrogen evolution reaction by irradiation with light can be improved.

Oxygen generated inside the first chamber 470 is discharged from the first gas outlet 471 to the outside of the photoelectrochemical cell 400. On the other hand, hydrogen generated inside the second chamber 480 is supplied into the hydrogen storage 510 through the second gas outlet 481 and the first pipe 541.

In generating power in the fuel cell 520, the block valve 543 is opened according to signals from the fuel cell controller 522, so that the hydrogen stored inside the hydrogen storage 510 is supplied to the power generator 521 of the fuel cell 520 through the second pipe 542.

The electricity generated in the power generator 521 of the fuel cell 520 is stored inside the storage battery 530 through the first line 544 and the second line 545. The electricity stored inside the storage battery 530 is supplied to households, enterprises, and the like through a third line 547 and a fourth line 548.

According to the photoelectrochemical cell 400 in the present embodiment, it is possible to improve the quantum efficiency of the hydrogen evolution reaction by irradiation with light. Thus, the energy system 500 of the present embodiment provided with the photoelectrochemical cell 400 can provide an efficient power supply.

Although an energy system using the photoelectrochemical cell 400 described in Embodiment 4 is exemplified in the present embodiment, the same effects can be obtained also when the photoelectrochemical cells 100, 200 and 300 described in Embodiments 1 to 3 each are used.

EXAMPLES

Hereinafter, examples of the present invention are described in detail.

Example 1

As Example 1, a photoelectrochemical cell having the same configuration as that of the photoelectrochemical cell 100 indicated in FIG. 1 was produced. The photoelectrochemical cell of Example 1 is described below with reference to FIG. 1.

The photoelectrochemical cell 100 of Example 1 was provided with a rectangular glass container (container 110) with an opening in the upper part, the semiconductor electrode 120 and the counter electrode 130. The glass container 110 accommodated 1 mol/L of an NaOH aqueous solution as the electrolyte 140.

The semiconductor electrode 120 was produced according to the following procedure.

First, a 2 inch-square sapphire substrate was prepared. An intrinsic GaN (i-GaN) crystal film with a thickness of 30 nm was formed on this sapphire substrate by a MOCVD (metalorganic chemical vapor deposition) method using trimethylgallium as a reactive gas. This sapphire substrate with the i-GaN crystal film was used as the substrate 121. An n-GaN crystal film (the first n-type semiconductor layer 122) with a thickness of 2000 nm was formed on the substrate 121 by the MOCVD method using trimethylgallium and a dopant silane gas as reactive gases. Further, an n-GaInN crystal film (the second n-type semiconductor layer 123) with a thickness of 100 nm was formed on the first n-type semiconductor layer 122 by the MOCVD method using triethylgallium, trimethylindium and a dopant silane gas as reactive gases.

The laminate in which the i-GaN crystal film, the n-GaN crystal film and the n-GaInN crystal film were formed on the sapphire substrate was cut into 2 cm×1 cm. The n-GaInN crystal film (with a thickness of 100 nm) in an area of 0.9 cm×1 cm was removed therefrom by etching. An Al film (with a thickness of 100 nm) was vapor-deposited on the area from which the n-GaInN crystal film had been removed, so that the Al film was used as the conductor 124. In order to prevent the n-GaInN crystal film serving as the second n-type semiconductor layer 123 from being in contact with the Al film serving as the conductor 124, a 0.1 cm gap was provided therebetween. Thus, the semiconductor electrode 120 of Example 1 was produced.

The semiconductor electrode 120 thus produced was disposed inside the glass container 110 so that the surface of the second n-type semiconductor layer 123 faces the light incident portion 110a of the glass container 110.

A platinum plate was used as the counter electrode 130. The conductor 124 of the semiconductor electrode 120 was connected electrically to the counter electrode 130 by the conducting wire 150.

An irradiation experiment with simulated sunlight was conducted on the thus produced photoelectrochemical cell 100 of Example 1. In the irradiation experiment with simulated sunlight, the surface of the second n-type semiconductor layer 123 in the semiconductor electrode 120 of the photoelectrochemical cell 100 was irradiated with light at an intensity of 1 kW/m² through the light incident portion 110a using a solar simulator manufactured by SERIC LTD. as the simulated sunlight. The gas generated on the surface of the counter electrode 130 was collected for 30 minutes, and the components were analyzed and the amount generated was determined for the collected gas by gas chromatography. Furthermore, the photocurrent flowing between the semiconductor electrode 120 and the counter electrode 130 was measured with an ammeter. The apparent quantum efficiency was calculated using the amount of gas generated on the counter electrode 130.

As a result of the analysis of the gas collected in the photoelectrochemical cell of the Example 1, it was confirmed that hydrogen was generated on the counter electrode. The rate of hydrogen generation was $1.9 \times 10^{-7}$ L/s. Further, since the photocurrent flowing between the semiconductor electrode and the counter electrode was 1.5 mA/cm², it was confirmed that the electrical decomposition of water was performed quantitatively. The apparent quantum efficiency was about 63%, as calculated using the following formula.

Apparent quantum efficiency={(measured photocurrent density [mA/cm²])/(photocurrent density obtainable by the sunlight to be possibly absorbed in the band gap of the semiconductor material used for the second n-type semiconductor layer [mA/cm²])}×100

It should be noted that, in Example 1, the photocurrent density measured was 1.5 mA/cm², and the photocurrent density obtainable by the sunlight to be possibly absorbed in the band gap (the band gap of $Ga_{0.9}In_{0.1}N$ (2.9 eV)) of the semiconductor material used for the second n-type semiconductor layer was 2.4 mA/cm².

Example 2

As Example 2, a photoelectrochemical cell having the same configuration as that of the photoelectrochemical cell 100 indicated in FIG. 1 was produced. In Example 2, a photoelectrochemical cell in which only the material of the semiconductor electrode 120 was different from that in Example 1 was produced. The semiconductor electrode 120 of Example 2 was produced as follows.

First, a 2 cm×1 cm glass substrate was prepared as the substrate 121. A titanium oxide film (anatase polycrystalline material) with a thickness of 500 nm was formed on this glass substrate by a sputtering method, as the first n-type semiconductor layer 122. A cadmium sulfide film with a thickness of 1 μm was formed on the first n-type semiconductor layer 122 by a chemical precipitation method using cadmium acetate and thiourea, as the second n-type semiconductor layer 123. The cadmium sulfide film (with a thickness of 1 μm) in an area of 0.9 cm×1 cm was removed therefrom by etching. A Ti film (with a thickness of 150 nm) was vapor-deposited on the area from which the cadmium sulfide film had been removed, so that the Ti film was used as the conductor 124. In order to prevent the cadmium sulfide layer serving as the second n-type semiconductor layer 123 from being in contact with the Ti film serving as the conductor 124, a 0.1 cm gap was provided therebetween. Thus, the semiconductor electrode 120 of Example 2 was produced.

The irradiation experiment with simulated sunlight was conducted on the thus produced photoelectrochemical cell 100 of Example 2 in the same manner as in Example 1, except that the glass container 110 accommodated 0.01 mol/L of an $Na_2SO_3$ aqueous solution containing 0.01 mol/L of $Na_2S$ as the electrolyte 140. As a result of the analysis of the gas collected in the photoelectrochemical cell of the Example 2, it was confirmed that hydrogen was generated on the counter electrode. The rate of hydrogen generation was $2.9 \times 10^{-7}$ L/s. Further, since the photocurrent flowing between the semiconductor electrode and the counter electrode was 2.3 mA/cm², it was confirmed that the electrical decomposition of water was performed quantitatively. The apparent quantum efficiency was calculated using the calculation formula indicated in Example 1. It should be noted that in the present example, the photocurrent density measured was 2.3 mA/cm², and the photocurrent density obtainable by the sunlight to be possibly absorbed in the band gap (the band gap of CdS (2.5 eV)) of the semiconductor material used for the second n-type semiconductor layer was 6.5 mA/cm². As a result, the calculated apparent quantum efficiency of Example 2 was about 35%.

It should be noted that an $Na_2SO_3$ aqueous solution containing $Na_2S$ was used as an electrolyte in the photoelectrochemical cell of Example 2. In view of this, it is conceivable that when the semiconductor electrode was irradiated with light, the reaction that proceeded in the semiconductor electrode was not an oxygen evolution reaction according to the above-indicated reaction formula (1) but a reaction according to the below-indicated reaction formula (3). Further, it is conceivable that the reaction expressed by the aforementioned reaction formula (2) proceeded in the counter electrode.

$$2h^+ + S_2 \rightarrow S \qquad (3)$$

Example 3

As Example 3, a photoelectrochemical cell having the same configuration as that of the photoelectrochemical cell 100 indicated in FIG. 1 was produced. In Example 3, a photoelectrochemical cell in which only the material of the semiconductor electrode 120 was different from that in Example 1 was produced. The semiconductor electrode 120 of Example 3 was produced as follows.

First, a 2 cm×1 cm glass substrate was prepared as the substrate 121. An $InGaZn_2O_5$ film with a thickness of 150 nm was formed on this glass substrate by the sputtering method using $InGaZn_2O_5$ as a sputtering target, with the partial pressure of oxygen in the chamber at 0.1 Pa and the substrate temperature at room temperature, as the first n-type semiconductor layer 122. An area of 0.9 cm×1 cm on the first n-type semiconductor layer 122 was masked, and then a $InGaZn_2O_5$ film with a thickness of 500 nm in which a part of oxygen was substituted by nitrogen was formed on an area of the first n-type semiconductor layer 122 that was not masked, by a reactive sputtering method using $InGaZn_2O_5$ as a sputtering target, with the nitrogen pressure in the chamber at 0.1 Pa and the substrate temperature at room temperature, as the second n-type semiconductor layer 123. Then, the mask was removed, and an Ag film (with a thickness of 150 nm) was vapor-deposited on the area of the first n-type semiconductor layer 122 that had been masked, so that the Ag film was used as the conductor 124. In order to prevent the second n-type semiconductor layer 123 from being in contact with the conductor 124, a 0.1 cm gap was provided therebetween. Thus, the semiconductor electrode 120 of Example 3 was produced.

The irradiation experiment with simulated sunlight was conducted on the thus produced photoelectrochemical cell 100 of Example 3 in the same manner as in Example 1, except that the glass container 110 accommodated 0.01 mol/L of an $Na_2CO_3$ aqueous solution as the electrolyte 140. As a result of the analysis of the gas collected in the photoelectrochemical cell of the Example 3, it was confirmed that hydrogen was generated on the counter electrode. The rate of hydrogen generation was $2.5 \times 10^{-7}$ L/s. Further, since the photocurrent flowing between the semiconductor electrode and the counter electrode was 2.0 mA/cm², it was confirmed that the electrical decomposition of water was performed quantitatively. The apparent quantum efficiency was calculated using the calculation formula indicated in Example 1. In the present example, the measured photocurrent density was 2.0 mA/cm². The $InGaZn_2O_5$ film in which a part of oxygen was substituted by nitrogen, used for the second n-type semiconductor layer 123, had a band gap of about 1.8 eV determined from the UV-Vis absorption spectrum. The photocurrent density obtainable by the sunlight to be possibly absorbed in this band gap was 19.7 mA/cm². As a result, the calculated apparent quantum efficiency of Example 3 was about 10%.

Example 4

As Example 4, a photoelectrochemical cell having the same configuration as that of the photoelectrochemical cell 300 indicated in FIG. 35 was produced. The photoelectrochemical cell of Example 4 is described below with reference to FIG. 35.

The photoelectrochemical cell 300 of Example 4 was provided with the rectangular glass container (container 110) with an opening in the upper part, the semiconductor electrode 320 and the counter electrode 330. The glass container 110 accommodated 1 mol/L of an NaOH aqueous solution as the electrolyte 140.

The semiconductor electrode 320 was produced according to the following procedure.

First, a 2 inch-square sapphire substrate was prepared. An intrinsic GaN (i-GaN) crystal film with a thickness of 30 nm was formed on this sapphire substrate by the MOCVD method using trimethylgallium as a reactive gas. This sapphire substrate with the i-GaN crystal film was used as the substrate 321. An n-GaN crystal film (the first n-type semiconductor layer 322) with a thickness of 2000 nm was formed on the substrate 321 by the MOCVD method using trimethylgallium and a dopant silane gas as reactive gases. Further, an n-GaInN crystal film (the second n-type semiconductor layer 323) with a thickness of 100 nm was formed on the first n-type semiconductor layer 322 by the MOCVD method using triethylgallium, trimethylindium and a dopant silane gas as reactive gases.

The laminate in which the i-GaN crystal film, the n-GaN crystal film and the n-GaInN crystal film were formed on the sapphire substrate was cut into 2 cm×1 cm. The n-GaInN crystal film (with a thickness of 100 nm) in an area of 0.9 cm×1 cm was removed therefrom by etching. An Al film (with a thickness of 100 nm) was vapor-deposited on the area from which the n-GaInN crystal film had been removed, so that the Al film was used as the conductor 324. In order to prevent the n-GaInN crystal film serving as the second n-type semiconductor layer 323 from being in contact with the Al film serving as the conductor 324, a 0.1 cm gap was provided therebetween. Thus, the semiconductor electrode 320 of Example 4 was produced.

A Pt film with a thickness of 10 nm was formed on the conductor 324 of the semiconductor electrode 320 by the sputtering method, as the counter electrode 330.

The thus produced semiconductor electrode 320 and the counter electrode 330 were disposed inside the glass container 110 so that the surface of the second n-type semiconductor layer 323 faces the light incident portion 110a of the glass container 110.

The irradiation experiment with simulated sunlight was conducted on the thus produced photoelectrochemical cell 300 of Example 4, in the same manner as in Example 1. As a result of the analysis of the gas collected in the photoelectrochemical cell of the Example 4, it was confirmed that hydrogen was generated on the counter electrode. The rate of hydrogen generation was $2.1 \times 10^{-7}$ L/s. Further, since the photocurrent flowing between the semiconductor electrode and the counter electrode was 1.7 mA/cm², it was confirmed that the electrical decomposition of water was performed quantitatively. The apparent quantum efficiency was calculated using the calculation formula indicated in Example 1. It should be noted that, in the present example, the photocurrent density measured was 1.7 mA/cm$^2$, and the photocurrent density obtainable by the sunlight to be possibly absorbed in the band gap (the band gap of $Ga_{0.9}In_{0.1}N$ (2.9 eV)) of the semiconductor material used for the second n-type semiconductor layer was 2.4 mA/cm$^2$. As a result, the calculated apparent quantum efficiency of Example 4 was about 71%.

Comparative Example 1

As Comparative Example 1, a photoelectrochemical cell in which only the first n-type semiconductor layer was different from that in Example 1 was produced. The first n-type semiconductor layer of Comparative Example 1 was formed with a reduced amount of dopant silane gas compared to that used in Example 1.

The irradiation experiment with simulated sunlight was conducted on the thus produced photoelectrochemical cell of Comparative Example 1, in the same manner as in Example 1. As a result of the analysis of the gas collected in the photoelectrochemical cell of the Comparative Example 1, it was confirmed that hydrogen was generated on the counter electrode. The rate of hydrogen generation was $6.7 \times 10^{-8}$ L/s. Further, since the photocurrent flowing between the semiconductor electrode and the counter electrode was 0.52 mA/cm$^2$, it was confirmed that the electrical decomposition of water was performed quantitatively. The apparent quantum efficiency was calculated using the calculation formula indicated in Example 1. It should be noted that, in the present comparative example, the photocurrent density measured was 0.52 mA/cm$^2$, and the photocurrent density obtainable by the sunlight to be possibly absorbed in the band gap (the band gap of $Ga_{0.9}In_{0.1}N$ (2.9 eV)) of the semiconductor material used for the second n-type semiconductor layer was 2.4 mA/cm$^2$. As a result, the calculated apparent quantum efficiency of Comparative Example 1 was about 22%.

Comparative Example 2

As Comparative Example 2, a photoelectrochemical cell using a semiconductor electrode that did not include the first n-type semiconductor layer was produced. In the same manner as in Example 1, an n-GaInN crystal film (with a thickness of 100 nm) as the second n-type semiconductor layer was formed on the substrate (the sapphire substrate with the i-GaN crystal film) prepared in the same manner as in Example 1. The obtained laminate was cut into 2 cm×1 cm. As the conductor, an Al film (with a thickness of 100 nm) was vapor-deposited on the n-GaInN crystal film in an area of a 0.9 cm×1 cm. Thus, the semiconductor electrode of Comparative Example 2 was obtained. The configuration other than the semiconductor electrode was the same as that in Example 1.

The irradiation experiment with simulated sunlight was conducted on the thus produced photoelectrochemical cell of Comparative Example 2, in the same manner as in Example 1. As a result of the analysis of the gas collected in the photoelectrochemical cell of the Comparative Example 2, it was confirmed that hydrogen was generated on the counter electrode. The rate of hydrogen generation was $7.8 \times 10^{-8}$ L/s. Further, since the photocurrent flowing between the semiconductor electrode and the counter electrode was 0.6 mA/cm$^2$, it was confirmed that the electrical decomposition of water was performed quantitatively. The apparent quantum efficiency was calculated using the calculation formula indicated in Example 1. It should be noted that, in the present comparative example, the photocurrent density measured was 0.6 mA/cm$^2$, and the photocurrent density obtainable by the sunlight to be possibly absorbed in the band gap (the band gap of $Ga_{0.9}In_{0.1}N$ (2.9 eV)) of the semiconductor material used for the second n-type semiconductor layer was 2.4 mA/cm$^2$. As a result, the calculated apparent quantum efficiency of Comparative Example 2 was about 25%.

Comparative Example 3

As Comparative Example 3, a photoelectrochemical cell using a semiconductor electrode that did not include the first n-type semiconductor layer was produced. The same glass substrate as the glass substrate used in Example 3 was prepared. An $InGaZn_2O_5$ film (with a thickness of 500 nm) in which a part of oxygen was substituted by nitrogen, used for the second n-type semiconductor layer in Example 3, was formed on the glass substrate in the same manner as in Example 3. The obtained laminate was cut into 2 cm×1 cm. As the conductor, an Al film (with a thickness of 100 nm) was vapor-deposited on the $InGaZn_2O_5$ film in an area of 0.9 cm×1 cm. Thus, the semiconductor electrode of Comparative Example 3 was obtained. The configuration other than the semiconductor electrode was the same as that in Example 3.

The irradiation experiment with simulated sunlight was conducted on the thus produced photoelectrochemical cell of Comparative Example 3, in the same manner as in Example 3. As a result of the analysis of the gas collected in the photoelectrochemical cell of the Comparative Example 3, it was confirmed that hydrogen was generated on the counter electrode. The rate of hydrogen generation was $1.0 \times 10^{-7}$ L/s. Further, since the photocurrent flowing between the semiconductor electrode and the counter electrode was 0.8 mA/cm$^2$, it was confirmed that the electrical decomposition of water was performed quantitatively. The apparent quantum efficiency was calculated using the calculation formula indicated in Example 1. In the present comparative example, the measured density of the photocurrent flowing was 0.8 mA/cm$^2$. The $InGaZn_2O_5$ film in which a part of oxygen was substituted by nitrogen, used for the second n-type semiconductor layer, had a band gap of about 1.8 eV determined from the UV-Vis absorption spectrum. The photocurrent density obtainable by the sunlight to be possibly absorbed in this band gap was 19.7 mA/cm$^2$. As a result, the calculated apparent quantum efficiency of Comparative Example 3 was about 4%.

Table 1 indicates the material, the Fermi level $E_F$ (unit: eV), the band edge level $E_C$ (unit: eV) of the conduction band, and the band edge level $E_V$ (unit: eV) of the valence band of the conductor, the first n-type semiconductor layer and the second n-type semiconductor layer constituting the semiconductor electrode in each photoelectrochemical cell of Examples 1 to 4 and Comparative Examples 1 to 3. It should be noted that the values of the Fermi level, the band edge level of the conduction band, and the band edge level of the valence band are indicated herein relative to the vacuum level, in the state where the semiconductor electrode is in contact with an electrolyte at a pH of 0 and a temperature of 25° C. The Fermi levels were calculated from the measurement of flat band potential. The band edge levels of the conduction band and the band edge levels of the valence band were cited from literature. Table 1 also indicates the quantum efficiency of each photoelectrochemical cell of Examples 1 to 4 and Comparative Examples 1 to 3.

TABLE 1

|  |  | Second n-type semiconductor layer | First n-type semiconductor layer | Conductor | Quantum efficiency (%) |
|---|---|---|---|---|---|
| Example 1 | Material composition | n-GaInN | n-GaN | Al | 63 |
|  | Fermi level | −4.44 eV | −4.34 eV | −4.28 eV |  |
|  | Conduction band | −3.74 eV | −3.84 eV | — |  |
|  | Valence band | −6.64 eV | −7.24 eV | — |  |
| Example 2 | Material composition | CdS | $TiO_2$ | Ti | 35 |
|  | Fermi level | −5.24 eV | −4.34 eV | −4.33 eV |  |
|  | Conduction band | −4.04 eV | −4.24 eV | — |  |
|  | Valence band | −6.54 eV | −7.44 eV | — |  |
| Example 3 | Material composition | A part of oxygen in $InGaZn_2O_5$ was substituted by nitrogen. | $InGaZn_2O_5$ | Ag | 10 |
|  | Fermi level | −4.34 eV | −4.24 eV | −4.15 eV |  |
|  | Conduction band | −4.04 eV | −4.14 eV | — |  |
|  | Valence band | −5.84 eV | −7.24 eV | — |  |
| Example 4 | Material composition | n-GaInN | n-GaN | Al | 71 |
|  | Fermi level | −4.44 eV | −4.34 eV | −4.28 eV |  |
|  | Conduction band | −3.74 eV | −3.84 eV | — |  |
|  | Valence band | −6.64 eV | −7.24 eV | — |  |
| C. Example 1 | Material composition | n-GaInN | n-GaN | Al | 22 |
|  | Fermi level | −4.44 eV | −4.54 eV | −4.28 eV |  |
|  | Conduction band | −3.74 eV | −3.84 eV | — |  |
|  | Valence band | −6.64 eV | −7.24 eV | — |  |
| C. Example 2 | Material composition | n-GaInN | — | Al | 25 |
|  | Fermi level | −4.44 eV | — | −4.28 eV |  |
|  | Conduction band | −3.74 eV | — | — |  |
|  | Valence band | −6.64 eV | — | — |  |
| C. Example 3 | Material composition | A part of oxygen in $InGaZn_2O_5$ was substituted by nitrogen. | — | Ag | 4 |
|  | Fermi level | −4.34 eV | — | −4.15 eV |  |
|  | Conduction band | −4.04 eV | — | — |  |
|  | Valence band | −5.84 eV | — | — |  |

As seen from Table 1, in the semiconductor electrode in each photoelectrochemical cell of Examples 1 to 4, the band edge level $E_{C2}$ of the conduction band and the band edge level $E_{V2}$ of the valence band in the second n-type semiconductor layer, respectively, were higher than the band edge level $E_{C1}$ of the conduction band and the band edge level $E_{V1}$ of the valence band in the first n-type semiconductor layer, and the large/small relationship in terms of the Fermi level satisfied "the second n-type semiconductor layer<the first n-type the semiconductor layer<the conductor". Furthermore, in each semiconductor electrode of Examples 1 to 4, the Fermi level of the first n-type semiconductor layer was −4.44 eV or more, and the band edge level of the valence band in the second n-type semiconductor layer was −5.67 eV or less, in the state of being in contact with an electrolyte at a pH of 0 and a temperature of 25° C.

As described above, the conductor, the first n-type semiconductor layer and the second n-type semiconductor layer in each Example 1 to 4 had the same band structure as that of the conductor 124, the first n-type semiconductor layer 122 and the second n-type semiconductor layer 123 in Embodiment 1 (see FIG. 2 and FIG. 3).

In the semiconductor electrode of the photoelectrochemical cell according to Comparative Example 1, although the band edge level $E_{C2}$ of the conduction band and the band edge level $E_{V2}$ of the valence band in the second n-type semiconductor layer, respectively, were higher than the band edge level $E_{C1}$ of the conduction band and the band edge level $E_{V1}$ of the valence band in the first n-type semiconductor layer, the large/small relationship in terms of the Fermi level was "the second n-type semiconductor layer>the first n-type semiconductor layer<the conductor". Furthermore, although the band edge level of the valence band in the second n-type semiconductor layer was −5.67 eV or less, the Fermi level of the first n-type semiconductor layer was less than −4.44 eV, in the state where the semiconductor electrode was in contact with an electrolyte at a pH of 0 and a temperature of 25° C.

As described above, the conductor, the first n-type semiconductor layer and the second n-type semiconductor layer in Comparative Example 1 had the same band structure as that of the conductor 164, the first n-type semiconductor layer 162 and the second n-type semiconductor layer 163 in Comparative Embodiment 1-1 of Embodiment 1 (see FIG. 4 and FIG. 5).

Between Example 1 and Comparative Example 1, the materials of the first n-type semiconductor layers and the second n-type semiconductor layers were the same as each other but the relationships of the energy levels (here, it is the large/small relationship in terms of the Fermi level) were different from each other. When the quantum efficiencies were compared therebetween, the photoelectrochemical cell of Example 1 satisfying the band structure of the present invention achieved a higher quantum efficiency than that of Comparative Example 1. Furthermore, between Example 1 and Comparative Example 2, the materials of the second n-type semiconductor layers were the same as each other but the configurations were different from each other in terms of whether they had the first n-type semiconductor layer or not. When a comparison was made therebetween, Example 1 that included the first n-type semiconductor layer achieved a quantum efficiency about two times higher than that of Comparative Example 2 that did not include the first n-type semiconductor layer.

Also in Example 2 satisfying the structure of the photoelectrochemical cell of the present invention, a satisfactory quantum efficiency was achieved as in Example 1. However, the quantum efficiency was even higher in Example 1 in which n-GaN was used for the first n-type semiconductor layer and the n-type group III nitride semiconductor was used for the second n-type semiconductor layer.

Between Example 3 and Comparative Example 3, the materials of the second n-type semiconductor layers were the same as each other but the configurations were different from each other in terms of whether they had the first n-type semiconductor layer or not. When a comparison was made therebetween, Example 3 that included the first n-type semiconductor layer achieved a quantum efficiency two times or more higher than that of Comparative Example 3 that did not include the first n-type semiconductor layer.

Between Example 1 and Example 4, the configurations of the semiconductor electrodes were the same as each other but the positional relationships of the counter electrodes were different from each other. When a comparison was made therebetween, the apparent quantum efficiency of Example 1 was 63%, whereas that of Example 4 was 71%. It could be confirmed from these results that since the ohmic loss derived from the conducting wire was eliminated in the photoelectrochemical cell of Example 4, the apparent quantum efficiency was further improved, compared to the photoelectrochemical cell of Example 1.

It should be noted that although Examples 1 to 4 using n-type semiconductor layers for the semiconductor electrode were shown, similar results can be obtained also by using p-type semiconductor layers instead of the n-type semiconductor layers. For example, in Example 1, it also is possible to form, as the first p-type semiconductor layer, a p-GaN film instead of the first n-type semiconductor layer by the MOCVD method and further form, as the second p-type semiconductor layer, a p-GaInN film on the first p-type semiconductor layer by the MOCVD method so as to produce the semiconductor electrode. Also in this case, the apparent quantum efficiency is expected to be improved, as is the case of Example 1.

Industrial Applicability

The photoelectrochemical cell and the energy system of the present invention can improve the quantum efficiency of the hydrogen evolution reaction by irradiation with light, and thus are useful as a domestic power generation system and the like.

The invention claimed is:

1. A photoelectrochemical cell comprising:
 a semiconductor electrode including a substrate, a first n-type semiconductor layer disposed on the substrate, and a second n-type semiconductor layer and a conductor disposed apart from each other on the first n-type semiconductor layer;
 a counter electrode connected electrically to the conductor;
 an electrolyte in contact with surfaces of the second n-type semiconductor layer and the counter electrode; and
 a container accommodating the semiconductor electrode, the counter electrode and the electrolyte, wherein:
 in the semiconductor electrode, relative to a vacuum level,
 (I) band edge levels of a conduction band and a valence band in the second n-type semiconductor layer, respectively, are higher than band edge levels of a conduction band and a valence band in the first n-type semiconductor layer,
 (II) a Fermi level of the first n-type semiconductor layer is higher than a Fermi level of the second n-type semiconductor layer, and
 (III) a Fermi level of the conductor is higher than the Fermi level of the first n-type semiconductor layer; and
 the photoelectrochemical cell generates hydrogen by irradiation of the second n-type semiconductor layer with light.

2. The photoelectrochemical cell according to claim 1, wherein
 in the case of the electrolyte at a pH of 0 and a temperature of 25° C.,
 the Fermi level of the first n-type semiconductor layer is −4.44 eV or more and the band edge level of the valence band in the second n-type semiconductor layer is −5.67 eV or less, relative to the vacuum level.

3. The photoelectrochemical cell according to claim 1, wherein the first n-type semiconductor layer is formed of n-type gallium nitride.

4. The photoelectrochemical cell according to claim 1, wherein the second n-type semiconductor layer is formed of an n-type group III nitride semiconductor containing, as group III elements, gallium and at least one element selected from the group consisting of indium and aluminum.

5. The photoelectrochemical cell according to claim 1, wherein
 the substrate is a sapphire substrate, and
 the first n-type semiconductor layer and the second n-type semiconductor layer are crystal films obtained by epitaxial growth.

6. The photoelectrochemical cell according to claim 1, wherein the first n-type semiconductor layer is formed of an n-type oxide semiconductor containing gallium, indium and zinc.

7. The photoelectrochemical cell according to claim 1, wherein the second n-type semiconductor layer is formed of an n-type semiconductor having a composition in which a part of oxygen in an oxide containing gallium, indium and zinc is substituted by nitrogen.

8. A photoelectrochemical cell comprising:
a semiconductor electrode including a substrate, a first p-type semiconductor layer disposed on the substrate, and a second p-type semiconductor layer and a conductor disposed apart from each other on the first p-type semiconductor layer;
a counter electrode connected electrically to the conductor;
an electrolyte in contact with surfaces of the second p-type semiconductor layer and the counter electrode; and
a container accommodating the semiconductor electrode, the counter electrode and the electrolyte, wherein:
in the semiconductor electrode, relative to a vacuum level,
(I) band edge levels of a conduction band and a valence band in the second p-type semiconductor layer, respectively, are lower than band edge levels of a conduction band and a valence band in the first p-type semiconductor layer,
(II) a Fermi level of the first p-type semiconductor layer is lower than a Fermi level of the second p-type semiconductor layer, and
(III) a Fermi level of the conductor is lower than the Fermi level of the first p-type semiconductor layer; and
the photoelectrochemical cell generates hydrogen by irradiation of the second p-type semiconductor layer with light.

9. The photoelectrochemical cell according to claim 8, wherein
in the case of the electrolyte at a pH of 0 and a temperature of 25° C.,
the Fermi level of the first p-type semiconductor layer is −5.67 eV or less and the band edge level of the conduction band in the second p-type semiconductor layer is −4.44 eV or more, relative to the vacuum level.

10. The photoelectrochemical cell according to claim 8, wherein the first p-type semiconductor layer is formed of p-type gallium nitride.

11. The photoelectrochemical cell according to claim 8, wherein the second p-type semiconductor layer is formed of a p-type group III nitride semiconductor containing, as group III elements, gallium and at least one element selected from the group consisting of indium and aluminum.

12. The photoelectrochemical cell according to claim 8, wherein
the substrate is a sapphire substrate, and
the first p-type semiconductor layer and the second p-type semiconductor layer are crystal films obtained by epitaxial growth.

13. The photoelectrochemical cell according to claim 1, wherein the counter electrode is disposed on the conductor.

14. An energy system comprising:
the photoelectrochemical cell according to claim 1;
a hydrogen storage that is connected to the photoelectrochemical cell by a first pipe and that stores hydrogen generated in the photoelectrochemical cell; and
a fuel cell that is connected to the hydrogen storage by a second pipe and that converts hydrogen stored in the hydrogen storage into electricity.

15. The photoelectrochemical cell according to claim 8, wherein the counter electrode is disposed on the conductor.

16. An energy system comprising:
the photoelectrochemical cell according to claim 8;
a hydrogen storage that is connected to the photoelectrochemical cell by a first pipe and that stores hydrogen generated in the photoelectrochemical cell; and
a fuel cell that is connected to the hydrogen storage by a second pipe and that converts hydrogen stored in the hydrogen storage into electricity.

* * * * *